United States Patent [19]
Li

[11] Patent Number: 6,027,447
[45] Date of Patent: Feb. 22, 2000

[54] PHASE AND/OR AMPLITUDE ABERRATION CORRECTION FOR IMAGING

[75] Inventor: Yue Li, Chatswood, Australia

[73] Assignee: Commonwealth Scientific and Industrial Research Organisation, Campbell, Australia

[21] Appl. No.: 08/894,069

[22] PCT Filed: Jan. 23, 1996

[86] PCT No.: PCT/AU96/00031

§ 371 Date: Oct. 24, 1997

§ 102(e) Date: Oct. 24, 1997

[87] PCT Pub. No.: WO96/23387

PCT Pub. Date: Aug. 1, 1996

[30] Foreign Application Priority Data

Jan. 23, 1995 [AU] Australia ................................. PN0693
May 25, 1995 [AU] Australia ................................. PN3174

[51] Int. Cl.$^7$ ........................................................ A61B 8/00
[52] U.S. Cl. ............................................................. 600/447
[58] Field of Search ...................................... 600/438, 437, 600/442, 443, 447; 73/602, 597, 599, 625–626

[56] References Cited

U.S. PATENT DOCUMENTS 4,395,909  8/1983  Steinberg et al. .
4,471,785  9/1984  Wilson et al. .
4,817,614  4/1989  Hassler et al. .

(List continued on next page.)

FOREIGN PATENT DOCUMENTS 2219089  11/1989  United Kingdom .

OTHER PUBLICATIONS

A. Buffington et. al., "Correction of atmospheric distortion with an image–sharpening telescope," *J. Opt. Soc. Am.*, vol. 67, No. 3, pp. 298–303, Mar. 1977.

S. W. Flax et al., "Phase–aberration correction using signals from point reflectors and diffused scatterers: basic principles," *IEEE Trans. Ultrason., Ferroelect., Freq. Cont.*, vol. 35, No. 6, pp. 758–767, Nov. 1988.

J. P. Hamaker et al., "Image sharpness, Fourier optics, and redundant–spacing interferometry," *J. Opt. Soc. Am.*, vol. 67, No. 9, pp. 1122–1123, Aug. 1977.

J. A. Hileman et al., "Automated static correction," *Geophys. Prosp.*, vol. 16, pp. 326–358, 1968.

M. Hirama et al., "Imaging through an inhomogeneous layer by least–mean–square error fitting," *J. Acoust. Soc. Am.*, vol. 75, No. 4, Apr. 1984.

M. Ishiguro, "Phase error correction in multi–element radio interferometer by data processing," *Astron. Astrophys. Suppl. Ser.*, vol. 15, pp. 431–443, 1974.

R. C. Jennison, "A phase sensitive interferometer technique for the measurement of the Fourier transforms of spatial brightness distributions of small angular extent," *Mon. Not. R. Astron. Soc.*, vol. 118, No. 3, pp. 276–284, 1958.

(List continued on next page.)

*Primary Examiner*—Francis J. Jaworski
*Attorney, Agent, or Firm*—Sughrue, Mion, Zinn, Macpeak & Seas, PLLC

[57] ABSTRACT

A method for phase and/or amplitude aberration corrections in a pulse-echo imaging system. Common and point signals are collected and corrected for near field effect. Phase errors are measured. These errors are corrected in image forming process to improve lateral resolution in the image. Near field signal redundancy method is also used to correct amplitude aberrations caused by attenuation inhomogeneity in media and imaging system errors in a pulse-echo ultrasound imaging-system. The method includes an algorithm which measures transmission and reception phase aberration profiles separately, guaranteeing arbitrary linear term error in each profile having the same steering angle term, thus avoiding reception/transmission focuses being at different directions after correction. Also included are: simultaneous transmission methods for an array where each element uses a different frequency band or coding, and methods for aberration measurements for arrays with elements which are sensitive in a large angular range.

27 Claims, 24 Drawing Sheets

OTHER PUBLICATIONS

D. L. Liu et al., "About the application of the Van Cittert–Zernike theorem in ultrasonic imaging," *IEEE Trans. Ultrason., Ferroelectr., Freq. Cont.*, vol. 42, No. 4, pp. 590–601, Jul. 1995.

H. R. Mallart et al., "The Van Cittert–Zernike theorem in pulse echo measurements," *J. Acoust. Soc. Am.*, vol. 90, No. 50, pp. 2718–2727, Nov. 1991.

R. A. Muller et al., "Real–time correction of atmospherically degraded telescope images through image sharpening," *J. Opt. Soc. Am.*, vol. 64, No. 9, pp. 1200–1209, Sep. 1974.

L. Nock et al., "Phase aberration correction in medical ultrasound using speckle brightness as a quality factor," *J. Acoust. Soc. Am.*, vol. 85, No. 5, pp. 1819–1833, May 1989.

M. O'Donnell et al., "Phase–aberration correction using signals from point reflectors and diffused scatterers: Measurement," *IEEE Trans Ultrason., Ferroelect., Freq. Cont.*, vol. 35, No. 6, pp. 768–774, Nov. 1988.

D. Rachlin, "Direct estimation of aberration delays in pulse–echo image systems," *J. Acoust Soc. Am.*, vol. 88, No. 1, pp. 191–198, Jul. 1990.

B. D. Steinberg, "Microwave imaging of aircraft," *Proc. IEEE*, vol. 76, No. 12, pp. 1578–1592, Dec. 1988.

M. T. Taner et al., "Estimation and correction of near–surface time anomalies," *Geophys.*, vol. 39, No. 4, pp. 442–463, Aug. 1974.

W. F. Walker et al., "Speckle coherence and implications for adaptive imaging," *J. Acoust. Soc. Am.*, vol. 101, No. 4, pp. 1847–1858, Apr. 1997.

O. Yilmaz, "Seismic data processing," *Society of Exploration Geophysicists*, ch. 3, 1987.

U.S. PATENT DOCUMENTS

| Number | Date | Inventor | Class |
|---|---|---|---|
| 4,835,689 | 5/1989 | O'Donnell . | |
| 4,852,577 | 8/1989 | Smith et al. . | |
| 4,989,143 | 1/1991 | O'Donnell et al. . | |
| 5,092,336 | 3/1992 | Fink . | |
| 5,172,343 | 12/1992 | O'Donnell | 600/447 |
| 5,184,623 | 2/1993 | Mallart . | |
| 5,268,876 | 12/1993 | Rachlin | 600/447 |
| 5,331,964 | 7/1994 | Trahey et al. | 600/443 |
| 5,357,962 | 10/1994 | Green | 600/443 |
| 5,388,461 | 2/1995 | Rigby . | |
| 5,423,318 | 6/1995 | Li et al. | 600/447 |
| 5,460,180 | 10/1995 | Klepper et al. | 600/447 |
| 5,487,306 | 1/1996 | Fortes | 600/443 |
| 5,531,117 | 7/1996 | Fortes | 600/447 |
| 5,551,433 | 9/1996 | Wright et al. | 600/443 |
| 5,566,675 | 10/1996 | Li et al. | 600/447 |
| 5,673,699 | 10/1997 | Trahey et al. | 600/447 |

PHASE AND/OR AMPLITUDE ABERRATION CORRECTION FOR IMAGING

This application is a 371 of PCT/AO96/00031 filed Jan. 23, 1996.

TECHNICAL FIELD

This invention relates to coherent imaging systems, such as ultrasound pulse-echo imaging systems, and, more particularly, it relates to a method of phase and amplitude aberration correction. Use of this invention will enable a significant improvement of image quality. It can also be used for measurement accuracy improvement in media, such as attenuation, velocity, and blood flow velocity.

BACKGROUND OF THE INVENTION

The ultrasound pulse-echo technique is widely used in medical imaging. This imaging method currently uses an array of transducer elements to transmit a focused beam into the body, and each element then becomes a receiver to collect the echoes. The received echoes from each element are dynamically focused to form an image. Focusing on transmission and on reception is done assuming that the velocity inside the body is uniform, and is usually assumed to be 1540 ms$^{-1}$. Unfortunately, the velocity inside the body is not constant; it varies from 1470 ms$^{-1}$ in fat to greater than 1600 ms$^{-1}$ in some other tissues, such as collagen, and 1540 ms$^{-1}$ is therefore an approximation. This variation will result in increased side lobes and degraded lateral resolution. Aberration phenomena and their extent in tissue have been evaluated in many works. The degradation is tolerable if the frequency is not very high and the aperture is not very large. Recently, however, higher frequencies and larger apertures have been used to improve lateral resolution of ultrasound images. But the resolution improvement can not be achieved beyond a certain limit, because both larger aperture and higher frequency make the system more sensitive to propagation velocity variations in the body. It is therefore one of the major difficulties in improving lateral resolution of ultrasound imaging systems.

Methods have been developed to correct aberrations in such areas as atmospheric effects in astronomical imaging, antenna-position errors in radar and microwave imaging, weathered-layer-effect in seismic imaging, and subcutaneous body layers effects in medical ultrasound imaging. Some of these methods use the wavefront from a special target such as a dominant point target or a spectacular reflecting plane, to measure the phase-aberration profile. Some methods measure the phase-aberration profile using signals from arbitrary target distributions, and signal redundancy is the basic principle behind these methods. Even though the signal redundancy principle has been successfully used in astronomical imaging to correct aberrations introduced by atmospheric turbulence, its application in medical ultrasound imaging systems has achieved only moderate success because the near-field effect has not been analysed in sufficient detail.

Amplitude aberrations in ultrasound medical imaging have also been previously reported, particularly for imaging complex tissue structures such as the female breast. Amplitude aberration will influence the quality of images, even though it is perhaps not as important as phase. In some cases, amplitude aberration correction is needed in addition to phase aberration correction to obtain a good image. The present invention seeks to also incorporate an amplitude aberration correction with the phase aberration correction algorithm.

Review of Aberration Correction Methods

Astronomical imaging systems are passive and incoherent. Phase and amplitude aberrations caused by the atmosphere make it difficult to achieve diffraction-limited resolution on the ground. A widely used aberration-correction method is the direct wavefront measurement method. This is used when there is a dominant bright star either present or artificially created [R. K. Tyson, "Principle of adaptive optics." Academic Press, ch. 5, 1991]. A plane wavefront at the aperture should be observed since the dominant point target is in the far field of the imagine aperture. Any departure from a plane wavefront is caused by phase aberration. Many methods can be used to measure a wavefront, one of which is the interferometer wavefront sensing method. After measuring the wavefront, the next step is to separate the phase-aberration profile across the aperture from the non-aberrated wavefront. This is not a simple task because the target angle is generally unknown. Fortunately, for a target in the far field, such separation is not necessary since the error of the assumed target angle causes a shift of the image position only and has no effect on focusing, the phases need only to be adjusted so that the wavefront from the dominant target is a plane wave.

Methods using signals received from arbitrary target distributions have also been developed in astronomical imaging. These include maximum-sharpness [R. A. Muller and A. Buffington, "Real-time correction of atmospherically degraded telescope images through image sharpening," J. Opt. Soc. Am., vol. 64, no. 9, pp. 1200–1209, September 1974] [A. Buffington, F. S. Crawford, R. A. Muller, A. J. Schwemin, and R. G. Smits, "Correction of atmospheric distortion with an image-sharpening telescope," J. Opt Soc. Am., vol. 67, no. 3, pp. 298–303, March 1977] and redundant-spacing interferometer [R. C. Jennison, "A phase sensitive interferometer technique for the measurement of the Fourier transforms of spatial brightness distributions of small angular extent," Mon. Not. R. Astron. Soc., vol. 118, no. 3, pp. 276–284, 1958 [M: Ishiguro, "Phase error correction in multi-element radio interferometer by data processing," Astron. Astrophys. Suppl. Ser., vol. 15, pp. 431–443, 1974] methods. Hamaker et al. [J. P. Hamaker, J. D. O'Sullivan, and J. E. Noordam, "Image sharpness, Fourier optics, an redundant-spacing interferometry," J. Opt. Soc. Am., vol. 67, no. 9, pp. 1122–1123, August 1977] pointed out that these methods are all based on the same fundamental principle: signal redundancy. When the target distribution is complex, there is no prior knowledge about the wavefront shape without phase aberrations. Therefore, the aberration profile can not be separated directly from the unaberrated wavefront in the measured wavefront. In this case, fortunately, the signal redundancy principle makes the separation unnecessary. The redundant-spacing interferometer method does not measure the wavefront but the phase difference between redundant signals, and then directly derives the phase-aberration profile across the array. The result also contains an arbitrary steering angle which has no effect on focusing. The maximum-sharpness method uses a trial-and-error method to adjust each antenna's phase. When an indicator is maximised, the system is in focus. This method is also based on the signal redundancy principle. When the redundant signals are in phase, they sum coherently and the indicators will be maximised. The signal redundancy principle for targets in the far field will be reviewed in detail hereinafter.

Phase-aberration correction methods have also been developed for active (pulse-echo), coherent and near-field imaging systems such as radar, microwave, ultrasonic and seismic systems. When there is a dominant point target in the near-field, the first step is again to measure the arrival wavefront from the target. Nearest neighbour cross-correlation and indicator (maximum sharpness) methods have been use. The next step is to separate the aberration profile from the unaberrated wavefront, which should be spherical. Without knowing the position of the dominant point target, the phase-aberration profile can only be obtained by estimating the target locations. The error in the estimated aberration profile because of the wrongly assumed target position will cause de-focusing in the near-field case. The image at the dominant point target will still be well focused (at the wrong position) if this inaccurate aberration profile is used to do the correction, since the two errors cancel each other at that position. But, when moving away from that point, the correction will become increasingly inaccurate. This correction is therefore only valid in a region around the dominant target. The size of the region depends on the distance from the target to the aperture, the size of the aperture, and the accuracy of the estimated target position. It can be much smaller than the isoplanatic patch defined as the region where the phase-aberration value is a constant, if the focusing quality is too poor before phase-aberration correction to estimate the dominant point target position with adequate accuracy. Therefore, aberration correction in the near-field may have problems even when a dominant point target is available. In some situations, such as forming an image around the dominant target only [B. D. Steinberg, "Microwave imaging of aircraft," Proc. IEEE, vol. 76. no. 12, pp. 1578–1592. December 1988], estimating the dominant target position accurately is not so important. On the other hand, it is unusual to have a dominant point target in every isoplanatic patch, or even in the entire image, in medical ultrasonic imaging.

Techniques have also been developed which use signals from randomly distributed scatterers that generate speckle in an image to measure the wavefront. In the correlation method [M. O'Donnell and S. W. Flax, "Phase-aberration correction using signals from point reflectors and diffused scatterers: measurement," IEEE Trans. Ultrason., Ferroelect., Freq. Cont., vol. 35, no. 6, pp. 768–774, November 1988], a focused beam is transmitted. If the transmitted beam is perfectly focused on a point, the reflections from the small focal spot mimic a dominant point target. The reflected wavefront can be measured, and the phase-aberration profile can be derived if the position of the focus point is known. But, since the array has only a finite aperture size, and the phase aberration is not yet known, the transmitted beam will not be perfectly focused and its pattern is not known. This pattern will result in signals received at different elements to be different (The Van Cittert-Zernike theorem has been used to predict the differences [H. R. Mallart and M. Fink, "The Van Cittert-Zernike theorem in pulse echo measurements," J. Acoust. Soc. Am., vol. 90, no. 50, pp. 2718–2727, November 1991] [D. L. Liu and R. C. Waag, "About the application of the Van Cittert-Zernike theorem in ultrasonic imaging," IEEE Trans. Ultrason., Ferroelect., Freq. Cont, vol. 42, no. 4, pp. 590–601, July 1995].) This difference will introduce an additional phase distribution across the array on top of phase distributions produced by a point target and phase aberrations. These three components mixed together make it very difficult to measure the phase-aberration profile accurately. From another point of view, the phase-aberration values associated with each element are mixed together in the transmitted beam and it is difficult to measure them separately using the received signals.

The indicator method has also been used in a speckle-generating region in near-field imaging systems. The indicator(maximum sharpness) method was developed for optical astronomy [R. A. Muller and A. Buffington, "Real-time correction of atmospherically degraded telescope images through image sharpening," J. Opt. Soc. Am., vol. 64, no. 9, pp. 1200–1209, September 1974] [A. Buffington, F. S. Crawford, R. A. Muller, A. J. Schwemin, and R. G. Smits. "Correction of atmospheric distortion with an image-sharpening telescope." J. Opt. Soc. Am., vol. 67. no. 3, pp. 298–303, March 1977].

When redundant signals are in phase with one another, the indicator is maximized. It is the intensity-sensitive recorder that generates the necessary cross-correlation process between signals coming from different locations on the lens aperture to produce redundant signals in a passive imaging system. Phases of redundant signals are difficult to compare directly for a lens system. A trial-and-error method has to be used with a deformable lens to focus the image by maximizing an indicator, this is time consuming and it may not converge to the right position. On the other hand, in a very large baseline, radio astronomy imaging system, phases of redundant signals can be compared directly. It is more reliable than the indicator method to measure phase-aberration values related to each element. In ultrasonic imaging, radio-frequency signals can be collected and their phases can be compared directly. Therefore, direct-phase difference measurement between redundant signals should be used. The inventor herein shows that in the near field, common midpoint signals, which are redundant for active far-field imaging systems, are no longer identical. Therefore, the indicator method, as well as the signal redundancy method, using the whole aperture, generally can not be used. The inventor has herein proposed a near-field signal redundancy algorithm is proposed and tested.

In seismic imaging, a phase-aberration correction (surface-consistent residual static correction) method using signals coming from a specular reflecting plane has been developed to correct the phase aberration caused by weathered layers near the ground surface. The specular reflecting plane is a special kind of target. It is similar to a dominant point target in that every element receives a dominant echo from it. The difference is that the position of the reflecting point is different for different transmitter or receiver positions. The non-aberrated arrival wavefront from a specular reflecting plane depends on the angle of the plane and the propagation velocity between the plane and the array. Common receiver, common transmitters and common midpoint signals can be used for the measurement. Common midpoint signals are generally preferred because of several advantages such as small residual normal-move-out components and insensitivity to the angle of the reflecting plane [J. A. Hileman P. Embree, and J. C. Pflueger. "Automated static correction." Geophys. Prosp., vol. 16, pp. 326–358, 1968]. It should be noted that even though common midpoint signals are redundant signals for far-field targets in an active imaging system (discussed later), they are not redundant when there is a specular reflecting plane in the near field, because the position of the reflecting point is different for different transmitter or receiver positions. The seismic method is not a signal redundancy method. A signal redundancy method measures the phase-aberration profile directly. The seismic method measures the arrival wavefront from a specular reflecting plane first, then separates the aberrated and the non-aberrated wavefronts. A least-mean-square error fitting method, which uses the complete data set, has also been developed to measure the phase-aberration profile and form an optimally stacked section image in seismic imaging, which measures the phase-aberration profiles, the velocity above the plane, and the angle of the plane together [M. T. Taner, F. Koehler, and K. A. Alhilali. "Estimation and correction of near-surface time anomalies," Geophys., vol. 39, no. 4, pp. 442–463, August 1974]. This method could be used to estimate the dominant point target position as well as the phase-aberration profiles in the dominant point target case, when tang into account that the position of the reflecting point is unchanged when the transmitter or the receiver position changes.

A least-mean-square error-fitting method has also been developed in ultrasonic imaging [M. Hirama and. T. Sato, "Imaging through an inhomogeneous layer by least-mean-square error fitting," J. Acoust. Soc. Am. vol. 75, no 4, April 1984] to form an image of targets on a plane parallel to the transducer array surface through an inhomogeneous layer. The method uses the complete signal set to build an overdetermined equation group which has sufficient equations to estimate the spatial frequency components of the target plane and the aberration profiles across the array. The technique requires the area of the target to be small; when the system is in the signal zone, only an approximated image can be obtained. The method will not apply to targets that extend in range. A least-mean-square error-fitting method using the signal redundancy principle to measure the phase-aberration profile directly, has also developed [D. Rachlin, "Direct estimation of aberration delays in pulse-echo image Systems," J. Acoust. Soc. Am. vol. 88, no. 1, July 1990]. Basically, it is a far-field signal redundancy technique and does not adequately address the near-field effect In medical ultrasound imaging, dominant points, specular reflecting planes, and large area of uniformly distributed speckle-generating target distributions are unlikely to be found in every isoplanatic patch. The signal redundancy method, which relies very little on target distributions, seems attractive. But, before it can be used in medical ultrasound imaging systems, the near-field effect has to be considered. First, however, the signal redundancy principle for targets in the far-field will be reviewed.

Signal Redundancy Principle in the Far Field

When a sensor array with many small aperture sensors is used to synthesize a larger aperture, it is possible to collect identical signals using different sensors from arbitrary target distributions. These signals are called redundant signals. In a passive array-imaging system, the cross-correlation functions between any two signals received from elements separated by the same distance (off-set) are identical if targets are in the far field and spatially incoherent, as shown in FIG. 1. This is because cross-correlation functions between signals from different sources vanish as a result of incoherence, and the cross-correlation functions between signals from the same source are identical because the phase shift is the same. Phase-aberrations will change the relative positions of these identical cross-correlation functions, and corrections can be derived from the relative time shift between them.

A similar result occurs for an active array-imaging system, such as an ultrasound synthetic aperture imaging system using an array. The received signals are identical for arbitrary jet distributions if the middle point position of the transmitter and the receiver is the same, and targets are in the far field as shown in FIG. 2. This is because the distance from a to b is equal to the distance from C to d at all angles.

The above signal redundancy principle is valid for continuous waves as well as for wide-band signals. It is valid generally for arbitrary target distributions provided that targets are in the far field and the medium is homogenous. The signal redundancy property of common offset signals in passive imaging systems results in the effective aperture being based on cross-correlations between transmission and reception apertures. The signal redundancy property of common midpoint signals in active imaging systems results in the effective aperture being based on convolutions between transmission and reception apertures.

When the propagation velocity in a medium is inhomogeneous, phase aberrations are introduced. If the phase aberration caused by velocity inhomogeneity can be modelled as a phase screen on the aperture, these redundant signals will still have the same shape, but will be shifted according to the phase aberration experienced by each signal. The phase-aberration profile across the array can be measured from the relative time shift between these redundant signals.

SUMMARY OF THE INVENTION

The present invention seeks to provide a system and method and to generate high resolution ultrasound echography images by correcting phase and/or amplitude aberrations.

In one broad form, the present invention provides a method of generating high resolution ultrasound images by using a near field signal redundancy method to correct phase and/or amplitude aberrations.

In a further broad form, the present invention provides a method of generating high resolution ultrasound echography images comprising the steps:

obtaining signals from a plurality of transmitter-receiving elements;

dynamically correcting specific signals for near field effect;

cross-correlating said signals at predetermined depth and window length;

measuring phase difference between said signals from peak positions of cross correlation functions;

solving linear equations to derive phase aberration values for each element iteratively adjusting undetermined linear terms for optional performance of said method.

In a further broad form, the present invention provides a method of generating high resolution ultrasound images, comprising the steps of:

obtaining signals from a plurality of transmitter-receiving elements;

measuring the energy ratio of pairs of signals; and, solving of linear equations to determine amplitude aberration value for each element.

In a further broad form, the present invention provides a method for generating high resolution ultrasound echography images, comprising the steps of:

obtaining signals from a plurality of transducer elements;

dynamically correcting specific signals for near field effect;

measuring the energy ratio of pairs of signals;

calculating the ratio of the signal energy of the two redundant signals at the peak positions;

solving linear equations to derive amplitude aberration on values for each element;

adjusting arbitrary linear term for optimal performance of said method.

Preferably, a relatively low sampling rate is used when obtaining said signals.

Also preferably, demodulated signals may be used.

In a further broad form, the present invention provides a method of obtaining high resolution ultrasound images, comprising the steps of:

obtaining signals from a plurality of transmitter-receiver elements;

dynamically correcting said signals for near-field effects;

cross-correlating said signals;

measuring phase differences and energy ratios between said signals at peak positions of said cross-correlation functions;

solving linear equations to derive phase and amplitude aberration values for each element; and iteratively adjusting undetermined linear terms for optimal performance.

Preferably, said signals from said plurality of transmitter receiver elements are obtained simultaneously by utilising different codings, frequency bands, random delay patterns, etc., and then selectively decoding, filtering and/or the like.

In a preferred form, the selection of codings, frequency bands, random delay patterns and/or the like is chosen to reduce cross-talk effects and the like.

A preferred embodiment is wherein similar signals are transmitted simultaneously from different elements at spaced apart locations.

In various preferred arrangements said near field correction is performed in time domain, frequency domain, or utilising other transformations.

Preferably said dynamic near field correction is carried out at a plurality of velocities and/or directions, and optionally averaged prior to crossing said signals.

In a preferred embodiment under severe aberration conditions, an estimated phase aberration profile is initially estimated, and used in the dynamic near field correction.

Preferably for improved lateral resolution in a specific area, dynamic near field correction is performed in a direction towards that area.

Preferably in said measuring step, a plurality of phase aberration profiles are measured to aid correction of the image.

In a preferred embodiment said dynamic near field correction is performed with high accuracy or sampling rate to satisfy:

$$\frac{\frac{\sigma_{N+1}}{2} + 1}{\sigma} = \sqrt{\frac{(N+1)}{48}(N^2 + 2N + 3)}$$

In a preferred form only the closest measured common midpoint signals are utilised.

Also, in a preferred form signals from only the elements involved in forming the relevant portion of the image are utilised for deriving the phase aberration profiles.

Preferably when transmission and reception phase aberration profiles are different but small and if cross correlation functions are symmetrical about their peak, then the two reciprocal signals are averaged before dynamic near field correction.

Preferably when transmission and reception phase aberration profiles are different but small, and if cross correlation functions are non-symmetrical, then the two cross correlation function peak positions for the two reciprocal signal positions are measured separately.

Also preferably, when transmission and reception phase aberration profiles are of large difference, another set of reciprocal signals are obtained to provide another set of equations.

In various preferred forms said adjusting undetermined linear terms is performed manually or automatically.

In a further broad form, the present invention provides a system for generating high resolution ultrasound echography images, comprising:

a plurality of transmitter-receiver elements to obtain signals;

means for dynamically correcting specific signals for near field effects;

means for cross-correlating said signals at predetermined depth and window length;

means for measuring phase difference between said signals from peak positions of cross correlation functions;

means for solving linear equations to derive phase aberration values for each element; and means for adjusting arbitrary linear terms to optimise performance of said system.

Preferably, the method of the invention said method is used to correct phase and amplitude aberrations for two or one and a half dimensional arrays.

Preferably, in said adjusting step, independent measurements from signals obtained from elements having a similar degree of similarity are averaged, by exchanging the roles of rows and columns forming said elements, to improve phase and/or amplitude aberration measurement accuracy.

Also preferably, for arrays with elements having a large angular responding range, a sub-array technique is used to measure phase aberration angular profiles for each element or sub-array.

In a preffered form, said sub-array technique is used to measure phase aberration angular profiles for each element or subarray towards a specific region of interest.

The method is preferably embodied, wherein the difference between differences of transmission and reception profiles of two neighbouring elements, generally caused by system errors and/or noise, is calibrated and used to determine the quality of other aberration measurements, such that, if the difference is large, the measurement result is abandoned.

Preferably, to reduce signal processing time, the calibration result is used directly to determine the transmission and reception aberration profiles.

BRIEF DESCRIPTION OF THE DRAWINGS

The invention of the present application will now be discussed in more detail with reference to the preferred embodiments of the device, given only by way of example, and with reference to the accompanying drawings in which:

FIG. 9a(a) showing the difference for several correction angles with $\delta R$=0 mm and $R_{cT}$=50 mm.

FIG. 9(b) showing it for several ranges with $\delta R$=0, $\theta$=90° and

FIG. 9(c) showing it for several ranges with $R_{cT}$=50 mm and $\theta_T$=$\theta_i$=90°;

DETAILED DESCRIPTION OF THE PREFERRED EMBODIMENT(S)

Signal Redundancy Principle in the Near Field

This invention relates to analysing the signal redundancy property for targets in the near field. It is shown in this section that, when targets are in the near-field, such as in medical ultrasonic imaging, the signal redundancy principle described above is no longer valid; even though the common midpoint signals are not exactly redundant for targets in the near-field, the differences between them for echoes coming from certain regions can be significantly reduced by a dynamic near-field correction. They can be considered as redundant within an error limit for signals coming from that region.

Figure 1:
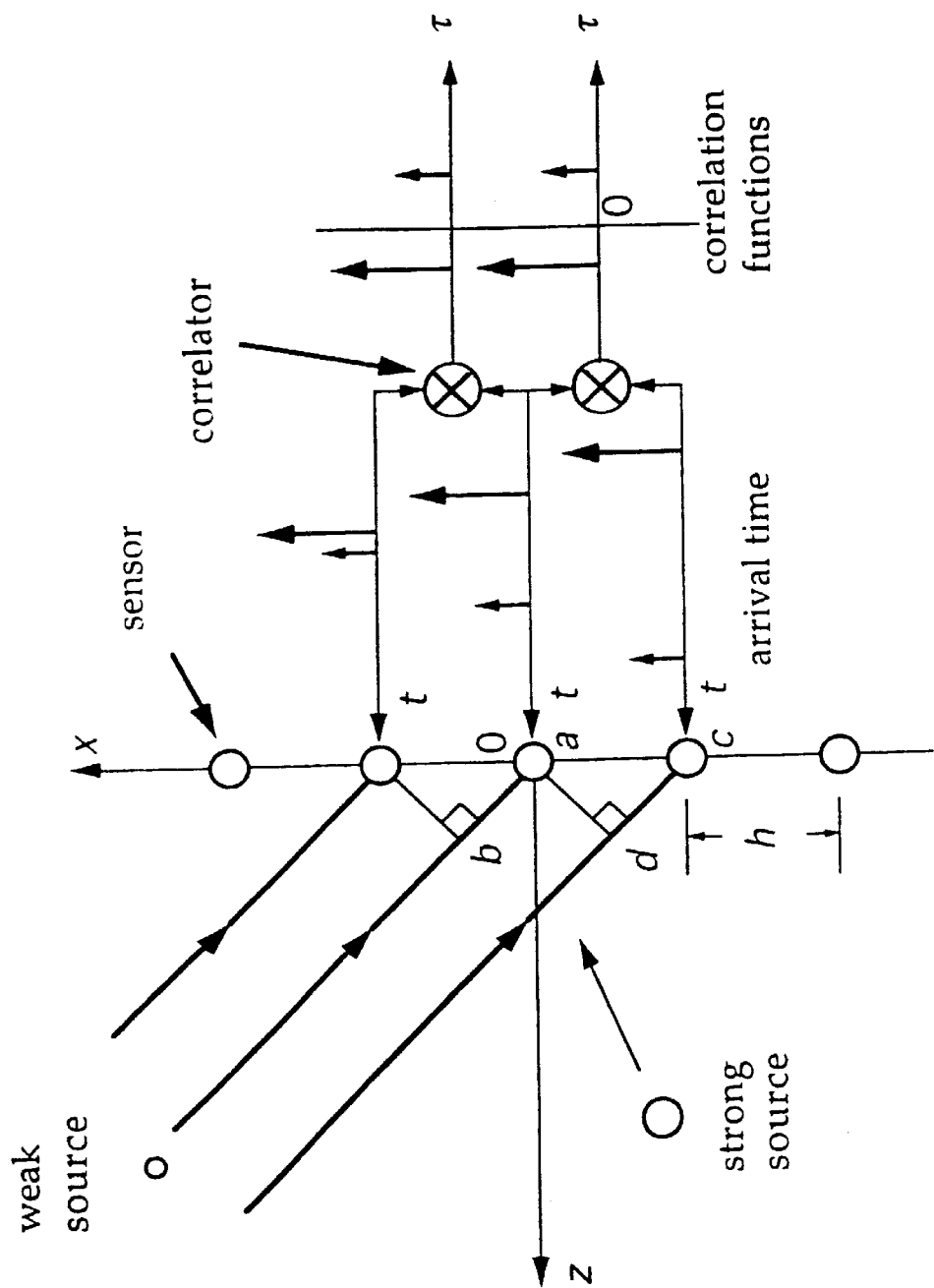
FIG. 1 illustrates the signal redundancy principle in the far field for a passive imaging system, wherein a weak source and a strong source are used as examples, and cross-correlation functions between common off-set signals are identical for arbitrary source distributions.
Figure 2:
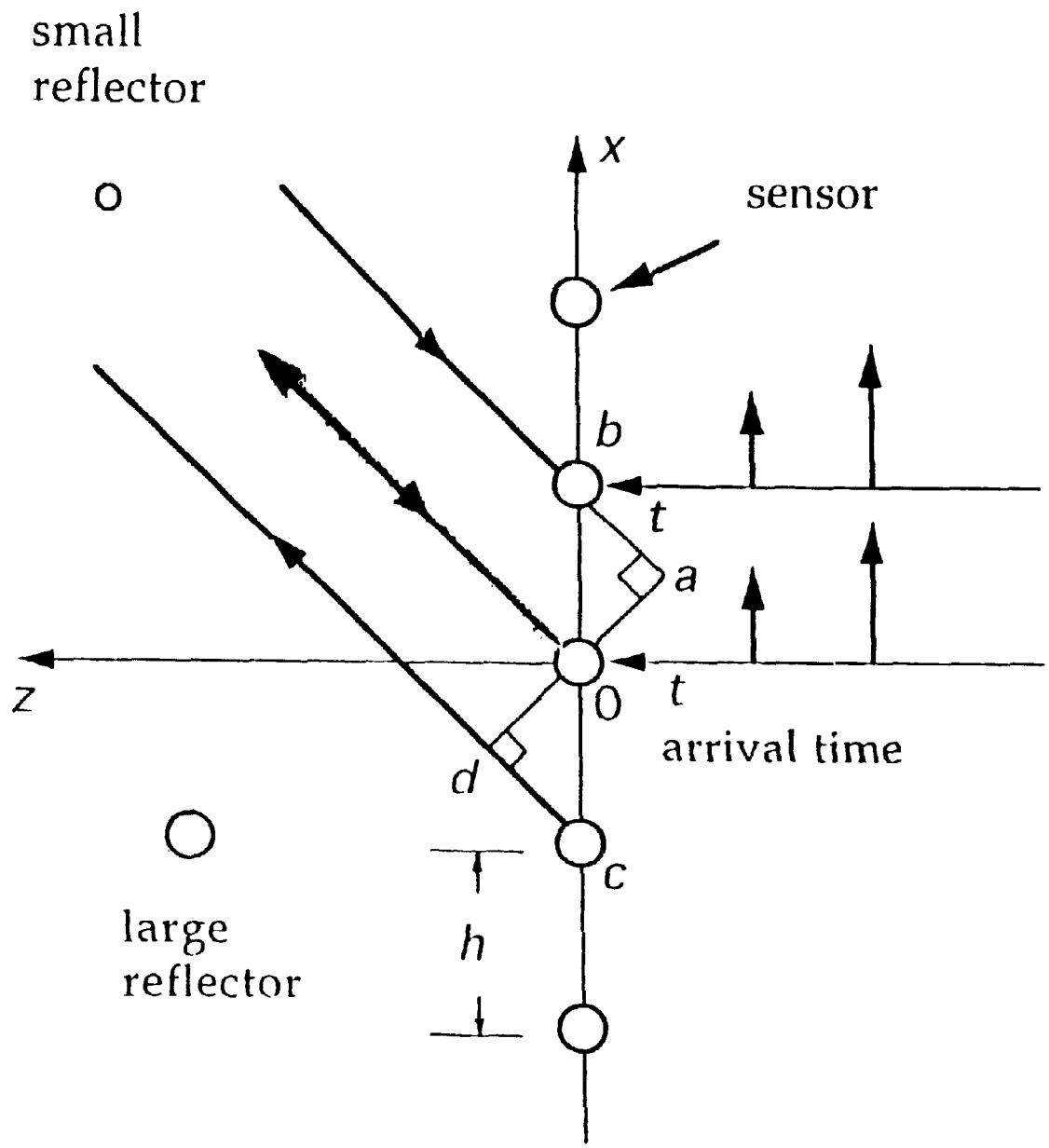
FIG. 2 illustrates the signal redundancy principle in the far field for an active imaging system, wherein a small reflector and a large reflector are used as examples, and wherein common midpoint signals are identical for arbitrary target distributions.
Figure 3:
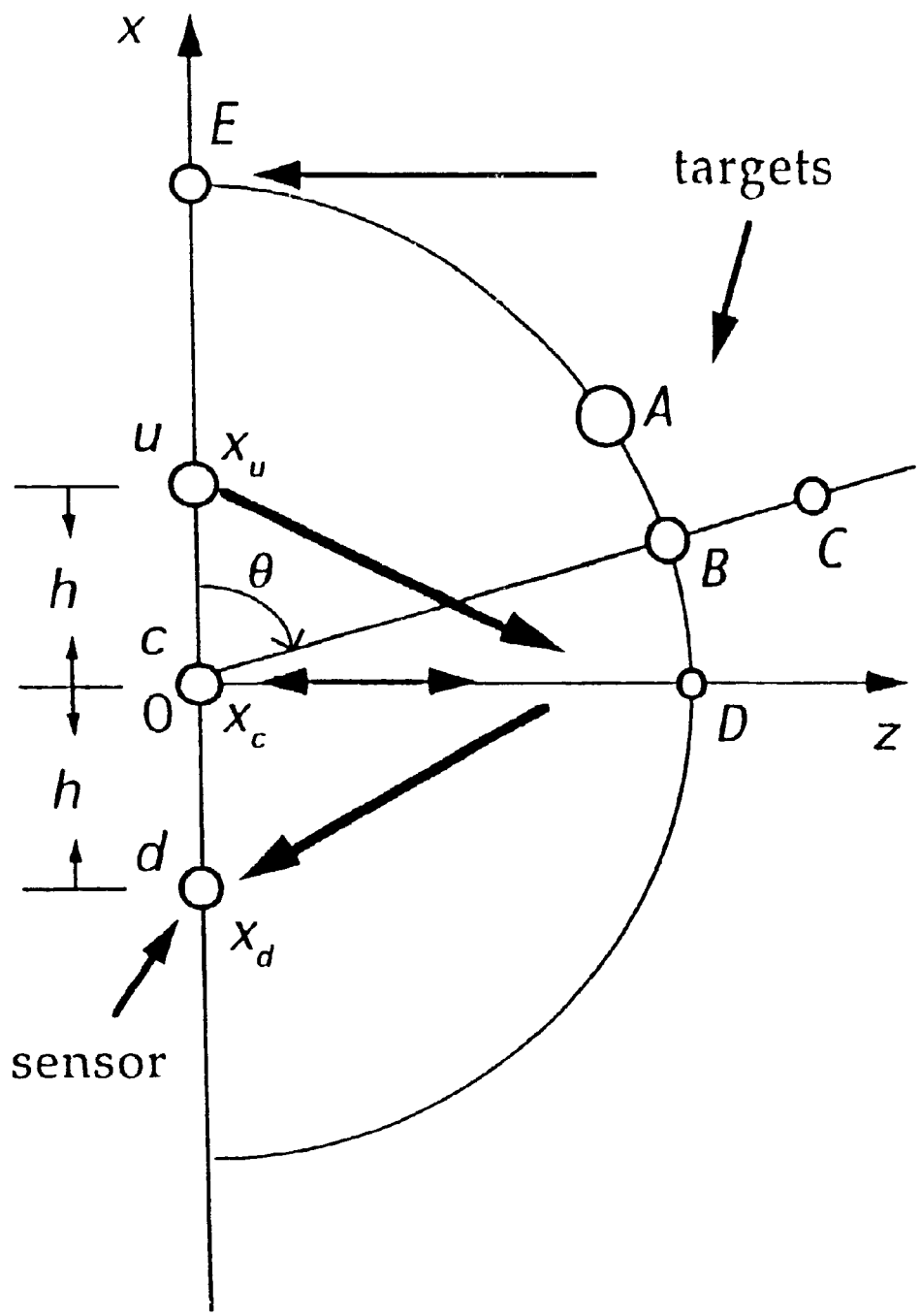
FIG. 3 shows an active imaging system with targets in the near-field, in accordance with the present invention.

To analyze the near-field signal redundancy principle for a pulse-echo imaging system a three-element array on the x-axis is considered, as shown in FIG. 3. The center element c is located at the origin $x_c$=0, and the upper element u and lower element d are located at $x_u$ and $x_d$ respectively. It is assumed that $x_u$=$-x_d$=h. Let y$_{ud}$(t) denote the received signal at element d when element u is the transmitter (the first index is the transmitter and the second is the receiver). y$_{ud}$(t) y$_{du}$(t) and y$_{cc}$(t) are common midpoint signals. y$_{ud}$(t) and y$_{du}$(t) are reciprocal signals, which should be identical even for targets in the near-field and inhomogeneous media.

Figure 4:
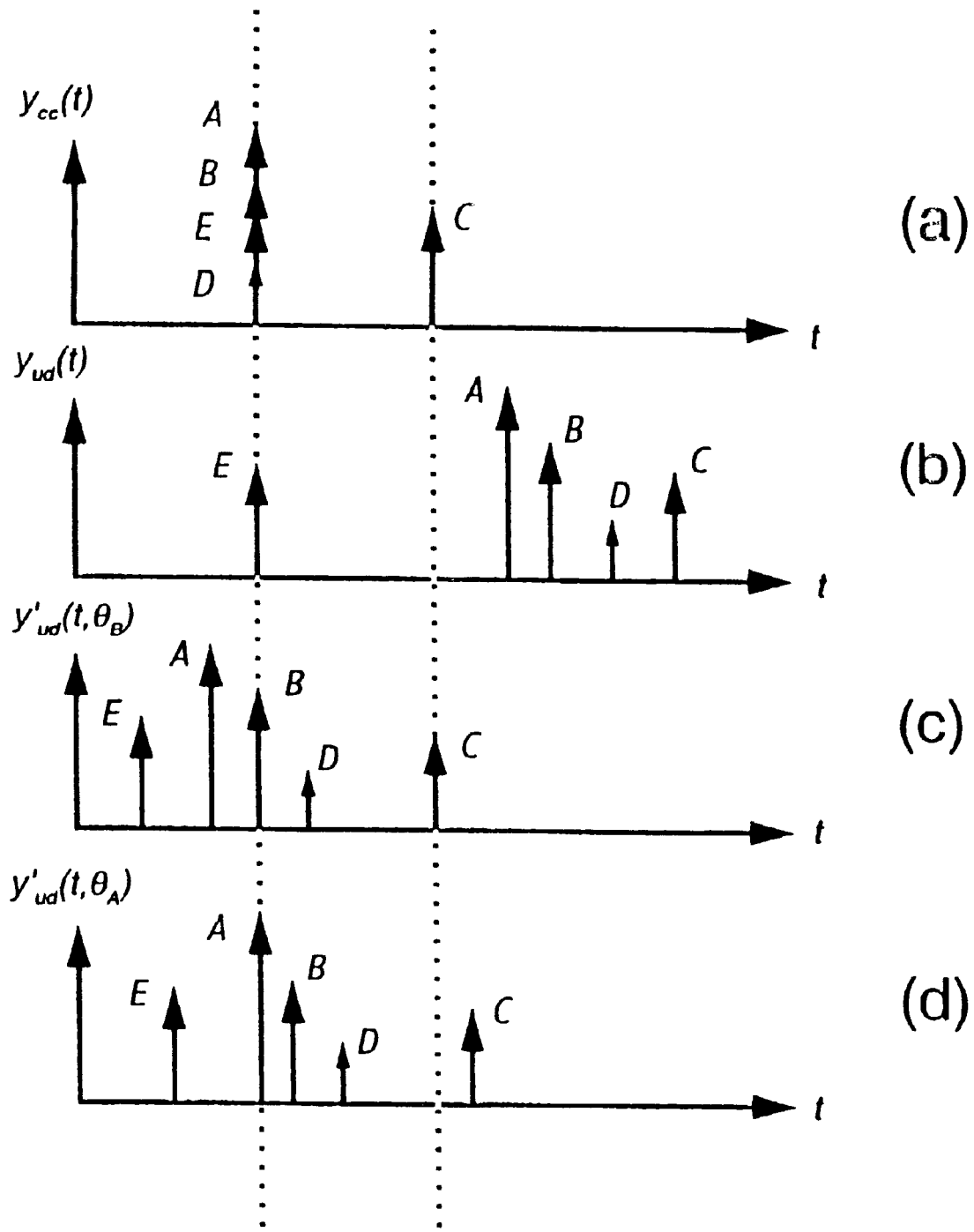
FIG. 4 illustrates the received and corrected signals when a delta-shaped pulse is transmitted and received for the geometry in FIG. 3, FIG. 4(*a*) showing the received signal $y_{cc}(t)$, FIG. 4(*b*) showing the received signal $y_{ud}(t)$, FIG. 4(c) showing the corrected signal y'$_{ud}$(t). The correction angle is at the target B direction, and FIG. 4(d) showing the corrected signal y'$_{ud}$(t), wherein the correction angle is at the target A direction.

Consider five targets located at A, B, C, D and E as shown in FIG. 3. Targets A, B, D and E are at the same distance from element c but at different angles. Target C is at the same angle as target B but at a different distance. First, assume that transmitted and received signals are delta shaped pulses. The received signal y$_{cc}$ is shown in FIG. 4(a). Echoes coming from targets A, B, D and E arrive at the same time. The received signal y$_{ud}$(t) is shown in FIG. 4(b). Even though y$_{cc}$(t) and y$_{cc}$(t) are common midpoint signals, the difference between them is evident. The echo from target E, which is located on the x-axis, is the only one at the same location in signals y$_{cc}$(t) and y$_{cc}$(t). Echo locations from other targets are different in the two common midpoint signals. The echo-location difference is larger for targets at angles nearer to the z-axis and at distances closer to the transducer elements. When the distance between the target and the aperture increases, the echo-location difference in y$_{cc}$(i) and y$_{ud}$(t) decreases, eventually becoming zero at infinite range, which is the far-field situation. The echo-location difference in y$_{cc}$(t) and y$_{ud}$(t) reaches its maximum value 2h/c$_0$. where c$_0$ is the wave propagation velocity in the medium, when the target is at the position of element c.

A dynamic near-field correction can be used to improve the similarity between y$_{cc}$(t) and y$_{ud}$(t) for echoes from the region around the z-axis of importance for imaging. This correction is to shift signals so that the peak of echoes coming from targets in a particular direction line up in the two common midpoint signals. It is the same as the shift process in the "shift-and-add" dynamic focus image-forming algorithm FIG. 4(c) shows the signal y'$_{ud}$(t), which is the corrected version of y$_{ud}$(t), with the correction angle in the direction of targets B and C. It can be seen that the positions of echoes coming from targets B and C in y'$_{ud}$(t) are the same as those in y$_{cc}$(t). That is, for echoes coming from these two targets, y$_{cc}$(t) and y'$_{ud}$(t) are redundant. But the positions of echoes from targets A, D and E in y'$_{ud}$(t) are different from that in y$_{cc}$(t). since these targets are not at the correction angle. The positions of the echoes coming from targets A and E are over-corrected in y'$_{ud}$(t), and the position of the echo coming from target D is under-corrected in y'$_{ud}$(t). Therefore, when the signal is corrected at an angle, the echoes coming from targets at other angles will not become redundant. FIG. 4(d) shows the corrected signal $y'_{ud}(t)$ at the angle of target A.

Figure 5:
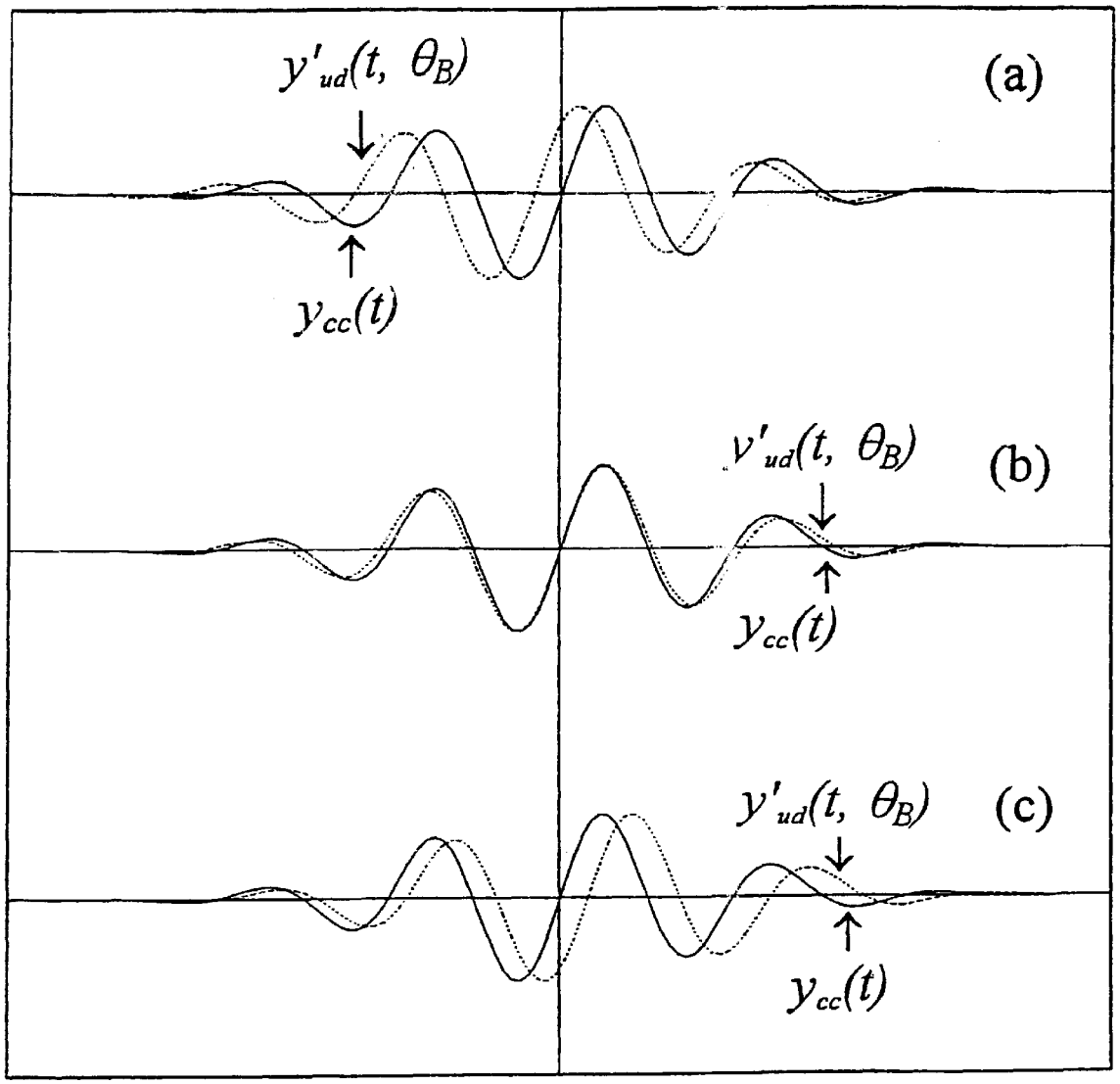
FIG. 5 shows the received and corrected signals when a finite length pulse is transmitted and received, when the correction is at the angle of target B, FIG. 5(a) showing echoes coming from target A, FIG. 5(b) showing echoes coming from target B, and, FIG. 5(c) showing echoes coming from target D.

A pulse with non-zero length will cause problems even for echoes coming from targets at the correction angle. For example to make the echo from target B identical in $y_{ud}(t)$ and $y_{cc}(t)$, the whole pulse has to be moved with the same correction as that for the peak of the pulse. But, since these echoes are overlapping, it is impossible to separate pulses from different depths (and angles) and move them separately. One can only do a dynamic correction as for a delta function pulse. This will stretch the echo since the leading part of an echo is always shifted forwards more than its trailing part. Therefore, for a pulse of finite length, the dynamically corrected common midpoint signals are not strictly identical even for echoes coming from targets at the correction angle; the longer the pulse the larger the difference. FIG. 5 compares echoes coming from targets A, B, and D separately in $y_{cc}(t)$ and $y'_{ud}(t)$. The correction was done at the angle of target B. It can be seen that the echo from target B in $y'_{ud}(t)$ is stretched compared to that in $y_{cc}(t)$, but their peaks are coincident (FIG. 5(b)). The echo from target A in $y'_{ud}(t)$ is stretched compared with that in $y_{cc}(t)$, and its peak is shifted forward because of over correction (FIG. 5(a)). The echo from target D in $y'_{ud}(t)$ is stretched and shifted backward because of under correction (FIG. 5(c)).

The above discussion has highlighted problems of signal redundancy in the near-field. Common midpoint signal will not become exactly redundant in the near-field. But, after a dynamic near-field correction, they will be more similar for echoes coming from the region of interest. Within a tolerable error, they can be regarded as redundant. The question is, given a pulse length and an acceptable error limit, in what angular range should targets be for their echoes to become redundant in common midpoint signals after a dynamic near-field correction? In the following analysis, a quantitative answer to this question will be derived.

In the following analysis, these assumptions are used: 1) the medium is homogenous; 2) targets are assumed to be weak point scatterers; and 3) transducer elements are points with omnidirectional response patterns.

Figure 6:
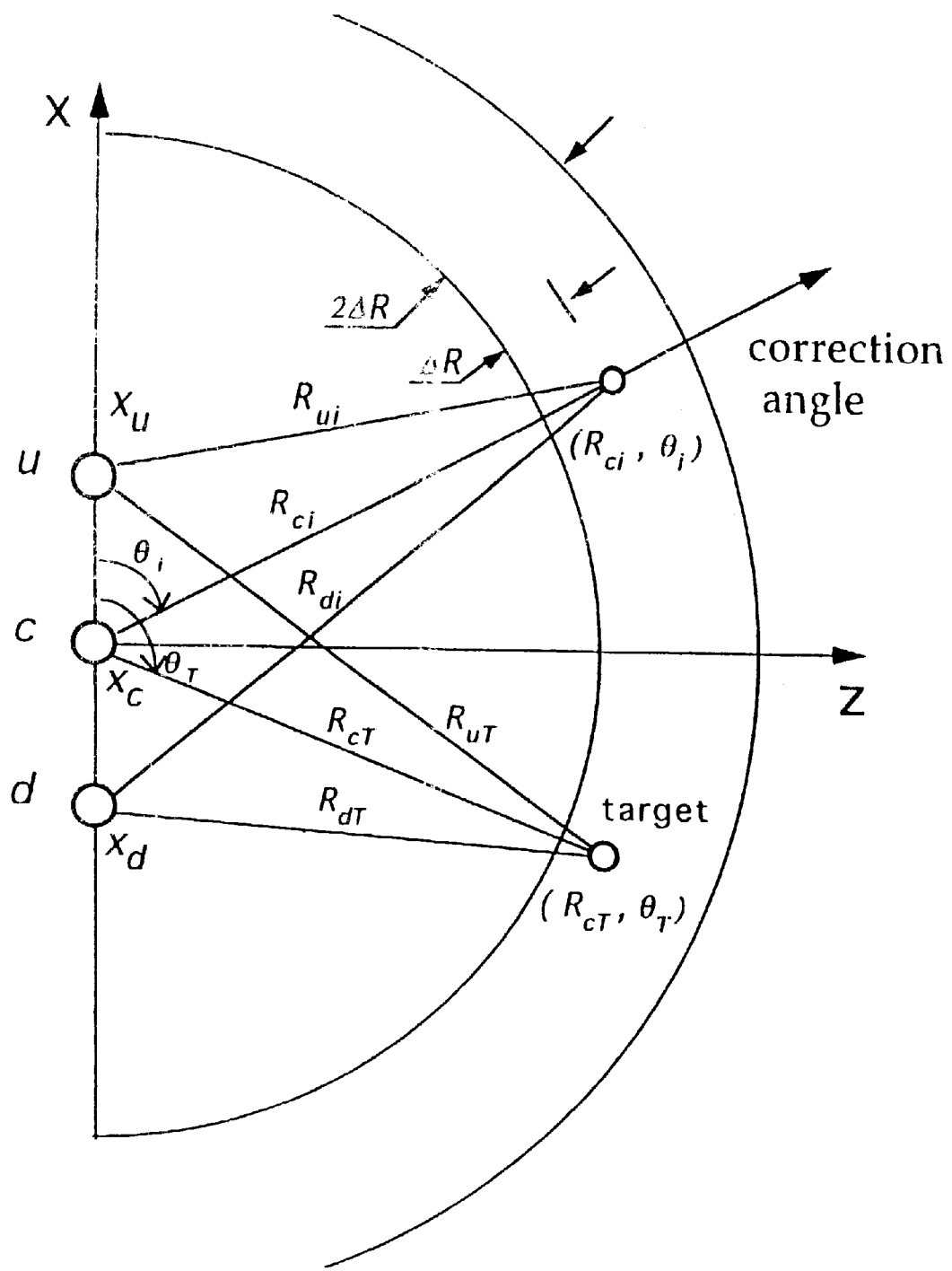
FIG. 6 depicts the geometry for the theoretical analysis.

A two-dimensional (2-D) analysis is sufficient since the results are independent on the other dimension because of symmetry about the x-axis as shown in FIG. 6. For simplicity, amplitude changes arising from the wave spreading effect and medium attenuation are ignored. The results requires only that they be ignored within one range-cell length which is generally true. The analysis will be done in the lime domain. Targets are assumed to be in the region of x>0 only. A three-element array is on the x-axis. Element c, u, and d are located at $x_c$, $x_u$, and $x_d$ respectively, where $x_c=0$, and $x_u=-x_d=h$.

Figure 7:
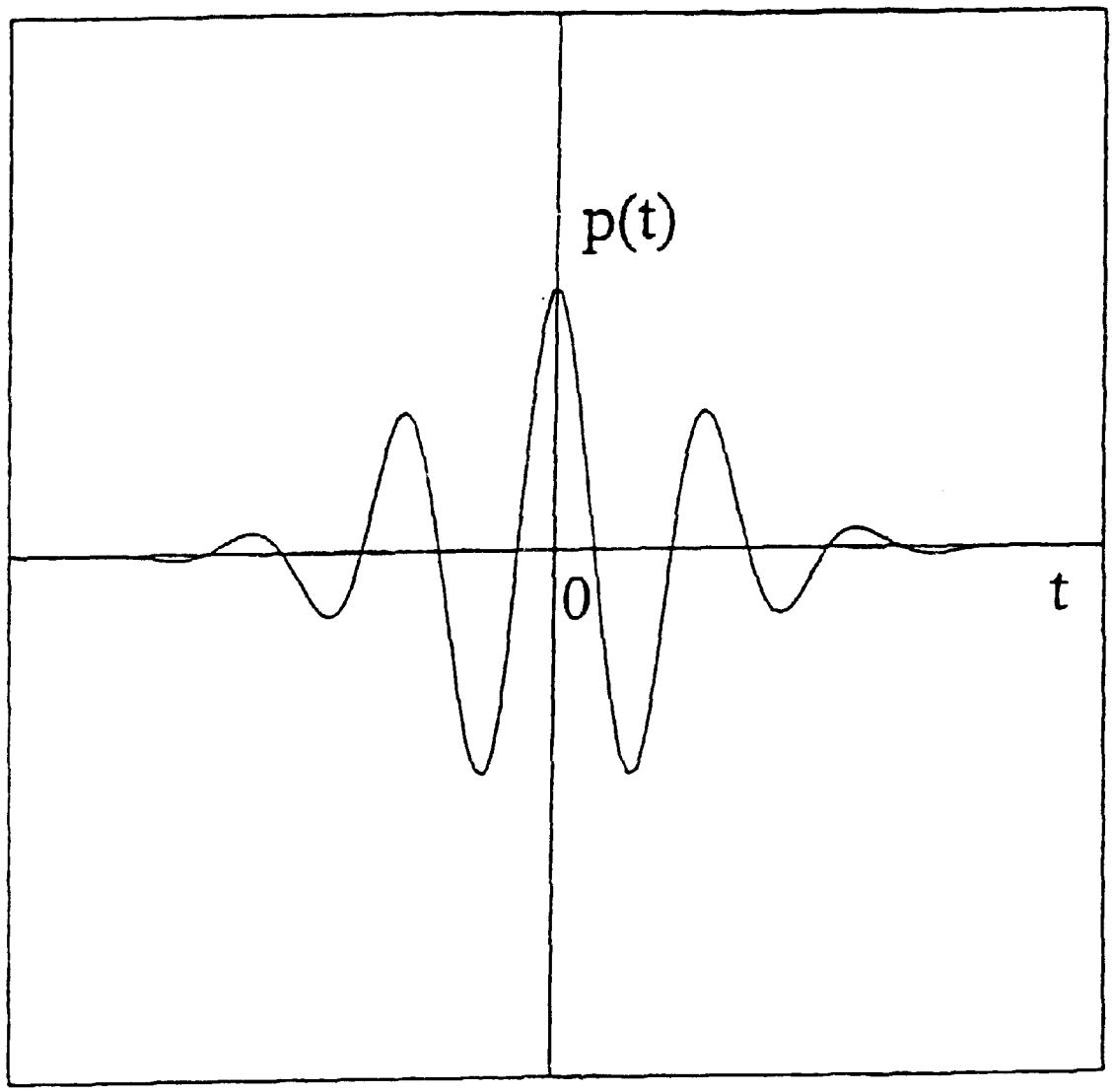
FIG. 7 illustrates an example of the transmitted and received pulse with its peak at t=0.

Assume that the reflectivity density function is $\rho(R_{cT},\theta_T)$, where $R_{cT}$ and $\theta_T$ are the target positions, as shown in FIG.6, and the transmitted pulse is p(t) with its peak at t=0, such as that shown in FIG. 7. The received signal $y_{cc}(t)$ is $$y_{cc}(t) = \int_0^\pi \int_0^\infty \rho(R_{cT}, \theta_T) p\left(t - \frac{R_{cT} + R_{cT}}{c_0}\right) d R_{cT} d\theta_T \quad (1)$$

and the received signal $y_{ud}(t)$ is $$y_{ud}(t) = \int_0^\pi \int_0^\infty \rho(R_{cT}, \theta_T) p\left(t - \frac{R_{cT} + R_{cT}}{c_0}\right) d R_{cT} d\theta_T \quad (2)$$

where:

$$R_{cT} = \sqrt{R_{cT}^2 + h^2 - 2R_{cT}h\cos(\theta_T)} \quad (3)$$

$$R_{cT} = \sqrt{R_{cT}^2 + h^2 + 2R_{cT}h\cos(\theta_T)} \quad (4)$$

and $c_0$ is the propagation velocity in the medium. If the echo from a target located at $(R_{ci},q_i)$ arrives in $y_{cc}(t)$ at time t, it arrives in $y_{ud}(t)$ at time $$t' = \sqrt{\left(\frac{t}{2}\right)^2 + \frac{h^2}{c_0^2} - t\frac{h}{c_0}\cos(\theta_i)} + \sqrt{\left(\frac{t}{2}\right)^2 + \frac{h^2}{c_0^2} + t\frac{h}{c_0}\cos(\theta_i)}. \quad (5)$$

This is the time-warping function for the dynamic near-field correction. Now, signal $y_{ud}(t)$ is corrected dynamically at angle $\theta_i$ to bring the peak of echoes coming from direction $\theta_i$ to the same position as that in $y_{cc}(t)$. The dynamically corrected signal $y'_{ud}(t)$ is $$y'_{ud}(t) = \quad (6)$$

$$y_{ud}\left(\sqrt{\left(\frac{t}{2}\right)^2 + \frac{h^2}{c_0^2} - t\frac{h}{c_0}\cos(\theta_i)} + \sqrt{\left(\frac{t}{2}\right)^2 + \frac{h^2}{c_0^2} + t\frac{h}{c_0}\cos(\theta_i)}\right) =$$

$$\int_0^\pi \int_0^\infty \rho(R_T, \theta_T) p\left(\sqrt{\left(\frac{t}{2}\right)^2 + \frac{h^2}{c_0^2} - t\frac{h}{c_0}\cos(\theta_i)} + \sqrt{\left(\frac{t}{2}\right)^2 + \frac{h^2}{c_0^2} + t\frac{h}{c_0}\cos(\theta_i)} - \frac{R_{wT} + R_{wT}}{c_0}\right) d R_T d\theta_t$$

This correction forces the echo peak from targets at direction $\theta_i$ to be at the same position in $y_{ud}(t)$ as that in $y_{cc}(t)$, but echoes in $y'_{ud}(t)$ are stretched. For echoes coming from other directions, they are not only stretched but shifted.

Assume that p(t) has a finite length and change the variable t to $2R_{ci}/c_0$, which is mapping the received signal at an element from a function of time to a function of range, equations (1) and (6) become:

$$y_{cc}\left(\frac{2R_{ci}}{c_0}\right) = \int_0^\pi \int_{R_{ci}-\Delta R}^{R_{ci}+\Delta R} \rho(R_{cT}, \theta_T) p\left(\frac{2R_{ci}}{c_0} - \frac{2R_{cT}}{c_0}\right) d R_{cT} d\theta_T \quad (7)$$

$$y'_{ud}\left(\frac{2R_{ci}}{c_0}\right) = \quad (8)$$

$$\int_0^\pi \int_{R_{ci}-\Delta R_2}^{R_{ci}+\Delta R_1} \rho(R_{cT}, \theta_T) p\left(\frac{R_{ui} + R_{di}}{c_0} - \frac{R_{uT} + R_{dT}}{c_0}\right) d R_{cT} d\theta_T$$

where $$R_{ui} = \sqrt{R_{ci}^2 + h^2 - 2R_{ci}h\cos(\theta_i)} \quad (9)$$

$$R_{ci} = \sqrt{R_{ci}^2 + h^2 + 2R_{ci}h\cos(\theta_i)}. \quad (10)$$

$\Delta R$ is one half of the length of the range cell from which echoes contribute to the signal at $t=2R_{ci}/c_0$ in $y_{cc}(t)$, as shown in FIG. 6. $\Delta R$ corresponds to one quarter of the pulse length. $\Delta R_1$ and $\Delta R_2$ define the range cell for signal $y'_{ud}(t)$. Since the transmitter and the receiver are located at different positions, the range-cell size and shape for signal $y'_{ud}(t)$ are not as simple as that for signal $y_{cc}(t)$. The values of $\Delta R_1$ and $\Delta R_2$ depend on h. $R_{ci}$ and $\theta_i$. It is a valid approximation for small h and large $R_{ci}$ values to assume that $$\Delta R_1 = \Delta R_2 = \Delta R. \tag{11}$$

This approximation has no significant effect on the results derived later, but it makes the expression much simpler. The range cell for signal $y'_{ud}(2R_{ci}/c_0)$, therefore, has the same size as that for $y_{cc}(2R_{ci}/c_0)$ after the approximation in equation (11).

To assess the difference between $y_{cc}(2R_{ci}/c_0)$, and $y'_{ud}(2R_{ci}/c_0)$, one can evaluate the difference between them for an individual echo from a scattering center at an arbitrary position $(R_{cT}/\theta_T)$. From equation (7) and (8), the received signals from a scatterer at $(R_{cT}/\theta_T)$ are $$y_{cc}\left(\frac{2R_{ci}}{c_0}\right) = p\left(\frac{2R_{ci}}{c_0} - \frac{2R_{cT}}{c_0}\right) \tag{12}$$

$$y'_{ud}\left(\frac{2R_{ci}}{c_0}\right) = p\left(\frac{R_{ui} + R_{di}}{c_0} - \frac{R_{uT} + R_{dT}}{c_0}\right) \tag{13}$$

Figure 8:
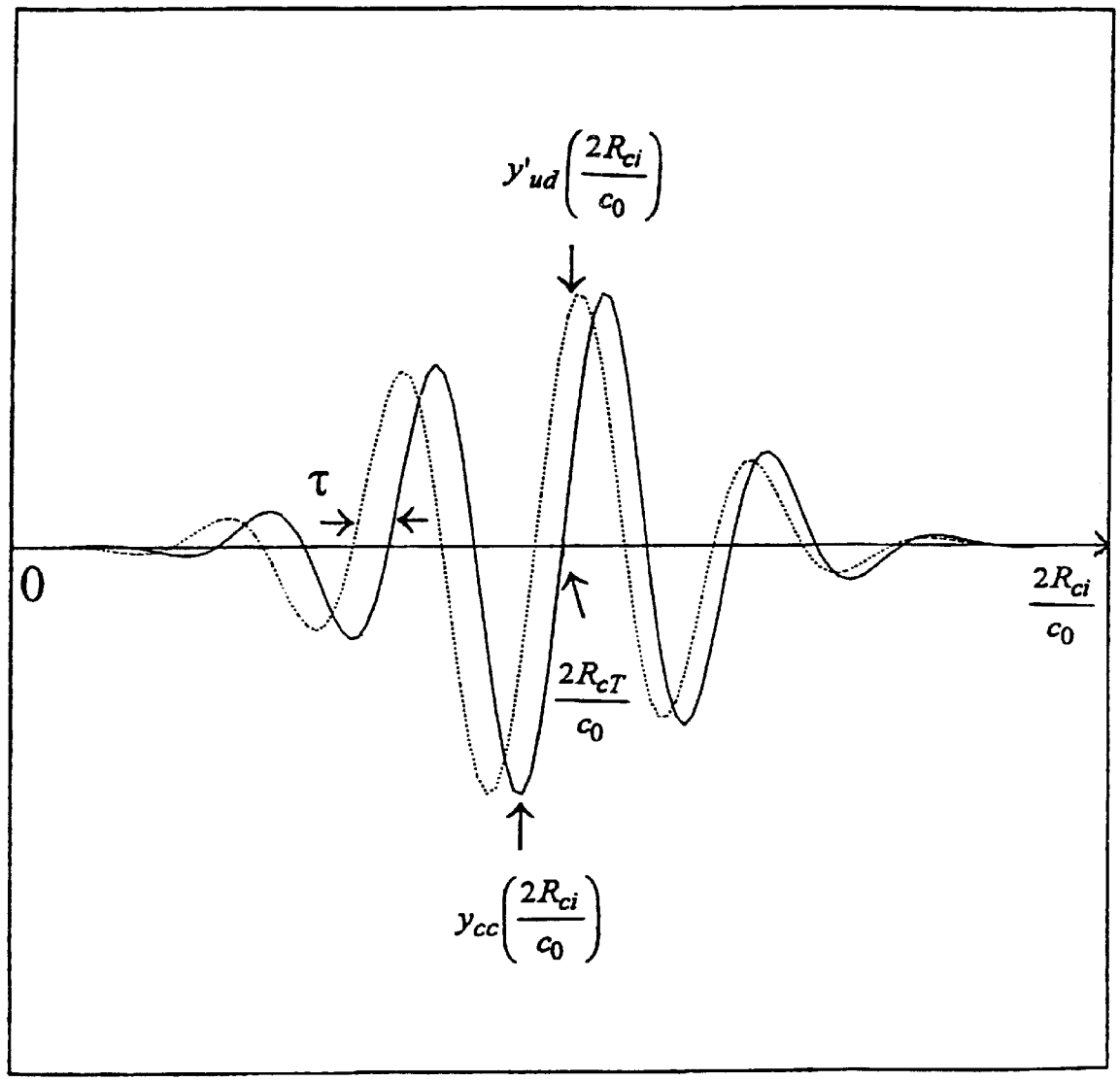
FIG. 8 shows the arrival time difference $\tau$ between the same part of the pulse in y$_{cc}$(t) and y'$_{ud}$(t)

For simplicity, the scattering coefficient is assumed to be unity. The echo shape in $y_{cc}(t)$ is exactly the same as the transmitted pulse $p(t)$, but it is delayed by $2R_{cT}/c_0$. The echo in $y'_{ud}(t)$ is stretched, as shown in FIG. 8. The stretch can be regarded as a time-dependent arrival change or phase shift. Then, the arrival-time difference $\tau$ between the two signal of (12) and (13) for the same part of the pulse is the difference between the terms inside the bracket on the right side of equations (12) and (13)

$$\tau = \frac{2(R_{ci} - R_{cT}) - (R_{ui} + R_{di} - R_{uT} - R_{dT})}{c_0}. \tag{14}$$

Positive $\tau$ value means that the received echo m signal $y_{cc}(t)$ is ahead of the same part of the echo in signal $y_{ud}(t)$. From a Taylor series expansion $$R_{ui} = R_{ci} + \frac{h^2 - 2R_{ci}h\cos(\theta_i)}{2R_{ci}} - \frac{[h^2 - 2R_{ci}h\cos(\theta_i)]^2}{8R_{ci}^3} + \ldots \tag{15}$$

$$R_{di} = R_{ci} + \frac{h^2 + 2R_{ci}h\cos(\theta_i)}{2R_{ci}} - \frac{[h^2 + 2R_{ci}h\cos(\theta_i)]^2}{8R_{ci}^3} + \ldots \tag{16}$$

$$R_{uT} = R_{cT} + \tag{17}$$
$$\frac{h^2 - 2R_{cT}h\cos(\theta_T)}{2R_{cT}} - \frac{[h^2 - 2R_{cT}h\cos(\theta_T)]^2}{8R_{cT}^3} + \ldots$$

$$R_{dT} = R_{cT} + \tag{18}$$
$$\frac{h^2 + 2R_{cT}h\cos(\theta_T)}{2R_{cT}} - \frac{[h^2 + 2R_{cT}h\cos(\theta_T)]^2}{8R_{cT}^3} + \ldots,$$

therefore $$R_{ui} + R_{di} - R_{uT} - R_{dT} = 2(R_{ci} - R_{cT}) + \tag{19}$$
$$h^2\left(\frac{\sin^2(\theta_i)}{R_{ci}} - \frac{\sin^2(\theta_T)}{R_{cT}}\right) -$$
$$\frac{h^4}{4}\left(\frac{6\cos^2(\theta_i) - 1}{R_{ci}^3} - \frac{6\cos^2(\theta_T) - 1}{R_{cT}^3}\right) + \ldots$$

Assuming that h is much smaller than $R_{ci}$ and $R_{cT}$, and ignoring terms that are proportional to $h(h/R_{ci})^n$ or $h(h/R_{cT})^n$ with n>2, equation (14) becomes $$\tau = \frac{h^2\left(\frac{\sin^2(\theta_T)}{R_{cT}} - \frac{\sin^2(\theta_i)}{R_{ci}}\right)}{c_0}. \tag{20}$$

Note that only the n=1 term is left; n=0 and n=2 terms are cancelled since the signals are common midpoint signals. The above arrival-time error is accurate up to the n=2 term.

Since the pulse has a finite length, signal exists only when $R_{ci}$ is near to $R_{cT}$, as shown in FIG. 6. Let $$R_{ci} = R_{cT} + \delta R \tag{21}$$

and assume $$\delta R \ll R_{cT}, \tag{22}$$

then $$\frac{1}{R_{ci}} = \frac{1}{R_{cT} + \delta R} = \frac{1}{R_{cT}} - \frac{\delta R}{R_{cT}^2} \tag{23}$$

and equation (20) becomes $$\tau = \frac{h^2}{c_0 R_{cT}}\left[\sin(\theta_T - \theta_i)\sin(\theta_T + \theta_i) + \frac{\delta R}{R_{cT}}\sin^2(\theta_i)\right]. \tag{24}$$

Figure 9:
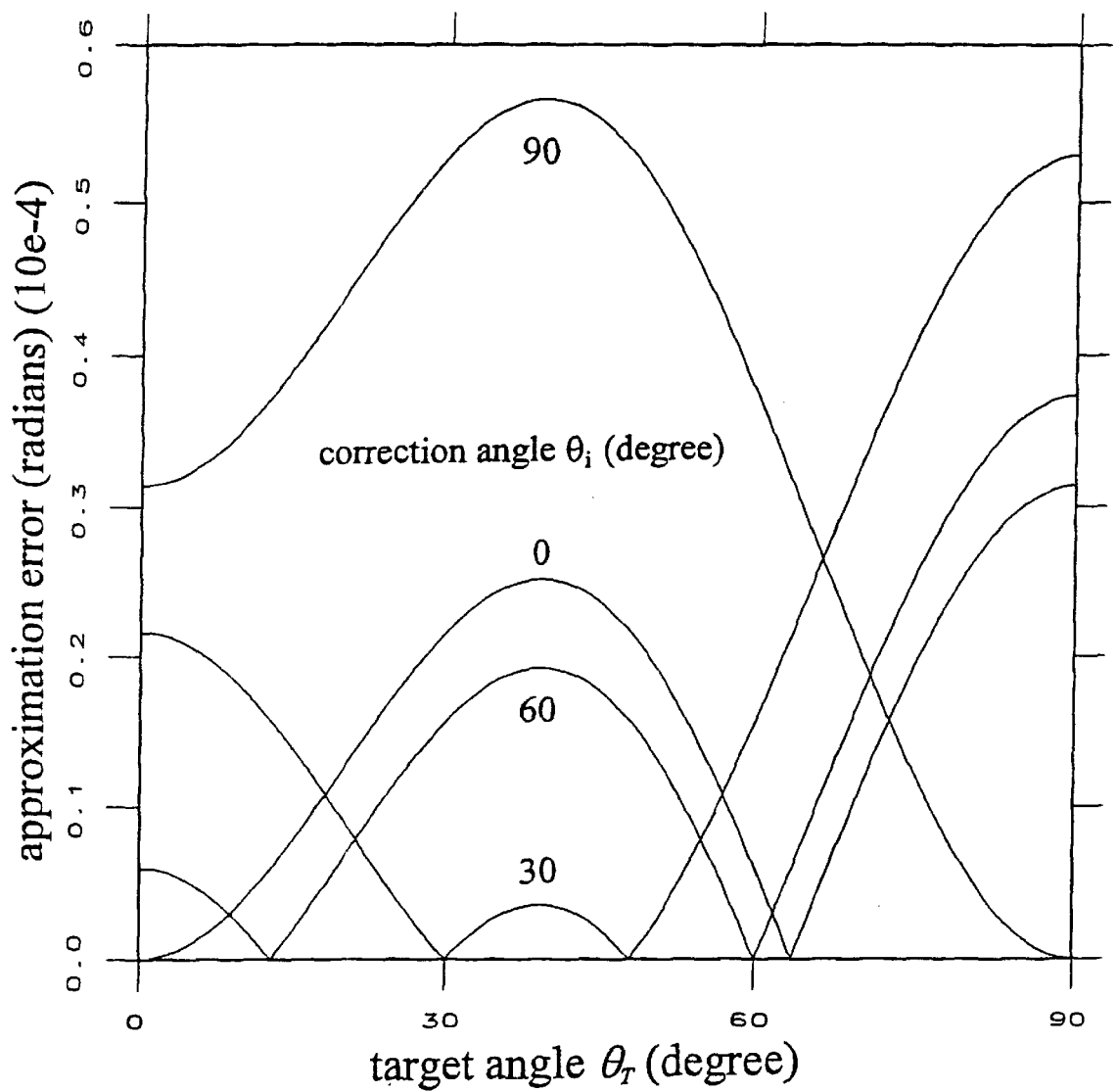
FIGS. 9a, 9b and 9c illustrate the difference between the accurate equation (14) and the approximated equation (25) for h=1 mm and $\lambda_0$=0.4 mm.
Figure 9:
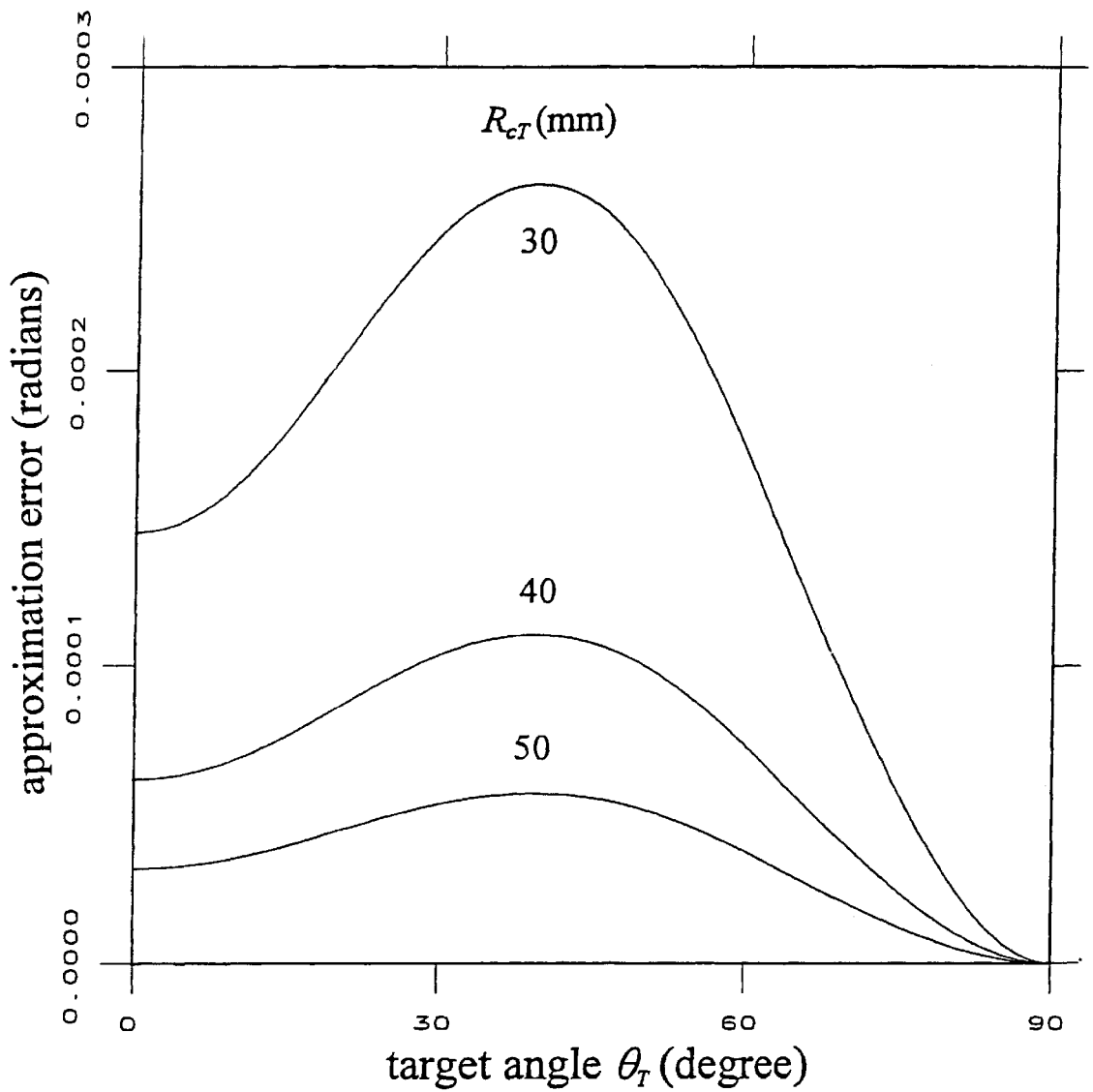
Figure 9:
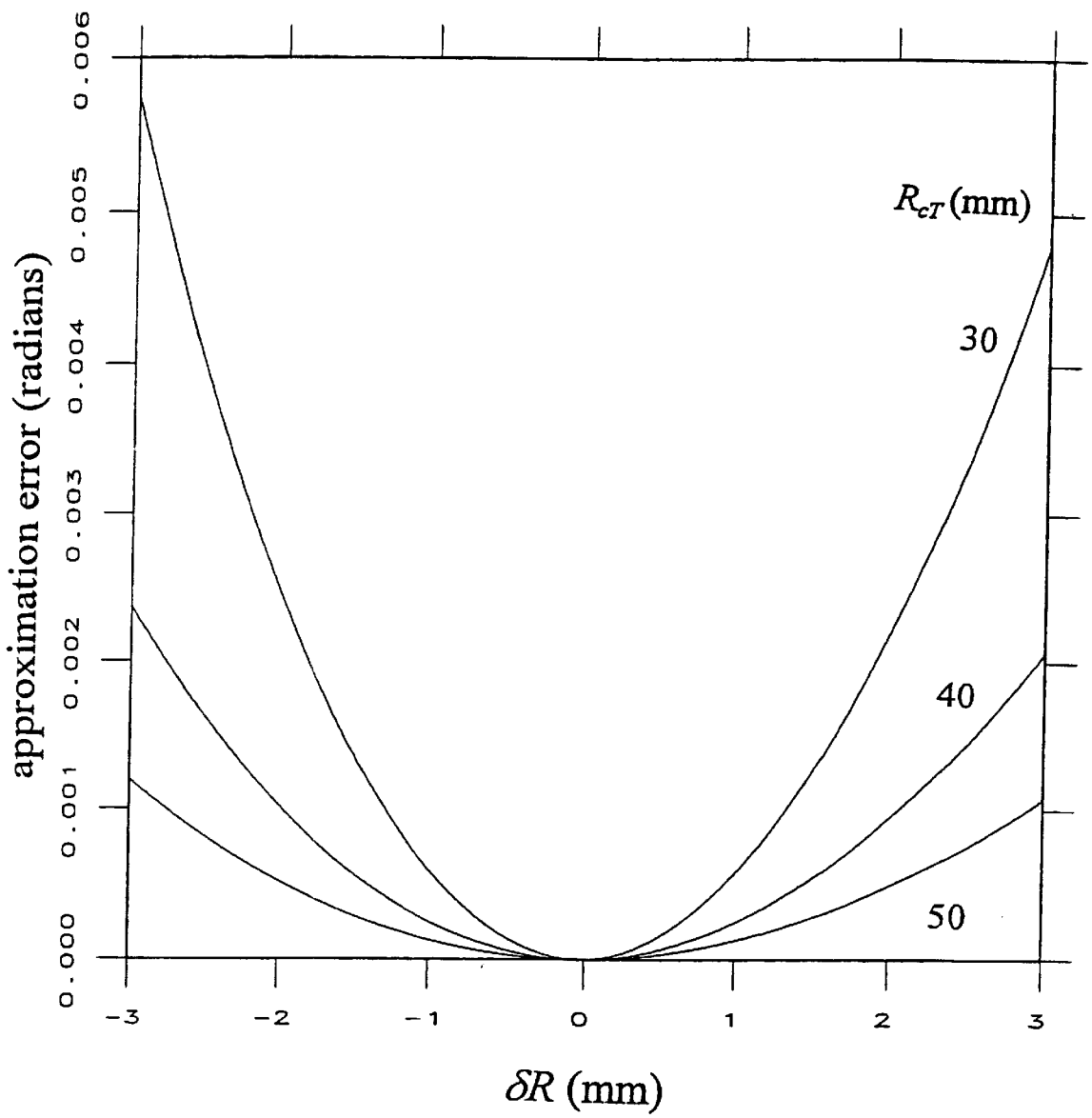

The corresponding phase difference $\Delta\phi$ for the center frequency of the pulse is $$\Delta\phi \text{ (rad)} = \frac{h^2}{R_{cT}}k\left[\sin(\theta_T - \theta_i)\sin(\theta_T + \theta_i) + \frac{\delta R}{R_{cT}}\sin^2(\theta_i)\right] \tag{25}$$

where $$k = \frac{2\pi}{\lambda_0}; \tag{26}$$

where $\lambda_0$ is the wavelength for the center frequency of the pulse. The accuracy of equation (25) is analyzed in the following example to ensure that the approximation is accurate enough for the near-field signal redundancy algorithm which will be described later. The difference between the accurate (equation (14)) and the approximated (equation (25)) values of $\Delta\phi$ is plotted in FIG. 9. The values of h=1 mm and $\lambda_0$=0.4 mm were used. It can be seen from FIG. 9(a) that the error of approximation is less than $6\times10^{-5}$ radians for targets at all angles. FIG. 9(b) shows that smaller $R_{cT}$ gives larger errors. When $R_{cT}$ is larger than 30 mm, the approximation error is less than $3\times10^{-4}$ radians. FIG. 9(c) shows that the error is less than $5\times10^{-4}$ radians when, approximately, $\delta R<0.9$ mm for $R_{cT}=30$ mm, $\delta R<1.3$ mm for $R_{cT}=40$ mm, and $\delta R<2$ mm for $R_{cT}=50$ mm. These approximation errors will add together. The second paper [90] shows that, for a 64-element array, the measurement accuracy for $\Delta\phi$ has to be better than $10^{-2}$ radians rms, and $5\times10^{-2}$ radians for the bias. Therefore, equation (25) can be used in the analysis.

Equation (25) contains two terms. The first is the shift effect of the dynamic near-field correction on echoes not coming from the correction angle. The peak of the echo in $y'_{ud}(t)$ is moved away from $R_{ci}/2c_0=R_{cT}/2c_0$ by the amount of $$\Delta\phi \text{ (rad)} = \frac{h^2}{R_{cT}}k\sin(\theta_T - \theta_i)\sin(\theta_T + \theta_i) \tag{27}$$

Figure 10:
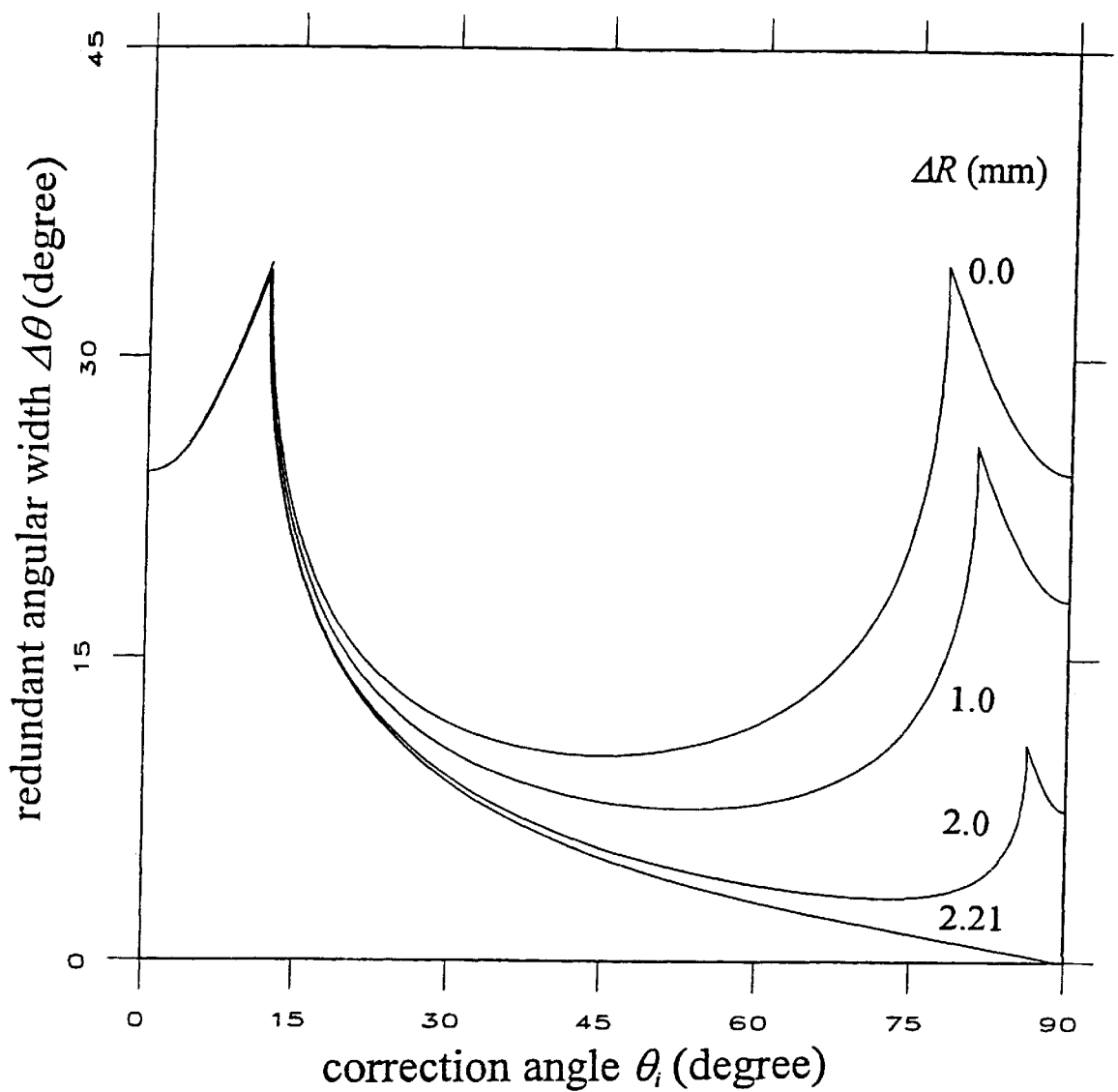
FIG. 10 shows the angular width of the region of redundancy as a function of the correction angle for several $\Delta R$ values with h=1 mm, $\lambda_0$=0.4 mm, and $R_{cT}$=50 mm.

FIG. 6 shows that the analysis is symmetric about the z-axis, and so one can assume that $90°\geq(\theta_T$ and $\theta_i)\geq 0°$ and state that, when the echoes received in the two signals in (12) and (13) are compared, there is no peak shift for an echo coming from a target at the correction angle $\theta_i$; for those echoes coming from targets at an angle larger than the correction angle, their peaks are shifted backward because of under correction; for those coming from targets at an angle smaller than the correction angle, their peaks are shifted forward because of over correction, as shown in FIG. 5. The second term is the linear sketch effect of the dynamic near-field correction. The total phase error, because of both $\theta_T\neq\theta_i$ and $\delta R\neq 0$, between the same echo in the two signals reaches its maximum at one end of the echo. For $\theta_T\geq\theta_i$, it is at the back. For $\theta_T\leq\theta_i$, it is at the front. In both cases, the maximum phase error can be expressed as the sum of the absolute shift error and the absolute stretch error at one end of the echo $$\Delta\phi_{max} \text{ (rad)} = \frac{h^2}{R_{cT}}k\left[|\sin(\theta_T - \theta_i)\sin(\theta_T + \theta_i)| + \frac{\Delta R}{R_{cT}}\sin^2(\theta_i)\right] \tag{28}$$

where $\Delta R=|\delta R_{max}|$, which equals one half of the range-cell length, or one quarter of the pulse length. If the requirement for signals $y_{cc}(t)$ and $y'_{ud}(t)$ to be considered as redundant is $$\Delta\phi_{max} \leq \frac{1}{M}, \tag{29}$$

where M is a large number determined by the requirement, a region exists from where the echoes satisfy equation (29). This region is defined as the region of redundancy. The angular width of the region of redundancy, as a function of correction angle for several $\Delta R$ values with h=1 mm, $\lambda_0=0.4$ mm, and $R_{cT}=50$ mm, is shown in FIG. 10. The method used to derive these curves is given in the appendix. FIG. 10 shows that there is an optimum correction angle near 90°, except for $\Delta R\geq 2.21$ mm, which maximizes the angular width of the region of redundancy for a given $\Delta R$ value. By choosing a correction angle away from 90°, a larger region of redundancy can be obtained which will increase the similarity between the dynamically corrected common midpoint signals. The peak at the angle near 0° is not useful since it is not the region of interest. The optimum correction angle $\theta_{opt}$ is at the direction where the equality in equation (A11) is satisfied, $$\theta_{opt} = \arcsin\left(\sqrt{\frac{1-\gamma}{1-\frac{\Delta R}{R_{cT}}}}\right); \tag{30}$$

Figure 11:
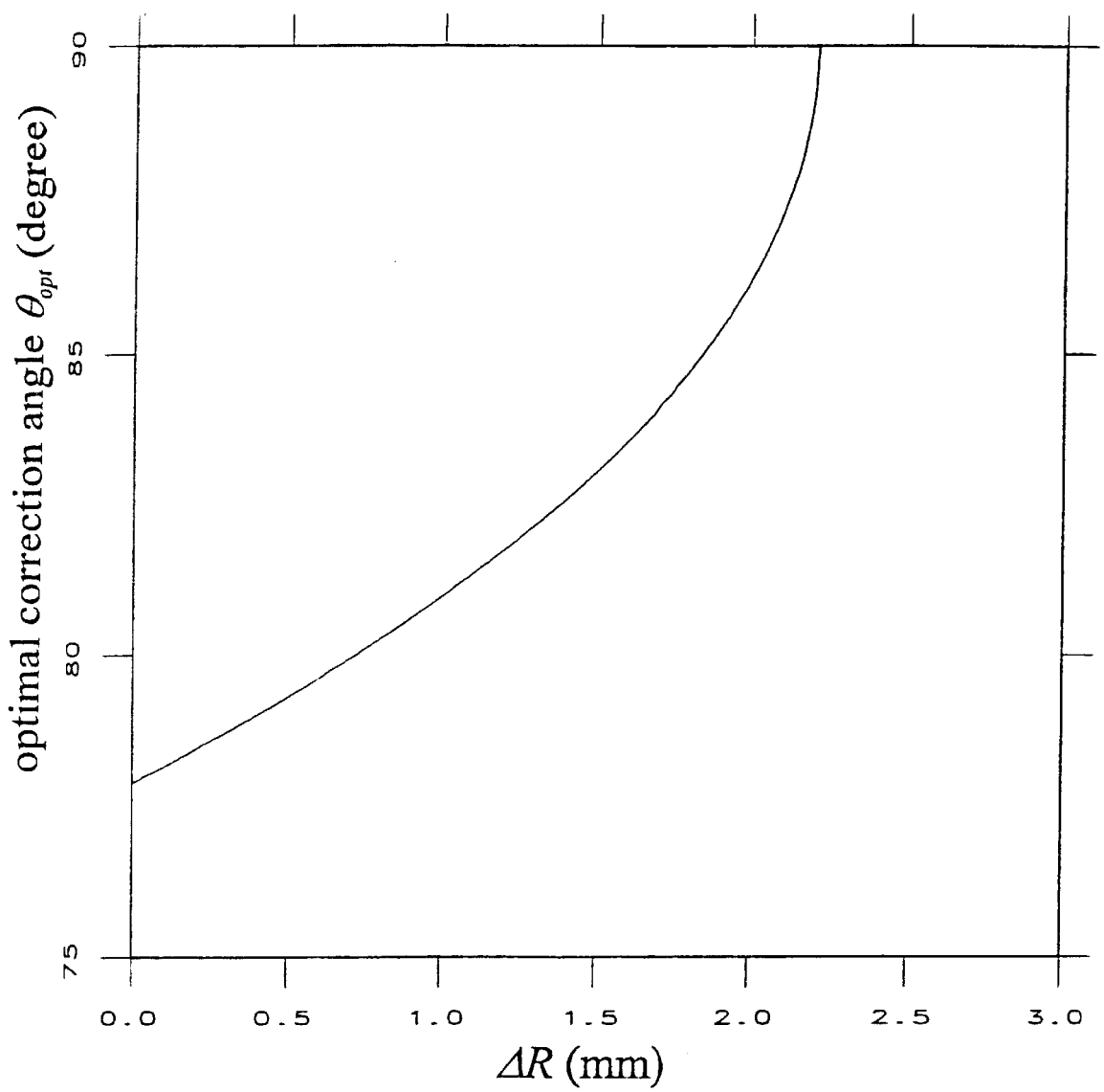
FIG. 11 shows the optimum correction angle as a function of $\Delta R$ with h=1 mm, $\lambda_0$=0.4 mm, and $R_{cT}$=50 mm.
Figure 12:
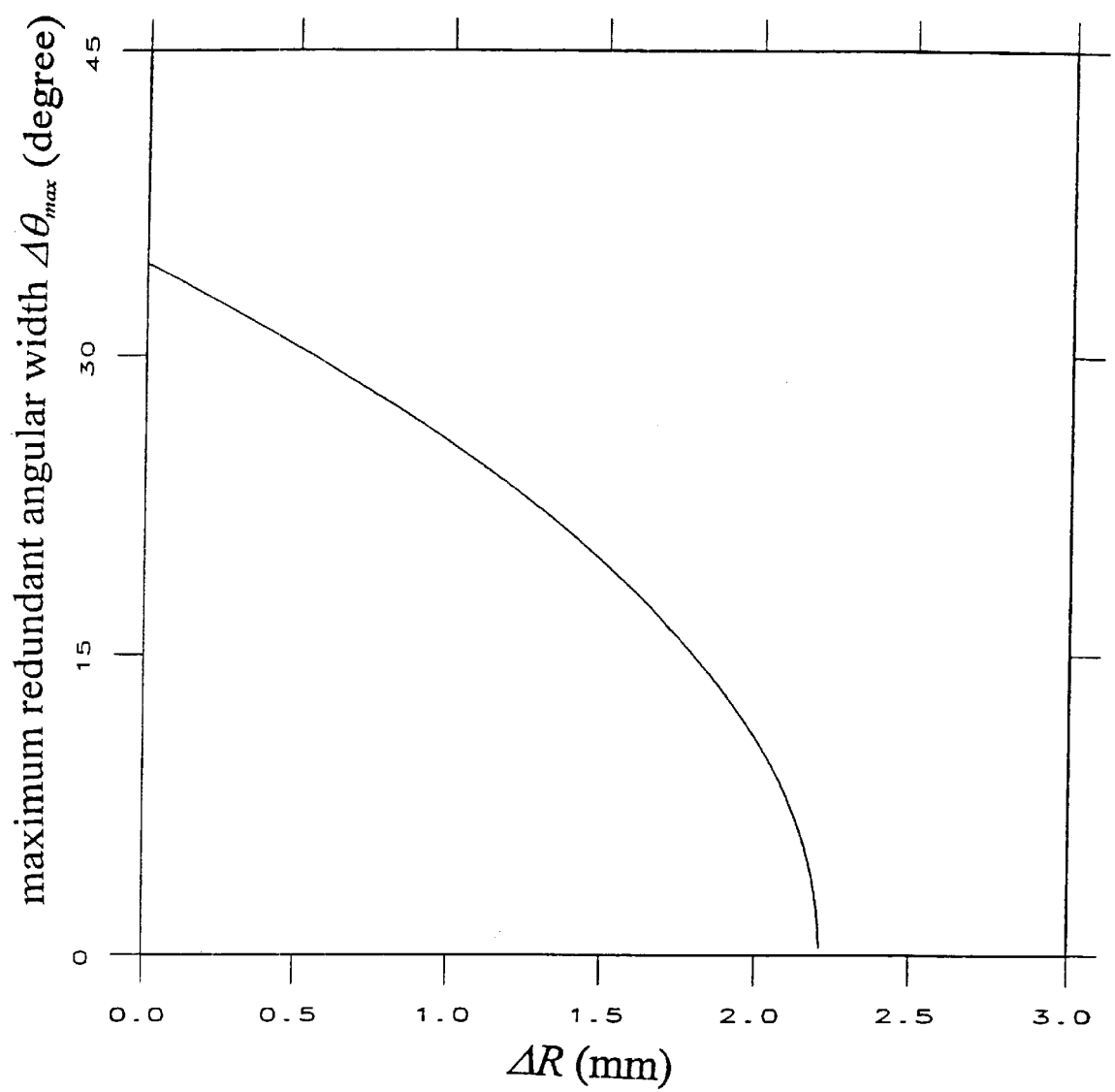
FIG. 12 shows the angular width of the region of redundancy as a function of $\Delta R$ for the optimum correction angle with h=1 mm $\lambda_0$=0.4 mm, and $R_{cT}$=50 mm.

$\gamma$ is defined in equation (A7). The optimum correction angle as a function of $\Delta R$, with h=1 mm, $\lambda_0=0.4$ mm, and $R_{cT}=50$ mm, is shown in FIG. 11, and the corresponding angular width of the region of redundancy for the optimum correction angle is (from equations (30) and (A14))

$$\Delta\theta_{max} \text{ (rad)} = 2\left[\frac{\pi}{2} - \arcsin\left(\sqrt{\frac{R_{cT}+\Delta R}{R_{cT}-\Delta R}(1-\gamma)-\gamma}\right)\right] \tag{31}$$

which is shown in FIG. 12. This optimum correction angle is depth related, mainly through $\gamma$. This optimum correction angle no longer exists when $\Delta R$ is large enough to make the phase error, caused by the pulse step effect alone, is bigger than the requirement when correcting at 90°; that is $$\Delta R > \gamma R_{cT}. \tag{32}$$

The region of redundancy has been defined here as the region from which the echo's phase error between the dynamically corrected common midpoint signs $y'_{ud}(t)$ and $y_{cc}(t)$ is less than the requirement within the whole echo. There may be a second region where part of the echo has a phase error that is less than the requirement, and a third region where the whole echo has a phase error that is larger than the requirement. The volume of error-producing regions can be reduced by reducing the pulse length, using echoes coming from a greater distance, and reducing the distance between elements. Increasing element size can be used to limit its angular response and, consequently, to reduce the sensitivity to echoes coming from the error-producing region. But, a large element has adverse effects too; this is discussed later.

The result in equation (28) can be extended to a general case i.e. a common midpoint signal pair from a four-element array. The maximum phase error can be derived easily as $$\Delta\phi_{max} \text{ (rad)} = \frac{h_2^2 - h_1^2}{R_{cT}}k\left[|\sin(\theta_T - \theta_i)\sin(\theta_T + \theta_i)| + \frac{\Delta R}{R_{cT}}\sin^2(\theta_i)\right] \tag{33}$$

where $2h_2$ and $2h_1$ are the distance between the transmitter and the receiver for the two element pairs respectively. Both element pairs have their midpoint at x=0. For a regular linear array, assume that $h_1=n_1 p$, $h_2=n_2 p$, and $n_2=n_1+i$, $(n_2>n_1)$, where p is the pitch of the array, then $$h_2^2 - h_1^2 = i(2n_1+i)p^2. \tag{34}$$

It can be seen that the two most similar signals among all the dynamically corrected common midpoint signals correspond to $n_1=0$ and i=1, which is $y_{cc}(t)$ and $y_{ud}(t)$ (or $y_{du}(t)$), used in the above discussion. Other signals will have more phase errors after the correction.

In conclusion the dynamic near-field correction can be used to reduce the difference between common midpoint signals for echoes coming from targets in the near-field region of interest. Because signals from the same range cell are overlapping one another, exact redundancy can not be achieved. The medium can be separated into three regions. In the first the maximum phase error between corrected common midpoint signals is within the required limit; this region is defined here as the region of redundancy and may disappear when the pulse length is too long. In the second, only part of the echo has a phase error which is less than the requirement. In the third, the whole echo has a phase error larger an the requirement. The size of these regions depends on many parameters, such as pulse length, correction angle etc. There is an optimum correction angle near the 90° direction which maximizes the angular width of the region of redundancy at one depth.

Influence of Phase Aberration on Signal Redundancy in the Near Field

In the analysis hereinbefore, the medium was assumed to be homogenous. Before we can use the conclusions to measure phase aberrations, it must be proved that this theory is still valid when phase aberrations are present. When phase aberrations caused by medium inhomogeneity are present and their distribution is unknown, the dynamic near-field correction generally has to be done by assuming there is no phase aberration. The following is an analysis of the influence of phase aberrations on near-field signal redundancy when common midpoint signals are corrected assuming no phase aberration.

In the far-field case, if the phase aberration can be modelled as a phase screen on the aperture which is independent of arrival angle of echoes, the two redundant signals are still identical but shifted according to the phase error experienced by each signal. The relative shift between these two signals can be used to derive the phase-aberration profile across the array.

Figure 13:
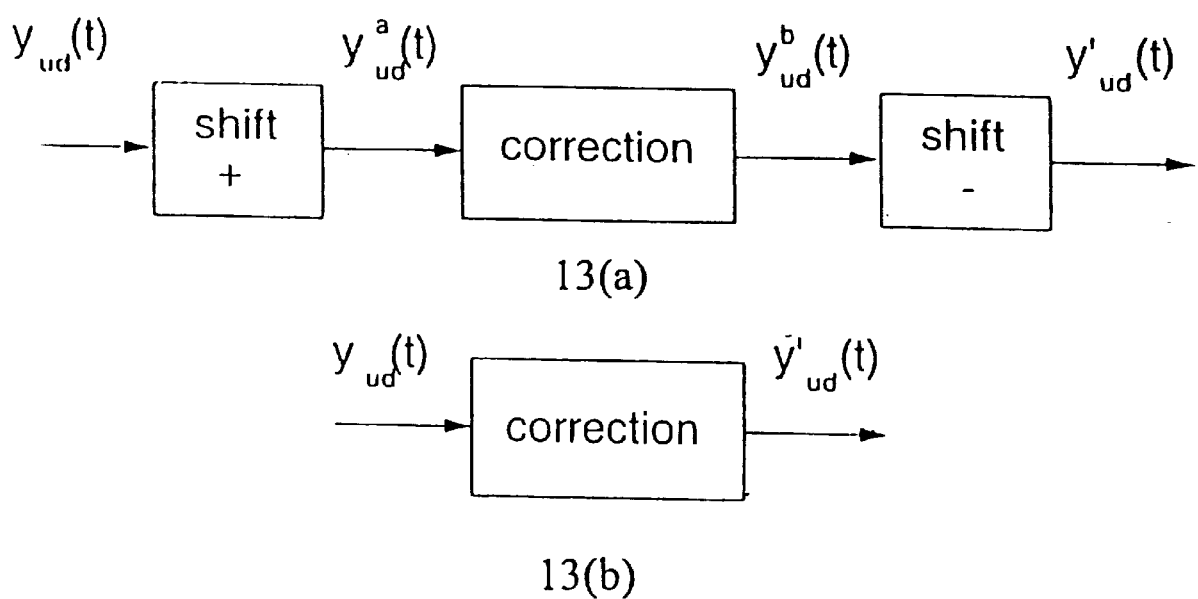
FIG. 13 illustrates the dynamic near-field correction when phase aberrations are present, FIG. 13(a) showing the colon considering the phase aberration, FIG. 13(b) showing the correction ignoring phase aberration.

In the near-field case, however, the signals will be wrongly corrected for the near-field effect if the phase aberration is not included in the correction. To make it similar the far-field case, the signals have to be processed as shown in FIG. 13(a). The received signal is shifted first to compensate for the phase aberration, then it is dynamically corrected for the near-field effect. Then, the signal is shifted again to put the phase aberration back. The resultant common midpoint signals will be redundant but shifted according to the phase aberration experienced by each signal.

Unfortunately, it is the phase aberration which needs to be measured. Signals can not be shifted to compensate for the phase aberration before correcting for the near-field effect. If the correction block in FIG. 13(a) is moved to the front of the first shift block, the two shift blocks will be cancelled, and the process becomes that as shown in FIG. 13(b); in general, this is the only viable process which can be carried out. Since the near-field correction is sensitive to the block shift, the process in FIG. 13(b) introduces errors. These errors are analyzed below.

Consider the three-element array as shown in FIG. 6. The received signals when phase aberrations are present become $$y_{cc}(t) = \int_0^\pi \int_0^\infty \rho(R_{cT}, \theta_T) p\left(t - \tau_{cc}(R_{cT}, \theta_T) - \frac{2R_{cT}}{c_0}\right) d R_{cT} d\theta_T \quad (35)$$

$$y_{ud}(t) = \int_0^\pi \int_0^\infty \rho(R_{cT}, \theta_T) p\left(t - \tau_{ud}(R_{cT}, \theta_T) - \frac{R_{uT} + R_{dT}}{c_0}\right) d R_{cT} d\theta_T \quad (36)$$

where $$\tau_{ud}(R_{cT}, \theta_T) = \tau_{uT}(R_{cT}, \theta_T) + \tau_{dR}(R_{cT}, \theta_T) \quad (37)$$

$$\tau_{cc}(R_{cT}, \theta_T) = \tau_{cT}(R_{cT}, \theta_T) + \tau_{cR}(R_{cT}, \theta_T) \quad (38)$$

$\tau_{iT}$ and $\tau_{iR}$ (i=c, d and u) are transmission and reception phase aberrations respectively for element i. Positive values means a delay. They generally depend on $R_{cT}$ and $\theta_T$. The multiple path effect is ignored, that is $\tau_{iT}$ ($\tau_{iR}$) has only a single value for each target position ($R_{cT}$, $\theta_T$). From the reciprocity principle, the transmission and reception phase aberrations caused by the media are generally identical at the same element. But, the imaging system, such as the electronics system in each channel, may introduce some differences between transmission and reception phase-aberration profiles. That is $$\tau_{iR}(R_{cT},\theta_v) = \tau_{iT}(R_{cT},\theta_T) + \delta\tau_i \quad (39)$$

where $\Delta\tau_i$ is caused by the system and it is independent of $R_{cT}$ and $q_T$. Assume that phase aberrations can be modelled as a phase screen at the surface of the array; i.e. they do not depend on the depth and angle of the target, which is valid generally only in a limited region (isoplanatic patch), then $$y_{cc}(t) = \int_0^\pi \int_0^\infty \rho(R_{cT}, \theta_T) p\left(t - \tau_{cc} - \frac{2R_{cT}}{c_0}\right) d R_{cT} d\theta_T \quad (40)$$

$$y_{ud}(t) = \int_0^\pi \int_0^\infty \rho(R_{cT}, \theta_T) p\left(t - \tau_{ud} - \frac{R_{uT} + R_{dT}}{c_0}\right) d R_{cT} d\theta_T. \quad (41)$$

The process in FIG. 13(a) is: shift the received signal to compensate for the phase aberration.

$$y_{ud}^a(t) = y_{ud}(t+\tau_{ud}) \quad (42)$$

then, dynamically correct it for the near-field effect, $$y_{ud}^b(t) = \quad (43)$$

$$y_{ud}^a\left(\sqrt{\left(\frac{t}{2}\right)^2 + \frac{h^2}{c_0^2} - t\frac{h}{c_0}\cos(\theta_i)} + \sqrt{\left(\frac{t}{2}\right)^2 + \frac{h^2}{c_0^2} + t\frac{h}{c_0}\cos(\theta_i)}\right)$$

and finally, shift it back:

$$y'_{ud}(t) = y_{ud}^b(t-\tau_{ud}). \quad (44)$$

From equations (42)–(44), $$y'_{ud}(t) = y_{ud}\left(\sqrt{\left(\frac{t-\tau_{ud}}{2}\right)^2 + \frac{h^2}{c_0^2} - (t-\tau_{ud})\frac{h}{c_0}\cos(\theta_i)} + \right. \quad (45)$$

$$\left. \sqrt{\left(\frac{t-\tau_{ud}}{2}\right)^2 + \frac{h^2}{c_0^2} + (t-\tau_{ud})\frac{h}{c_0}\cos(\theta_i)} + \tau_{ud}\right)$$

The signal $y'_{ud}(t)$ derived from above process is redundant with $y_{cc}(t)$ for echoes coming from the region of redundancy, but they have a relative time shift of $\tau_{cc}-\tau_{ud}$, which is similar to the far-field case.

Unfortunately, the phase aberration is not known when the correction is made. Therefore, the correction has to be done directly on the received signal as if no phase aberration exists, as shown in FIG. 13(b). In this case, $$y'_{ud}(t) = \quad (46)$$

$$y_{ud}\left(\sqrt{\left(\frac{t}{2}\right)^2 + \frac{h^2}{c_0^2} - t\frac{h}{c_0}\cos(\theta_i)} + \sqrt{\left(\frac{t}{2}\right)^2 + \frac{h^2}{c_0^2} + t\frac{h}{c_0}\cos(\theta_i)}\right).$$

The corrected signals in equations (45) and (46) are clearly different.

Change the variable t to $2R_{ci}/c_0+\tau_{cc}$ in equation (40) and $2R_{ci}/c_0+\tau_{ud}$ in equation (46), and the following two signals $$y_{cc}\left(\frac{2R_{ci}}{c_0}+\tau_{cc}\right) \text{ and } y'_{ud}\left(\frac{2R_{ci}}{c_0}+\tau_{ud}\right)$$

are supposed to be the same. Through a similar process as that used when deriving equation (24) from equation (14), the arrival-time difference $\tau$ in the two signals between the same part of the echo is.

$$\tau = \frac{h^2}{c_0 R_{cT}}\left[\sin(\theta_T - \theta_i)\sin(\theta_T + \theta_i) + \left(\frac{\delta R + \frac{c_0\tau_{ud}}{2}}{R_{cT}}\right)\sin^2(\theta_i)\right]. \quad (47)$$

An additional approximation of $$\frac{c_0\tau_{ud}}{2} \ll R_{cT} \quad (48)$$

was used to derive the above expression. When compared with equation (24), it can be seen that the effect of the phase aberration, besides shifting the corrected signal by $t_{ud}$, is adding another term in the error. This term, similar to the pulse length is caused by correcting the signal at a wrong range. The phase aberration $t_{ud}$ is translated into a length of $c_0 t_{ud}/2$. Positive $t_{ud}$ $\delta R$., and $q_T>q_i$ all causes under corrections. The accuracy of the approximation of equation (48) is similar to that of equation (22) and FIG. 9(c).

Since the pulse length is still equal to $4\Delta R$, each echo is stretched by the same amount as it is in the case without phase aberration. Therefore, it makes more sense if equation (47) is rewritten as $$\tau = \frac{h^2}{c_0 R_{cT}}\left[\sin^2(\theta_T) - \left(1 - \frac{c_0\tau_{ud}}{2R_{cT}}\right)\sin^2(\theta_i) + \left(\frac{\delta R}{R_{cT}}\right)\sin^2(\theta_i)\right] \quad (49)$$

and the maximum phase error for the center frequency of the pulse becomes $$\phi_{max} \text{ (rad.)} = \frac{h^2}{R_{cT}^2}k\left[\left|\sin^2(\theta_T) - \left(1 - \frac{c_0\tau_{ud}}{2R_{cT}}\right)\sin^2(\theta_i)\right| + \left(\frac{\Delta R}{R_{cT}}\right)\sin^2(\theta_i)\right]. \quad (50)$$

The phase aberration changes the shift distribution of echoes due to an extra shift caused by dynamically correcting the signal without including the effect of phase aberration. The target direction $\theta_T$, at which its echo is not shifted, is no longer at the correction direction. It is at the direction determined by:

$$\sin^2(\theta_T) = \left(1 - \frac{c_0\tau_{ud}}{2R_{cT}}\right)\sin^2(\theta_i) \quad (51)$$

For positive $\tau_{ud}$, that is the phase aberration is a delay, the zero peak-shift echo direction is smaller than the correction direction [assume $90° > \theta_T$ and $\theta_i \geq 0°$], since the delay makes the over corrected region less over corrected. A negative $\tau_{ud}$ makes the target direction of zero peak-shift move to a larger angle.

In summary, when the phase aberration is small compared with the depth of the targets (equation (48)), the change of signal processing method from FIG. 13(a) to FIG. 13(b) will add one more term of error between dynamically corrected common midpoint signals. This term changes the optimum correction angle, but its effect on signal redundancy is negligible in most cases. Therefore, after a dynamic near-field correction without considering phase aberrations, common midpoint signals can still be considered redundant for echoes coming from a region of redundancy, except that they are shifted according to the phase aberration experienced by each signal, and they can be used for phase aberration profile measurements.

Discussion

The above analysis has shown that, in the near-field, after a dynamic near-field correction, common midpoint signals can still be used for phase-aberration measurements. Several related issues will be discussed in the following discussions. For example, what happens if no near-field correction is made? what happens if only a single depth correction is made? and, what happens if non-common midpoint signals are used with the dynamic near-field correction for phase-aberration measurements?

A. No Near-field Correction

If no near-field correction is applied to common midpoint signals, which is equivalent to doing the correction at zero-degree angle, the region of redundancy will be around the x-axis; this region is not of interest. But, if the requirement on measurement accuracy is low enough, i.e. the M value in equation (29) is small enough, the region of redundancy may include all angles. In this case, the near-field correction is not needed in terms of regarding common midpoint signals as redundant. The target distance beyond which the near-field correction is no longer needed is discussed in detail in the second paper [90], which shows that the dynamic near-field correction is generally unavoidable for a medical ultrasound imaging system.

B. No Dynamic Near-field Correction

If a near-field correction is done at one depth only at an angle near 90°, the small error region will be around the important 90° direction and around the correction depth. The arrival-time error can still be expressed as in equation (20):

$$\tau = \frac{h^2\left(\frac{\sin^2(\theta_T)}{R_{cT}} - \frac{\sin^2(\theta_i)}{R_{ci}}\right)}{c_0} \quad (52)$$

where $(R_{cT}, q_T)$ is the target position, and $(R_{ci}, q_i)$ is the correction point. In this case, however, target position $R_{cT}$ in equation (52) is no longer limited in the range cell. Even when the echoes are separable in the signal, they are still corrected with the same correction as that for the echo coming from the correction point $(R_{ci}, q_i)$. Consequently, when $R_{cT}$ is moving away from $R_{ci}$, the phase error increases to a large value. Equation (24) is still valid here for small differences between $R_{cT}$ and $R_{ci}$. The region of redundancy will only include a small depth around the correction point. In this case, the signal length that can be used for cross-correlation to measure the phase-aberration profiles is short and it reduces the measurement accuracy because of poor signal-to-thermal and signal-to-structure (from the regions of non-redundancy) noise ratios in the cross-correlation functions. The dynamic correction allows long signals to be used for cross correlations.

In summary, in the near-field case, a dynamic near-field correction is generally needed to make common midpoint signals redundant, within an error limit, for echoes coming from arbitrary target distributions at directions around 90° in a large depth range.

C. Non-Common Midpoint Signals with Dynamic Near-field Correction

Can non-common midpoint signals be used for phase-aberration corrections after a dynamic near-field correction? In the following discussion, it is found that, after the dynamic near-field correction, the volume of the region of redundancy for non-common midpoint signals is much smaller than that for common midpoint signals. Therefore, in the near-field, common midpoint signals are still a special group of signals which have the property of redundancy after the dynamic near-field correction.

Consider a similar free-element array to that shown in FIG. 6, but where the distance from the upper element to the center element $h_u$ is different from the distance from the lower element to the center element $h_d$. This will result in the midpoint of elements u and d being shied from zero along the x-axis. From equations (14)–(18), using appropriate h values, and ignoring $h(h/R)^2$ and higher order terms, equation (24) becomes $$\Delta\phi(\text{rad}) = 4\kappa h_c \sin\left(\frac{\theta_\tau + \theta_i}{2}\right)\sin\left(\frac{\theta_\tau - \theta_i}{2}\right) + \tag{53}$$
$$\frac{h_d^2 + h_w^2}{2R_{cT}}k\left[\sin(\theta_\tau - \theta_i)\sin(\theta_\tau + \theta_i) + \frac{\delta R}{R_{cT}}\sin^2(\theta_i)\right]$$

where $$h_c = \frac{h_u - h_d}{2} \tag{54}$$

which is the midpoint of elements u and d.

Comparing equation (53) with equation (24), the terms of $h(h/R)^0$ and $h(h/R)^2$ and [which is omitted in equation (53)] remain in equation (53) since the signals are not common midpoint signals. For a regular array, the smallest non-zero value for $h_c$ is $h/2$, h is the pitch of the array. In this case the first term dominates the error, $$\Delta\phi(\text{rad}) = 2\kappa h \sin\left(\frac{\theta_\tau + \theta_i}{2}\right)\sin\left(\frac{\theta_\tau - \theta_i}{2}\right). \tag{55}$$

This error is about $2R_{cT}/h$ times the error in equation (24). For h=1 mm, $R_{cT}$=50 mm, the error between dynamically corrected non-common midpoint signals is about 100 times the error between dynamically corrected common midpoint signals Therefore, common middle-point signals are still special in the near-field case for having redundancy properties after a dynamic focusing correction.

SUMMARY

It is shown in this paper that common midpoint signals are different for arbitrary target distributions in the near-field but, after a dynamic near-field correction, the difference can be reduced for echoes coming from directions around the correction angle. Under a certain error limit, they can be considered as redundant for echoes coming from a limited region. The size of the region of redundancy depends on the pitch of the array, the target distance to the array, the pulse length and its center frequency wavelength, and the accuracy requirement.

When phase aberrations are present, the dynamic correction can generally still be done by assuming zero phase aberrations. The corrected common midpoint signals will be identical (within the required error limit) after the dynamic near-field correction for those echoes coming from the region of redundancy, except that each signal will be shifted according to the phase aberration experienced by that signal.

These conclusions form the basis for using common midpoint signals to measure phase-aberration profiles across an array in the near-field. An algorithm based on the near-field signal redundancy principle is contained hereinafter. It is also shown that common midpoint signals are still a special group of signals in the near-field since other signals will have a much larger difference between them after the dynamic near-field correction. Without a correction, the region of redundancy is not at the direction of interest which is around the angle of 90°. Without a dynamic correction, the length of the region of redundancy is short along the axial direction Therefore, a dynamic near-field correction is generally necessary to make common midpoint signals become redundant in the near-field for echoes coming from a large area in the region of interest.

A Near-Field Signal Redundancy Algorithm for Phase-Aberration Corrections

Figure 14:
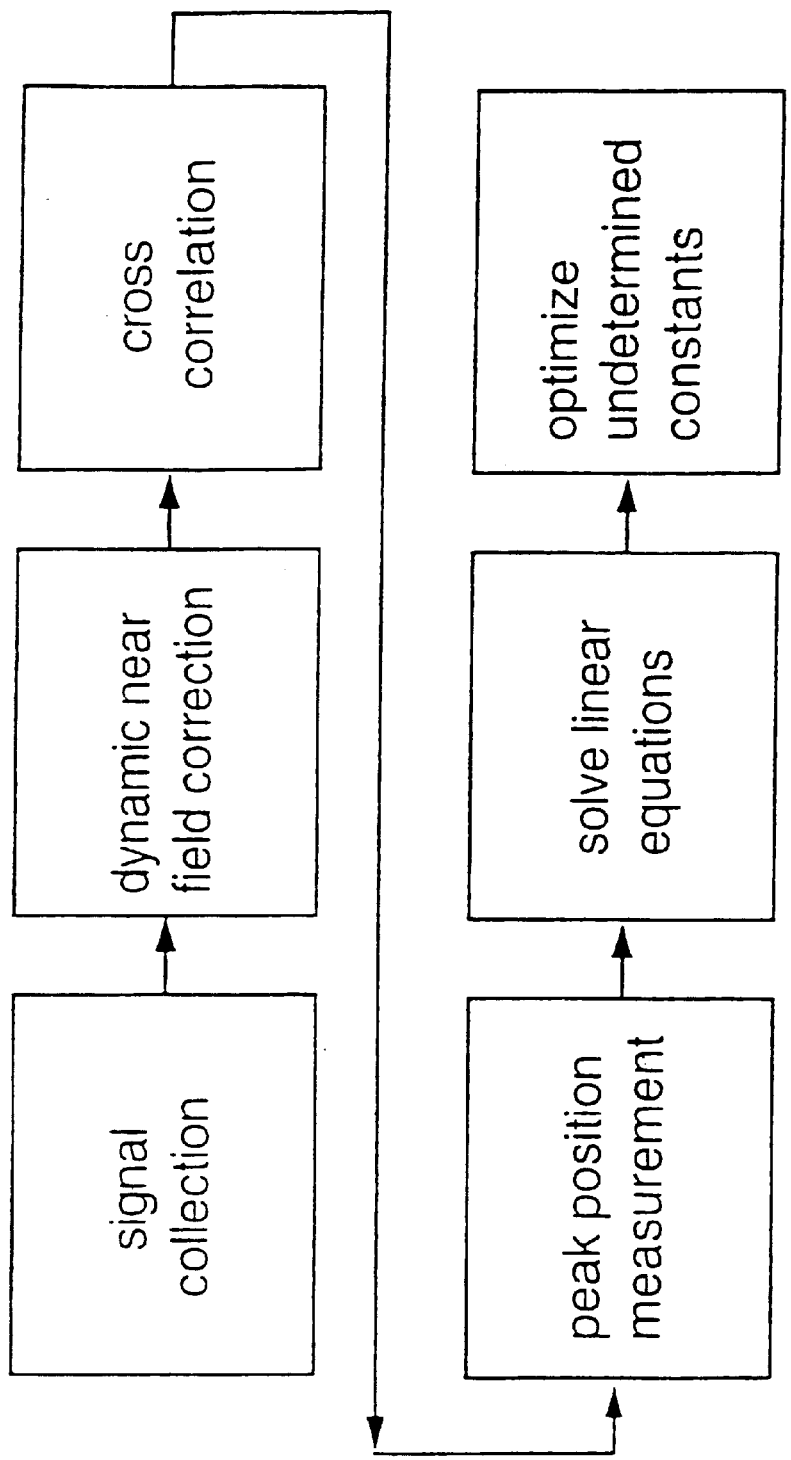
FIG. 14 illustrates a block diagram of the near-field sign redundancy algorithm.

The block diagram of the near-field signal redundancy algorithm is shown in FIG. 14. First, common midpoint signals are collected. The direct collection method is to transmit on one element at a time and receive on several element, and repeat this until all elements have transmitted. There are many signals for each common midpoint in a regular array. Those for which the transmitter and receiver are too far apart should not be used since the volume of the region of redundancy for them will be small. If all the common midpoint signals are used to do a least-mean-squares fit, the measurement accuracy may be worse than if only common midpoint signals with a sufficiently small distance between their transmitter and receiver are used. The number of signals needed to be collected can be much less than a complete signal set. For the array used in the experiment described in the third paper of this series [Y. Li, D. Robinson, and D. Carpenter, "Phase aberration correction using near-field signal redundancy—part III: experimental result," Submitted to IEEE Trans. Ultrason., Ferroelect., Freq. Cont., 1995], it is best to use only the closest common midpoint signal pairs $y_{j,j}(t)$ and $y_{j+1,j-1}(t)$ (or $y_{j-1,j+1}(t)$), j=2, 3, . . . N−1, derive phase-aberration profiles.

Figure 15:
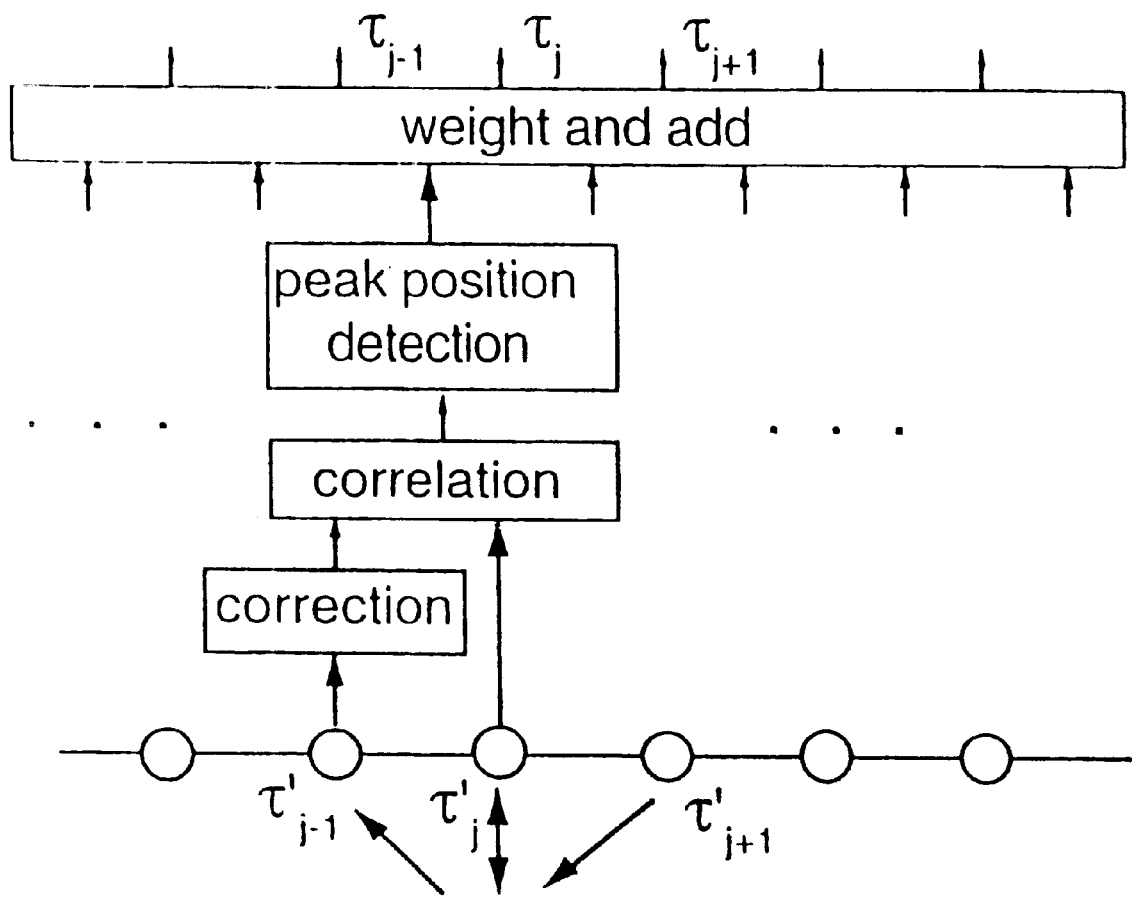
FIG. 15 shows how after collecting common midpoint signals, the received signals are dynamically corrected at a particular angle.

Second, after collecting common midpoint signals, the received signals $y_{j+1,j-1}(t)$ are dynamically corrected at a particular angle to become $y'_{j+1,j-1}(t)$, as shown in FIG. 15. The correction can be done at several correction angles. The peal position of the normalized cross-correlation function is measured from the highest peak, and the correction angle for that peak is considered to be the optimum correction angle. This angle is not only related to the volume of the region of redundancy, but also depends on target distributions. This is discussed in detail in Section V.

Third, the normalized cross-correlation functions $r_{i,i+1}$ are calculated at a selected depth $t_1$ with a selected window length $t_2 - t_1$, $$r_{j,j+1}(\Delta\tau) = \frac{\int_{t_1}^{t_2} y_{j,j}(t + \Delta\tau)y'_{j+1,j-1}(t)dt}{\sqrt{I_{j,j}(\Delta\tau)I_{j+1,j-1}}} \tag{56}$$

where $$I_{j+1,j-1} = \int_{t_1}^{t_2} y'^2_{j+1,j-1}(t)dt \tag{57}$$

and $$I_{j,j}(\Delta\tau) = \int_{t_1}^{t_2} y^2_{j,j}(t + \Delta\tau)dt. \tag{58}$$

The region chosen for correlation should be the region in which one wants to improve the lateral resolution. The length of the correlation window should be chosen so that the signal experiences the same aberration on effect, i.e. in the same isoplanatic patch. On the other hand, it should be as long as possible to improve the signal-to-noise ratio of cross-correlation functions. Other methods can be used for measuring time delays between two identical signals, such as the minimization of the sum of absolute differences method [G. Jacovitti and G. Scarano, "Discrete time technique for time delay estimation." IEEE Trans. Signal Processing, vol. 41, no. 2, pp. 525–533, February 1993] [M. Karaman. A. Atalar, H. Koymen, and M. O'Donnell. "A phase aberration correction method for ultrasound imaging," IEEE. Trans. Ultrason., Ferroelect. Freq. Cont., vol. 40, no. 4, pp. 275–282. July 1993].

Fourth, the peak positions $\Delta t_j$ of the cross-correlation functions are measured, and if the transmission and reception phase errors are identical at each element, they are related to the phase error at each element by $$\Delta\tau_j = 2\tau_j - \tau_{j-1} - \tau_{j-1} \quad j=2,3,\ldots N-. \tag{59}$$

$\tau_j$ is the one-way phase aberration value at element j. Positive $\tau_j$ means that the error is a delay. positive $\Delta\tau_j$ means $y_{j,j}(t)$ is shifted backward compared with $y'_{j+1,j-1}(t)$. An arbitrary linear component a+b(j−1), where a and b are constants, is a solution of equation (4). By assuming $\tau_1 = \tau_N = 0$, the above equations can be written in a matrix form as $$AT = B \tag{60}$$

where $$A = \begin{bmatrix} 2 & -1 & 0 & \cdots & 0 & 0 & 0 \\ -1 & 2 & -1 & 0 & \cdots & 0 & 0 \\ 0 & -1 & 2 & -1 & 0 & \cdots & 0 \\ \vdots & \vdots & \vdots & \vdots & \vdots & \vdots & \vdots \\ 0 & \cdots & 0 & -1 & 2 & -1 & 0 \\ 0 & 0 & \cdots & 0 & -1 & 2 & -1 \\ 0 & 0 & 0 & \cdots & 0 & -1 & 2 \end{bmatrix} \tag{61}$$

and $$T = \begin{bmatrix} \tau_2 \\ \tau_3 \\ \tau_4 \\ \vdots \\ \tau_{N-3} \\ \tau_{N-2} \\ \tau_{N-1} \end{bmatrix} \quad B = \begin{bmatrix} \Delta\tau_2 \\ \Delta\tau_3 \\ \Delta\tau_4 \\ \vdots \\ \Delta\tau_{N-3} \\ \Delta\tau_{N-2} \\ \Delta\tau_{N-1} \end{bmatrix} \tag{62}$$

The solution is obtained from equation (B5) in the Appendix B, and replacing N with N', where N'=N−2 and N is the total number of elements in the array. The solution for T is $$\tau_{\varphi-1} = \varphi \sum_{i=1}^{N'} \frac{N'+1-i}{N'+1} \Delta\tau_{i-1} - \sum_{i=1}^{\varphi} (\varphi - i)\Delta\tau_{i-1}$$

$$= \sum_{i=1}^{N'} a_{jj}\Delta\tau_{i+1} \quad j = 1, 2, \ldots N' \tag{63}$$

where $a_{jj}$ is expressed in equation (B6) in the Appendix B with N' replacing N. This equation can be used directly to derive phase-aberration values as shown in FIG. 15. It involves only weighting and adding. The weighting parameters can be calculated and stored in advance.

The phase-aberration profile in equation (63) is derived by assuming that the phase-aberration values for the two elements at the two ends of the array are equal to zero. This assumption causes a linear component error between the derived result $\tau_j$ and the real phase-aberration value $\tau'_j$, $$\tau'_j = \tau_j + a + b(j-1) \quad j=1, 2, \ldots N. \tag{64}$$

From the assumption that $\tau_1 = \tau_N = 0$, the values of a and b of this error are $$a = \tau'_j \text{ and } b = \frac{\tau'_N - \tau'_1}{N-1}. \tag{65}$$

If $\tau'_1$ and $\tau'_N$ are small, this error is not very important. It is approximately a globe rotation and shift of the image; the de-focusing effect is not severe. For situations where $\tau'_1$ and $\tau'_N$ are large, it becomes important. An estimation of phase-aberration values at both ends of the array from a preliminary image with a prior knowledge, or a trial-and-error method to adjust their values manually or automatically to obtain an optimum image can be useful. This is the last step of this algorithm.

Measurement—Accuracy Requirement

Equation (63) indicates that the requirement on the measurement accuracy of $\Delta\tau_j$ is very high for an array with a large number of elements. Assume that the measured peak position $\Delta\tau^m$ of cross-correlation functions is the value $\Delta\tau$, which satisfies equation (59), plus two error terms s and n, $$\Delta\tau^m_{i+1} = \Delta\tau_{j+1} + s_{j+1} + n_{j+1} \quad j = 1, 2, \ldots N' \tag{66}$$

then $$\tau^m_{j+1} = \tau_{j+1} + \tau^s_{j+1} + \tau^n_{j+1} \quad j = 1, 2, \ldots N \tag{67}$$

where $$\tau_{j+1} = \sum_{i=1}^{N'} a_{jj}\Delta\tau_{j+1} \tag{68}$$

$$\tau'_{j+1} = \sum_{i=1}^{N'} a_{jj}\Delta\tau_{i+1} \tag{69}$$

$$\tau''_{j+1} = \sum_{i=1}^{N'} a_{jj}n_{i+1}. \tag{70}$$

$\tau_{j+1}^m$ is the measured phase-aberration value at element j+1; $\tau_{j+1}$ is the correct phase-aberration value. The measurement error of the peak position comes from two sources: s is the result of echoes coming from the region of non-redundancy, n of thermal noise. The values of $a_{jj}$ are all positive. Consequently, if the signs of these errors are the same, the errors can accumulate up to a very high value. The error arising from thermal noise tends to have the same chance of being either positive or negative, i.e. to have a zero mean. The error arising from the near-field effect, however, can have the same sign. If the dynamic near-field correction is not done, echoes coming from all angles, except along the array direction ($\theta=0°$), are delayed in the sign $y_{j+1,j-1}(t)$ compared with that in the signal $y_{j,j}(t)$. Consequently, all the peak position measurements will have an error s which is negative. Assume that s equals $s_0$ for all measurements across the array, then from equation (69), $$\frac{\tau^s_{j+1}}{s_0} = \frac{j(N'+1-j)}{2} \quad j = 1, 2, \ldots N. \tag{71}$$

This bias amplification curve is shown in FIG. 3. It is straightforward to prove that the bias in the derived phase-aberration value reaches its maximum when $$j = \frac{N'+1}{2} \quad (72)$$

and the maximum value is $$\tau^s_{\frac{N'+1}{2}+1} = \frac{(N'+1)^2}{8} s_0 \quad (73)$$

For a 64-element array, N'=62. The error $s_0$ in the peak position measurement is magnified up to about 496 times in the derived phase-aberration value. Assume that the acceptable largest error of the derived phase-aberration value, which is at element j=(N'+1)/2 if N' is odd, or j=(N'÷1)/2±1/2 if N' is even, is one radian, then $s_0$ needs to be less than 1/496 radians, or 1/3115 wavelengths. For a pulse with 3.5 MHz centre frequency, it is about 0.1 ns, which is a very strict requirement. The dynamic near-field correction can eliminate this harmful systematic measurement bias across the array. If the correction angle is chosen properly, the echoes from over- and under-corrected regions will be well balanced and there will be no systematic bias across the array.

This brings up the question of the conditions under which the dynamic near-field correction is no longer needed, i.e. when it can be treated as a far-field case. When the dynamic near-field correction is not done, it can be assumed that $s_0$ is the error for echoes coming from the 90° direction, which is the most sensitive direction of an element with finite size. If the acceptable maximum error in the derived phase-aberration value is one radian, from equations (50) and (73), the distance $R_{ff}$ from where the near-field correction is no longer needed, is give by $$\frac{h^2 \kappa}{R_{ff}} = \frac{8}{(N-1)^2}. \quad (74)$$

Let the array length D=Nh, and assume N>>1, $$R_{ff} = 0.8 \frac{D^2}{\lambda_0}. \quad (75)$$

Thus, besides the wavelength, $R_{ff}$ depends only on the total a size of the array. Its value is of the same order as the various far-field distances defined for imaging, such as $D^2/4\lambda_0$, $D^2/\lambda_0$, $2D^2/\lambda_0$ etc. However, in terms of the aperture size of the three adjacent elements used to collect the two closest common midpoint signals, which is equal to 3h if the element size is h, $R_{ff}$ is much larger than the far-field distance for imaging, if N is sufficiently large. This can be seen clearly if one rewrites equation (75) as $$R_{ff} = 0.09 N^2 \frac{(3h)^2}{\lambda_0}. \quad (76)$$

For a 16-element array, 1.9 mm pitch and 0.31 mm wavelength (used in the simulation study did by Rachlin), $R_{ff}$ is about 2642 mm. Therefore, a dynamic near-field correction is needed for targets at a depth around 80 mm. For a 64-element array. 1 mm pinch, and 0.4 mm wavelength, $R_{ff}$ is about 8192 mm. For a 64-element array, to make $R_{ff}$ at 50 mm, the pitch h should be about 0.08 mm. In this case, the dynamic near-field correction is not necessary if only common midpoint signals collected by adjacent three elements are used for the measurement. This array has only a 5 mm total aperture, which is not very useful. Therefore, the dynamic near-field correction is generally needed for phase-aberration measurement for a medical ultrasound imaging system. The requirement in equation (75) may be loosened or tightened somewhat, but it is of a similar order.

If the mean of s is near zero, the standard deviation of s and n will dominate the measurement error in the derived phase-aberration value for each element. They also have to be small in order to measure the phase-aberration profiles accurately. The variances of $\Delta\tau^m$ are $$\sigma^2_{\Delta\tau^m_{j+1}} = \sigma^2_{\tau^s_{j+1}} + \sigma^2_{\tau^n_{j+1}} \quad j = 1, 2, \ldots N' \quad (77)$$

where $$\sigma^2_{\tau^s_{j+1}} = \sum_{i=1}^{N'} a^2_{ij} \sigma^2_{s_{i-1}} \quad j = 1, 2, \ldots N' \quad (78)$$

and $$\sigma^2_{\tau^n_{j+1}} = \sum_{i=1}^{N'} a^2_{ij} \sigma^2_{n_{i-1}} \quad j = 1, 2, \ldots N' \quad (79)$$

provided that peak-position measurement errors of cross-correlation functions are independent. If the variances of the errors for all measurement are identical, i.e.

$$\sigma^2_{s_{j+1}} = \sigma^2_{s_0} \text{ and } \sigma^2_{n_{j+1}} = \sigma^2_{n_0}, \text{ then} \quad (80)$$

$$\frac{\sigma^2_{\tau^s_{j+1}}}{\sigma^2_{s_0}} = \frac{j(N'+1-j)}{3(N'+1)} \left[ \frac{1}{2} + (N'+1)j - j^2 \right] \quad j = 1, 2, \ldots N$$

and $$\frac{\sigma^2_{\tau^n_{j+1}}}{\sigma^2_{n_0}} = \frac{j(N'+1-j)}{3(N'+1)} \left[ \frac{1}{2} + (N'+1)j - j^2 \right] \quad j = 1, 2, \ldots N. \quad (81)$$

They also reach their maximum at j=N'+1/2 and their maximum value is.

$$\sigma^2_{s_{\frac{N'+1}{2}+1}} = \frac{(N'+1)}{48}(N'^2 + 2N' + 3)\sigma^2_{s_0} \quad (82)$$

$$\sigma^2_{n_{\frac{N'+1}{2}+1}} = \frac{(N'+1)}{48}(N'^2 + 2N' + 3)\sigma^2_{n_0}. \quad (84)$$

Figure 16:
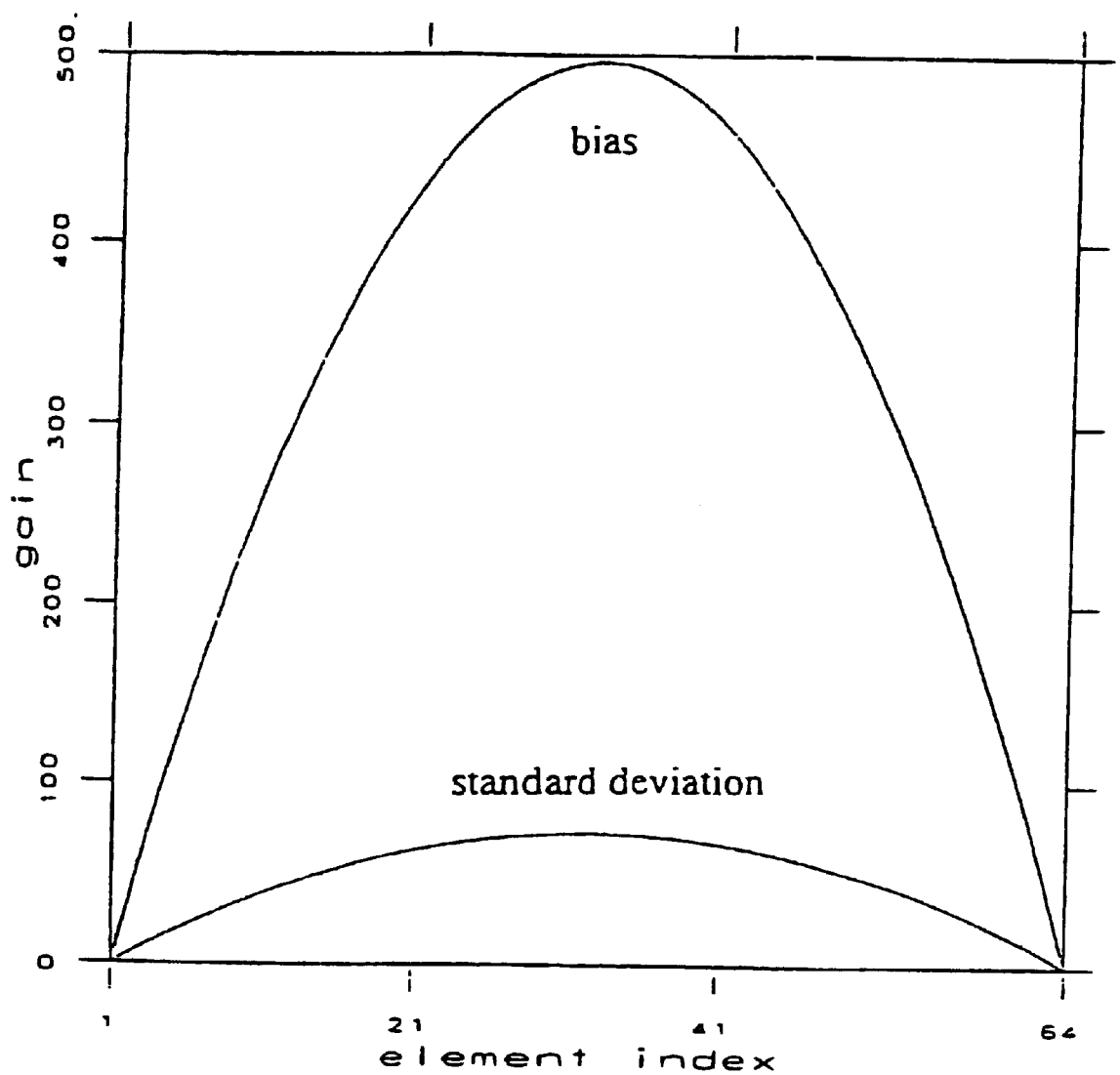
FIG. 16 shows how, for a 64-element array, the standard deviation of the measurement errors will be magnified up to about 72 times.

For a 64-element regular array, the standard deviation of the measurement errors will be magnified up to about 72 times, as shown in FIG. 16. Assume that the largest standard deviation of the derived phase-aberration value $\tau^m_{j+1}$, which is at element j=(N'+1)/2 if N' is odd, or j=(N'+1)/2±½ if N' is even, needs to be less than one radian, the standard deviation of peak position measurements has to be less than 1/72 radians, or 1/452 wavelengths. For a pulse with 3.5 MHz centre frequency, it is about 0.63 ns.

To reduce the standard deviation caused by the thermal noise, the cross-correlation signal length can be increased. Reciprocal signals can be averaged if the aberration profiles for transmission and reception are identical. To reduce the standard deviation caused by signals coming from the region of non-redundancy, one can use echoes from a deeper range, and optimize the correction angle to the volume of the region of redundancy. The region of redundancy is defined as the region from where the shift between the same echo in the two dynamically corrected common midpoint signals is less than the required standard deviation value. It is 0.6 ns in the example in the last paragraph.

Figure 17A:
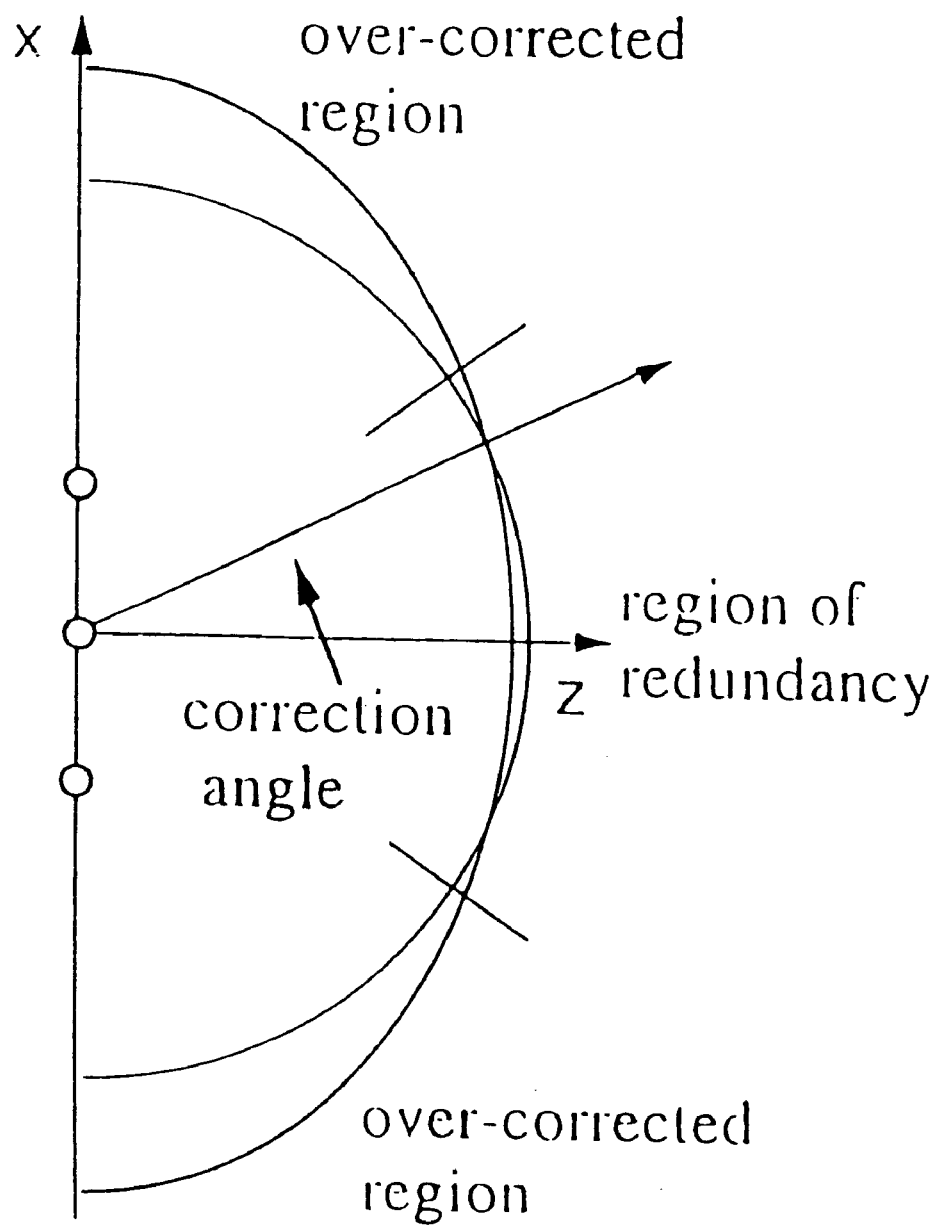
FIG. 17(a) shows the optimum correction angle when there is an overcorrected region.
Figure 17B:
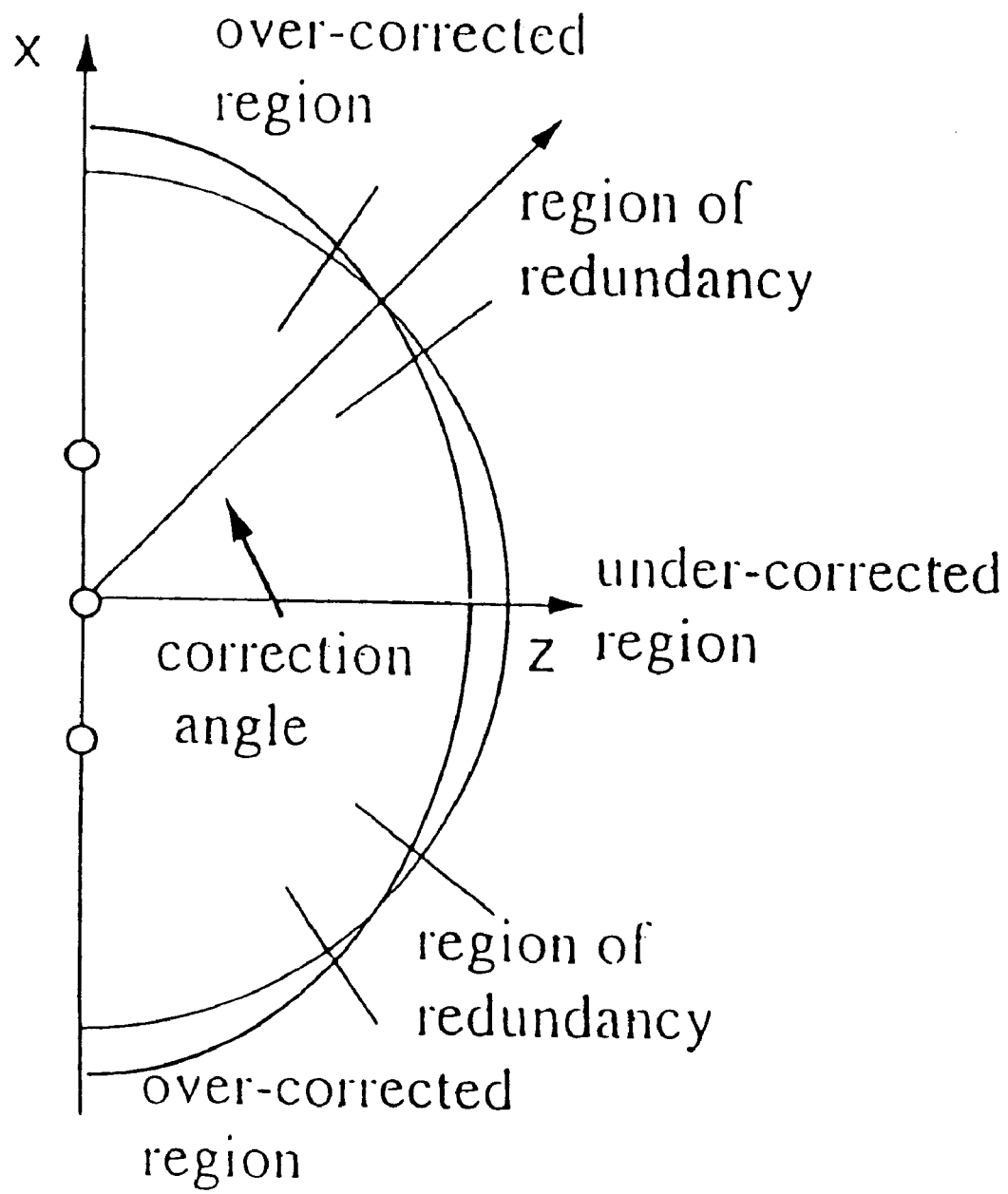
FIG. 17(b) shows the signal strength coming from the over- and under-corrected regions.

There is a dilemma here. The optimum correction angle in terms of maximizing the volume of the region of redundancy, which is important for reducing the variance of s, occurs when there is an over-corrected region only, as shown in FIG. 17(a). To eliminate the bias in the peak position measurement, the signal strength coming from over- and under-corrected regions has to be well balanced, as shown in FIG. 17(b). Non-zero element size eliminates this dilemma. This is discussed hereinafter.

The need for high accuracy in the cross-correlation function peak position measurement requires that the dynamic near-field correction is done at equally high accuracy, the dynamically corrected common midpoint signals are highly correlated, and their relative time shift satisfies equation (59) with minimum bias. The signal-to-thermal noise ratio of the cross-correlation function should also be high.

Note that breaking up the array into many small sub-arrays to relax the measurement error requirement may not work, since phase-aberration profiles derived for each sub-array will have a different linear component error. Attempts to force these linear error terms to fall on the same line will probably result in a high required measurement accuracy which is the same as that when using the whole array. For a linear array, when the image under part of the array only needs to be corrected, the phase-aberration profile measurement can be done using only those relevant elements to reduce the accuracy requirement.

Different Transmission and Reception Phase-Aberration Profiles

Phase-aberration profile differences between fission and reception are usually caused by phase differences between electronic systems in each channel in an imaging system. Since measurement errors of cross-correlation function peak positions will be magnified in the derived phase-aberration values at each element, the retirement that channels be assumed identical is much stricter for phase-aberration measurement than for image forming. Therefore, the system calibration on a commercial machine may not be accurate enough. Reciprocal signals are very useful for measuring transmission and reception phase-aberration profiles separately, since reciprocal signals will have a relative phase shift if phases for each channel are different and this relative phase shift is independent of the phase aberrations caused by the medium. Methods for phase-aberration measurement when transmission and reception profiles are different are discussed below for two situations.

A. Small Differences Between Transmission and Reception Phase-Aberration Profiles When the difference between transmission and reception aberration profiles is small enough for the purpose of image forming, the following method can be used. The two reciprocal signals $y_{j+1,\ j-1}(t)$ and $y_{j-1,\ j+1}(t)$ are dynamically corrected and cross-correlated with $y_{j,\ j}(t)$ separately. Let $\phi_j$ and $\theta_j$ denote the transmission and reception phase-aberration values at element j respectively, and the peak position of the two normalized cross-correlation functions be at $\Delta\tau_{j,\ j+1}$ and $\Delta\tau_{j,\ j-1}$ respectively, then, $$\Delta\tau_{j,j-1} = \phi_j + \theta_j - \phi_{j-1} - \theta_{j+1} \tag{84}$$

$$\Delta\tau_{j,j+1} = \phi_j + \theta_j - \phi_{j+1} - \theta_{j-1}. \tag{85}$$

Adding equations (84) and (85) together, $$\Delta\tau_{j,j+1} + \Delta\tau_{j,j-1} \approx 2\gamma_j - \gamma_{j-1} - \gamma_{j+1} \tag{86}$$

where $$\gamma_j = \phi_j + \theta_j. \tag{87}$$

Assuming $\gamma_1 = \gamma_N = 0$, the profile of g can be obtained by solving $$\begin{bmatrix} 2 & -1 & 0 & \ldots & \ldots & 0 & 0 & 0 \\ -1 & 2 & -1 & 0 & \ldots & \ldots & 0 & 0 \\ 0 & -1 & 2 & -1 & 0 & \ldots & \ldots & 0 \\ \ldots & \ldots & \ldots & \ldots & \ldots & \ldots & \ldots & \ldots \\ 0 & \ldots & \ldots & 0 & -1 & 2 & -1 & 0 \\ 0 & 0 & \ldots & \ldots & 0 & -1 & 2 & -1 \\ 0 & 0 & 0 & \ldots & \ldots & 0 & -1 & 2 \end{bmatrix} \begin{bmatrix} \gamma_2 \\ \gamma_3 \\ \gamma_4 \\ \ldots \\ \gamma_{N-3} \\ \gamma_{N-2} \\ \gamma_{N-1} \end{bmatrix} = \tag{88}$$

$$\begin{bmatrix} \Delta\tau_{2,3} + \Delta\tau_{2,1} \\ \Delta\tau_{3,4} + \Delta\tau_{3,2} \\ \Delta\tau_{4,5} + \Delta\tau_{4,3} \\ \ldots \\ \Delta\tau_{N-3,N-2} + \Delta\tau_{N-3,N-4} \\ \Delta\tau_{N-2,N-1} + \Delta\tau_{N-2,N-3} \\ \Delta\tau_{N-1,N} + \Delta\tau_{N-1,N-2} \end{bmatrix}$$

which is similar to equation (61). The solution of equation (88) is $$\gamma_{j-1} = \sum_{i=1}^{N'} a_{ji}(\Delta\tau_{i+1,i+2} + \Delta\tau_{i+1,i}) \quad j = 1, 2, \cdots N. \tag{89}$$

Since the difference between transmission and reception phase-aberration profiles is small for image forming, the approximation of $$\phi_j = \theta_j = \frac{\gamma_j}{2} \tag{90}$$

can be used for both transmission and reception phase-aberration corrections. There is no need to measure them separately. That is, when the difference between transmission and reception phase-aberration profiles is small for image forming purposes but large for the phase-aberration measurement, they have to be treated as different when doing the phase-aberration measurement, but they can be treated as the same in the image forming process after the measurement.

The $\gamma_j$ value derived from equation (89) has a linear error term from its true value $\gamma'_j$ $$\gamma'_j = \gamma_j + a_\gamma + b_\gamma(j-1) j=1,2,\ldots N \tag{91}$$

where $$\gamma'_j = \phi'_j + \theta'_j. \tag{92}$$

$f'_j$ and $q'_j$ are true phase-aberration values. From the assumption that $\gamma_1 = \gamma_N = 0$ $$a_\gamma = \phi'_1 + \theta'_1 \tag{93}$$

and $$b_\gamma = \frac{(\phi'_N - \phi'_1) + (\theta'_N - \theta'_1)}{N-1} \qquad (94)$$

From equation (90), the error terms for $\phi$ and $\theta$ are $$a_\theta = a_\phi = \frac{a_\gamma}{2} = \phi'_1 = \theta'_1 \qquad (95)$$

and $$b_\phi = b_\theta = \frac{b_\gamma}{2} = \frac{\phi'_N - \phi'_1}{N-1} = \frac{\theta'_N - \theta'_1}{N-1}. \qquad (96)$$

From equation (89), the variance in the derived $\phi$ and $\theta$ profiles arising from thermal noise is $$\frac{\sigma^2_{\phi'_{j-1}}}{\sigma^2_{n_0}} = \frac{\sigma^2_{\theta'_{j-1}}}{\sigma^2_{n_0}} = \frac{1}{2}\frac{j(N'+1-j)}{3(N'+1)}\left[\frac{1}{2} + (N'+1)j - j^2\right] \qquad (97)$$

$$j = 1, 2, \ldots N$$

provided that the variance arising from thermal noise is the same for all measurements. Compared with equation (81), the extra ½ at the front of equation (97) is owing to the averaging of two separate measurements. The variance arising from echoes coming from the region of non-redundancy is still as expressed in equation (80), since this noise is identical in the two cross-correlation functions.

B. Large Differences Between Transmission and Reception Phase-Aberration Profiles If the difference between transmission and reception phase-aberration profiles is large for the purpose of image forming, their average can not be used for both transmission and reception corrections. In this case, they must be measured separately. The following method can be used. It uses the solution $\gamma$ from equation (89) and the solution derived from reciprocal signals $y_{j,\,j-1}(t)$ and $y_{j-1,j}(t)$, collected from adjacent element pairs, to solve $\phi$ and $\theta$ separately. The peak positions $\Delta\tau_{j,\,j-1}$ of the cross-correlation function between the two reciprocal signals $y_{j,\,j-1}(t)$ and $y_{j-1,j}(t)$ is $$\Delta_{j,j-1} = (\phi_j + \theta_{j-1}) - (\phi_{j-1} + \theta_j) \qquad (98)$$
$$= \beta_j - \beta_{j-1} \qquad j = 2, 3, \cdots N$$

where $$\beta_j = \phi_j - \theta_j. \qquad (99)$$

By assuming $$\beta_1 = 0 \qquad (100)$$

the profile of $\beta$ can be derived from $$\beta_j = \sum_{i=2}^{j} \Delta\tau_{i,i-1} \qquad j = 2, 3, \cdots N \qquad (101)$$

From $\gamma$ and $\beta$, the phase-aberration profiles of transmission and reception can be obtained from $$\phi_j = \frac{\gamma_j + \beta_j}{2} \qquad (102)$$

$$\theta_j = \frac{\gamma_j - \beta_j}{2}. \qquad (103)$$

Equation (100) gives $\beta$ a constant error term from its real value $\beta'$, $$\beta'_j = \beta_j + a_\beta. \qquad (104)$$

From equation (100), $$a_\beta = \beta'_1 = \phi'_1 - \theta'_1. \qquad (105)$$

The transmission and reception phase-aberration profiles in equations (102) and (103) are derived on the assumptions that $\gamma_1 = \gamma_N = \beta_1 = 0$, that is $$\left.\begin{array}{l}\phi_1 + \theta_1 = 0 \\ \phi_N + \theta_N = 0 \\ \phi_1 - \theta_1 = 0\end{array}\right\} \qquad (106)$$

which is $$\left.\begin{array}{l}\phi_1 = 0 \\ \theta_1 = 0 \\ \phi_N = -\theta_N\end{array}\right\}. \qquad (107)$$

Because of the above assumptions, there are errors in the measured $\phi$ and $\theta$ profiles. The errors can be derived from the errors of $\gamma$ and $\beta$. From relevant equations between equations (90)–(107), $$\phi'_j = \frac{\gamma'_j + \beta'_j}{2} = \phi_j + a_\phi + b(j-1) \quad j = 1, 2, \cdots N \qquad (108)$$

$$\theta'_j = \frac{\gamma'_j - \beta'_j}{2} = \theta_j + a_\theta + b(j-1) \quad j = 1, 2, \cdots N \qquad (109)$$

where $$a_\phi = \frac{a_\gamma + a_\beta}{2} = \phi'_1 \qquad (110)$$

$$a_\theta = \frac{a_\gamma + a_\beta}{2} = \theta'_1 \qquad (111)$$

and $$b = \frac{b_\gamma}{2} = \frac{[\phi'_N - \phi'_1] + [\theta'_N - \theta'_1]}{2(N-1)}. \qquad (112)$$

The measured profiles $\phi_j$ and $\theta_j$ are related to the true profiles $\phi'_j$ and $\theta'_j$ by $$\phi_j = \phi'_j - \phi'_1 - \frac{[\phi'_N - \phi'_1] + [\theta'_N - \theta'_1]}{2(N-1)}(j-1) \qquad (113)$$

$$\theta_j = \theta'_j - \theta'_1 - \frac{[\phi'_N - \phi'_1] + [\theta'_N - \theta'_1]}{2(N-1)}(j-1) \qquad (114)$$

The advantage of this method is that the steering error constant b is the same for the measured transmission and reception phase-aberration profiles. This is an important advantage. If they are different, the transmission beam may steer to one direction, and the receiving beam may steer to another, which will deteriorate the focusing ability of the system.

From equation (101), the variance of the error arising from thermal noise in the derived β value is $$\frac{\sigma_{\beta_{j-1}^n}^2}{\sigma_{n_0}^2} = j \quad j = 1, 2, \ldots N' + \quad (115)$$

if the variance is $\rho_{n_0}^2$ for all the peak position measurements and the measurements are independent. From equations (102) and (103), the variance arising from thermal noise in the derived φ and θ profiles is $$\frac{\sigma_{\phi_{j-1}}^2}{\sigma_{n_0}^2} = \frac{\sigma_{\theta_{j-1}}^2}{\sigma_{n_0}^2} = \frac{j(N'+1-j)}{6(N'+1)}\left[\frac{1}{2} + (N'+1)j - j^2\right] + \frac{j}{4} \quad (116)$$

$$j = 1, 2, \ldots N' +$$

The noise contribution from the β measurement can be reduced by the following methods. If the element size is small enough so that the received signal at one end of the array has enough signal-to-noise ratio for echoes coming from the region of interest when the element at the other end is the transmitter, the noise from the β measurement can be reduced by cross correlating reciprocal signals collected with the first element as one element for all signals. In which case, $$\beta_j = \Delta\tau_{j,1} \, j=2, 3, \ldots N, \quad (117)$$

and the noise from the β measurement will be negligible; the variance in the derived φ and θ profiles will be similar to equation (97). If the element size is large, the signal-to-noise ratio of the received signals from a large transmitter-receiver off-set is very small. Errors on the cross-correlation function peak position measurements will be introduced. In this case, the array can be separated into several sub-arrays. For all signals collected in each sub-array, the last element of the previous sub-array is used as a receiver or a transmitter, except in the first sub-array where the first element is used in all signal collections.

The variance of the derived φ and θ profiles arising from echoes coming from the region of non-redundancy is the same as shown in equation (80). The β measurement generally does not introduce any structure noise, since the two signals are supposed to be identical even in the near field.

Optimising the Correction Angle

The dynamic near-field correction angle which maximizes the peak value of the normalized cross-correlation function is used as the optimum correction angle in this algorithm. This angle can be different from the angle which maximizes the volume of the region of redundancy. It may also be different for signals collected from different elements. This optimum angle is jointly determined mainly by the volume of the region of redundancy, target distribution, and the element size. These will be analyzed below.

A. Volume of the Region of Redundancy

As shown in FIG. 10, the angular width of the region of redundancy subject to a certain accuracy requirement for a particular pulse length has a maximum at a correction angle near 90°. At this angle, scatterers in a maximum volume region will produce an error which is less than the required limit, in which case the normalized cross-correlation function peak generally reaches a maximum value. The variance of the noise caused by echoes coming from the region of non-redundancy is also minimized. This maximum angular width is also influenced by phase-aberration values, as shown in equation (50). The optimum correction angle occurs when the error for echoes coming from the 90° direction is just below the required measurement accuracy, as shown in FIG. 17(*a*). In this case, there will be a bias in the measurement since all the echoes coming from the region of non-redundancy are over-corrected. When the correction angle is less than that which maximizes the volume of the region of redundancy, as shown in FIG. 17(*b*), there will be over- and under-corrected signals, which may reduce the measurement bias. But the measurement variance arising from the structure noise increases because of the increased volume of the region of non-redundancy. The peak value of the normalized cross-correlation function may also decrease. This trade-off between reducing measurement bias and reducing measurement variance arising from signals coming from the region of non-redundancy no longer exists when the element has a finite size.

B. Element Size

The analysis done herein was based on assuming omni-directional point elements. Usually the element has a finite width which is very close to the separation (pitch) between elements. Because received signals are the average across the element surface, and the transmitted signal is not from a point source, common midpoint signals are only an approximation. In this case, since the element is equivalent to a point element at the centre of each element, even doing dynamic near-field correction at 90° direction, there will be signals that are over- and under-corrected. Therefore, increasing element size reduces measurement bias after the dynamic near-field correction. But, if no dynamic near-field correction is made, bias still occurs. The adverse effect of finite element size is that it increases the variance of the measurement because the correction is only an approximation. On the other hand, an element with a finite element size has an angular response pattern for transmission and reception. It is more sensitive to echoes coming from the region of redundancy around 90° and less sensitive to the region of non-redundancy. This will reduce the variance of the measurement. A quantitative analysis of this effect will be given later. Another adverse effect of finite element size is that the phase-aberration value for each element is an average across the element surface.

C. Target Distribution

If the medium contains statistically homogeneous speckle-generating random scatterers, maximizing the volume of the region of redundancy will maximize the similarity between corrected common midpoint signals. But, when there are strong reflectors or boundaries in the medium, better similarity can be achieved by adjusting the correction angle so that those strong reflectors are inside the region of redundancy. This can be done by making corrections at several angles, and using the one that gives the maximum cross-correlation function peak value for phase aberration measurement. But, regions where specular reflections exist should be avoided, since the signal redundancy principle for common midpoint signals is not valid when the target is a specular reflecting plane. Echoes from a specular reflecting plane may give bias in the cross-correlation peak position measurement.

The above three factors will influence the peak value and position of normalized cross-correlation functions in a complicated way. Using the position of the maximum cross-correlation peak of several correction angles, which is above a threshold, is the rule in this algorithm.

Simultaneous Transmission

To collect common midpoint signals by transmitting one element at a time may take about 13 ms for a 64-element array (assuming 200 ms interval between transissions). It is possible to reduce this time. Depending on the situation, each transmitting element may use a different frequency band to collect data simultaneously or with a few transmissions. The region of redundancy depends on the pulse length. Under certain circumstances, a large enough volume of the region of redundancy can be obtained with a relatively narrow band pulse compared with that used for imaging forming. For example, assume a 64-element array with the element size and pitch equal 1 mm, $\lambda_0$=0.4 mm, and target depth at 50 mm, from FIG. 12, for a pulse length of 4 mm ($\Delta R$=1 mm), the angular width of the region of redundancy is about 26°, which is about the width of the major responding directions of the element. It corresponds to a bandwidth of about 0.4 MHz if the velocity is 1540 ms$^{-1}$. Thus five elements can transmit together in a 2 MHz bandwidth. According to equations (31) and (A7), for smaller pitch arrays more elements can be used simultaneously. It will increase the speed of data collection at the expense of accuracy in measuring phase-aberration profiles.

Summary

A phase-aberration measurement algorithm has been hereinbefore described. This algorithm includes the following steps:

(1) Common midpoint signals are collected by a multiple or simultaneous transmitting method.

(2) Dynamic near-field corrections are applied on signals that have different transmitting and receiving elements. This correction can be done at several angles.

(3) Common midpoint signals are cross-correlated at a selected depth with a selected window length.

(4) The relative time shift between these signals is measured from the peak position of the cross-correlation functions.

(5) Phase-aberration values for each element are derived.

(6) When necessary, the undetermined linear term is adjusted to optmize the performance of the system.

The required accuracy on the relative time shift measurement between common midpoint signals has been derived. It is found that the requirement is higher on the measurement bias than on the measurement standard deviation; both requirements are very stringent The requirement for treating the problem as a far-field case has also been derived. It is found that under most situations in medical ultrasound imaging, the dynamic near-field correction is unavoidable for the successful measurement of phase-aberration profiles using the signal redundancy method.

Maximizing the volume of the region of redundancy and putting strong targets inside the region of redundancy will reduce the measurement variance arising from echoes coming from regions of non-redundancy.

Non-zero element size makes elements less sensitive to echoes coming from regions of non-redundancy and reduces the measurement bias after the dynamic near-field correction. But it also has adverse effects, such as that common midpoint signals are only an approximation and phase aberrations are averaged across the element surface.

To reduce the measurement variance caused by thermal noise, long signal length can be used for cross correlations. Reciprocal signals can also be averaged to improve the signal-to-noise ratio. But, if the transmission and reception phase-aberration profiles are different, they should not be averaged since the two signals will have a relative time shift. The requirement for them to be considered as having the same phase is high. The phase difference between them which can be tolerated for image forming generally can not be tolerated for phase-aberration measurement using the signal redundancy method discussed here. Two methods for measuring different transmission and reception phase-aberration profiles have been proposed in this invention. When the difference between transmission and reception phase-aberration profiles is small for imaging purpose but large for phase-aberration measurement, they have to be treated as different when doing the measurement, but they can be treated as the same after the measurement. If the difference between transmission and reception phase-aberration profiles is large for image-forming purposes, their average can not be used for both transmission and reception corrections. In this case, they must be measured separately. The proposed method gives identical steering errors in the derived transmission and reception phase-aberration profiles, which is important to obtain good image quality.

A simultaneous transmission method was proposed in which each transmitting element uses a different frequency band to collect data simultaneously. It increases the data-collecting speed by sacrificing the measurement as accuracy.

This method does not require a prior knowledge of the aberrating medium, nor does it require a special target, or iteration. It can be used for two- or one-and-a-half-dimension arrays. It is valid for other near-field pulse-echo imaging systems. The computation load of this method is not heavy compared with other proposed methods. The dynamic near-field correction in FIG. 15 is similar to the dynamic focusing process on reception, the relative time delay measurement is needed in almost any method, and the weight-and-add process can be done quickly.

Amplitude Aberration Correction using the Near Field Signal Redundancy Method

A. Introduction

Amplitude aberration caused by attenuation in homogeneity in a medium or system errors is another limit on imaging system performance. Image quality is less sensitive to amplitude aberrations compared with phase aberrations. It will increase the average side lobe level if its shape is not right, which is generally the case. When amplitude aberrations are severe, it must be corrected to obtain a good quality image.

The method herein proposed uses the near field signal redundancy principle which was used in the phase aberration correction algorithm discussed hereinbefore. Therein, it is shown that, in near field, common midpoint signals only become (in terms of phase) redundant for signals comes from around a direction if they are dynamically corrected in that direction for the near field effect. This means that the phase will be identical for echoes comes from that direction in these common midpoint signals. They will also be redundant in terms of amplitude if the medium is attenuation homogenous and the distance between elements is much smaller than the distance from the target to the array surface. If only the neighbouring three elements are used to collect common midpoint signals, the amplitude can be considered as redundant for dynamically corrected signals. This provides a method for amplitude aberration measurements.

To use redundancy method for amplitude aberration measurements, the attenuation in homogeneity should be able to be modelled as an amplitude screen on the transducer surface. Generally this model is valid for signals which come from certain angle range, or isoplanatic patch. The valid angle range will be larger if the inhomogeneity occurs near to the surface of the transducer array. When transducer elements have a relatively large size compared with the wavelength, which will limit its sensitive angle to a small angular range, the model will be more accurate—far away aberrations can sometimes be included.

Before describing the proposed method which can be incorporated into the phase aberration algorithm hereindescribed without much cost, it should be noted that since amplitude redundancy is much less sensitive to near field effect than phase, and the measurement accuracy requirement is also low for amplitude aberration correction, the common midpoint signals may not need a complete dynamic correction at high sampling rate, and the phase aberration may not need to be corrected before measuring the amplitude aberration. This will speed up the process of amplitude aberration measurements. However, when amplitude and phase aberration are both present, incorporation of the amplitude aberration measurement into the phase aberration measurement algorithm will not add much cost, when measuring it on common midpoint signals which are dynamically corrected for near field effect with a high sampling rate and phase aberration corrected.

In the phase aberration correction algorithm described hereinbefore, there is a step to calculate normalised cross correlation functions and measure their peak positions. The two signal energies used to normalise the cross correlation function at its peak position can be used duly for amplitude aberration measurement. These energies are calculated with the common midpoint signals which are dynamically corrected at high sampling rate, and phase shifted to compensate the phase aberration. Therefore, the two energies should be identical for the two common midpoint signals, if the difference of travelling length between the two signals can be ignored.

When element i is the transmitter and element j is the receiver, the received signal energy from time $t_1$ to $t_2$ can be expressed as:

$$E_{i,j} = \int_{t_1}^{t_2} y_{i,j}^2(t)dt = A_{iT}^2 A_{jR}^2 \int_{t_1}^{t_2} y'^2_{i,j}(t)dt \quad (118)$$

where $A_{iR}$ and $A_{iT}$ are transmission and reception amplitude sensitivities, $y_{i,j}$ is the dynamically corrected received signal at element j when element i is the transmitter. $y'_{i,j}$ is $y_{i,j}$ when the elements have an unit amplitude sensitivity. When the amplitude screen model is valid, they include both system errors and medium aberrations. For common midpoint signals:

$$E_{i,i} = \int_{t_1}^{t_2} y_{i,i}^2(t)dt = A_{iT}^2 A_{iR}^2 \int_{t_1}^{t_2} y'^2(t)dt \quad (119)$$

$$E_{i+1,i-1} = \int_{t_1}^{t_2} y_{i+1,i-1}^2(t)dt = A_{i+1,T}^2 A_{i-1,R}^2 \int_{t_1}^{t_2} y'^2(t)dt \quad (120)$$

$$E_{i-1,i+1} = \int_{t_1}^{t_2} y_{i-1,i+1}^2(t)dt = A_{i-1,T}^2 A_{i+1,R}^2 \int_{t_1}^{t_2} y'^2(t)dt \quad (121)$$

$y'_{i,j}$ is identical in above three equations since these signals are redundant. These energies can be used for amplitude aberration measurements since these energies should be same for redundant signals. Any difference should be caused by the attenuation inhomogeneity or system errors. The following will discuss methods to measure the amplitude aberration profiles.

B. Algorithm for Identical Transmission and Reception Amplitude Aberration Profiles In this case: $A_{iT}=A_{iR}=A_i$, and from equations (120) and (121):

$$E_{i-1,i+1}=E_{i+1,i-1}=E'_i \quad (122)$$

where $E'_i$ is for the signal collected using element i−1 and i+1 elements. The two reciprocal signals can be average before calculating $E_i$ to reduce the influence of noise.

Let $$h_i = \log_{10} \sqrt{\frac{E_{ij}}{E'_i}} \quad (123)$$

$$a_i = 2 \log_{10} A_i \quad (124)$$

then:

$$2a_i - a_{i-1} - a_{i+1} = h_i, i=2,3,\ldots N-1 \quad (125)$$

Any aberration distribution which satisfy the following equation:

$$a'_i = a_i + a + b(i-1) \quad (126)$$

will satisfy equation (125), where a and b are arbitrary constants. Equation (8) can be solved by assuming $$a'_1 = a'_N = 0 \quad (127)$$

as it is done in phase aberration measurement. It is equivalent to assume:

$$A'_1 = A'_N = 11 \quad (128)$$

In this case, a and b values which satisfy equation (126) are:

$$a = -\alpha_1$$

$$b = -\frac{\alpha_N - \alpha_1}{N-1} \quad (129)$$

and the solution of the amplitude profile is:

$$A'_i = 10^{a'_i} = \frac{A_i}{A_1}\left(\frac{A_1}{A_N}\right)^{\frac{i-1}{N-1}} \quad i=1,2,\cdots N \quad (130)$$

Figure 18:
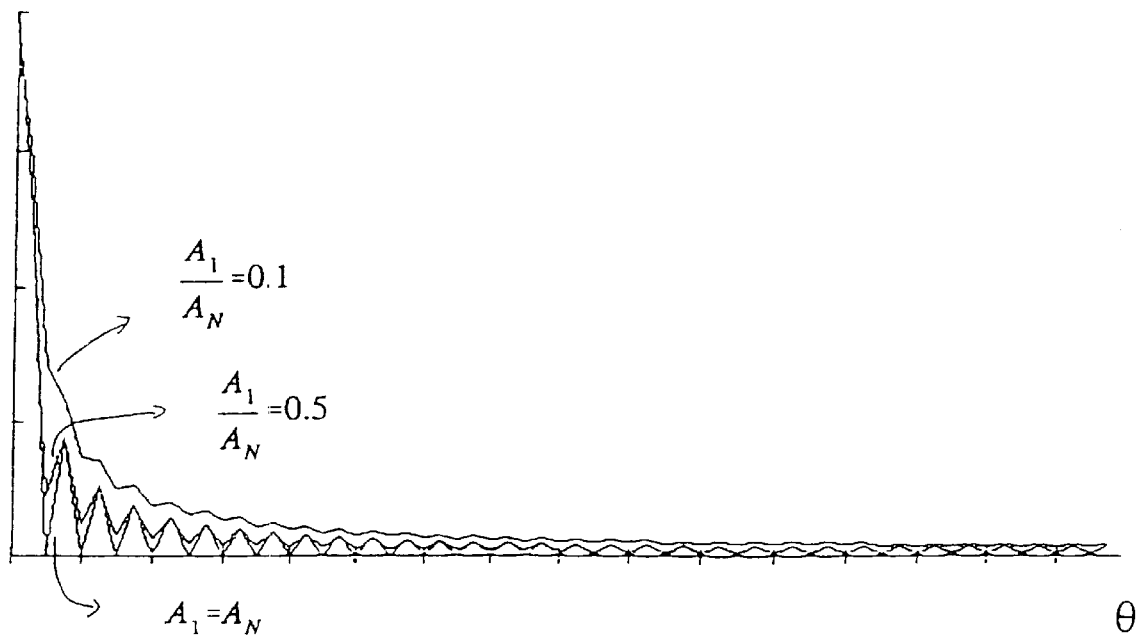
FIG. 18 shows the influence of arbitrary terms in amplitude aberration measurements.

It can be seen that, the measured amplitude value $A'_i$ is normalised by $A_1$ and weighted by a factor which depends on the element index. The influence of the weighting factor is equivalent to an apodizing window. As shown in FIG. 18, for N=64 and the ratio of the two amplitudes at each ends is around 1, the effect can be ignored. If the ratio is less than 2 (or bigger than 0.5), it is still acceptable.

C. Algorithm for Different Transmission and Reception Amplitude Aberration Profiles When amplitude aberration profiles are different for transmission and reception, $E_{i-1,i+1}$ will not equal to $E_{i+1,i-1}$. Let $$h_i = \log_{10}\sqrt{\frac{E_{i,i}}{E_{i-1,i+1}}} + \log_{10}\sqrt{\frac{E_{i,i}}{E_{i+1,i-1}}} \quad (131)$$

$$a_i = \log_{10}(A_{iR}A_{iT}) \quad (132)$$

then equation (125) is still valid, and $\alpha_i$ can be derived by assuming:

$$a'_1 = a'_N = 0 \quad (133)$$

which is:

$$A'_{1R}A'_{1T} = A'_{NR}A'_{NT} = 1 \quad (134)$$

To separate transmission and reception amplitudes, another group of equations is needed. It can be obtained from the two reciprocal signals collected by using two neighboring elements:

$$E_{i,i+1} = \int_{t_1}^{t_2} y_{i,i+1}^2(t)dt = A_{i,T}^2 A_{i+1,R}^2 \int_{t_1}^{t_2} y'^2(t)dt \qquad (135)$$

$$E_{i+1,i} = \int_{t_1}^{t_2} y_{i+1,i}^2(t)dt = A_{i+1,T}^2 A_{i,R}^2 \int_{t_1}^{t_2} y'^2(t)dt \qquad (136)$$

Note that y' is identical for $y_{i,i+1}$ and $y_{i+1,i}$ even without dynamic near field correction. Let $$m_i = \log_{10}\sqrt{\frac{E_{i,i+1}}{E_{i+1,i}}} \qquad (137)$$

$$\beta_i = \log_{10}\left(\frac{A_{iR}}{A_{iT}}\right) \qquad (138)$$

then:

$$\beta_{i+1} - \beta_j = m_i, i=1,2,\ldots N-1 \qquad (139)$$

Any aberration distributions which satisfy the following equation:

$$\beta'_i = \beta_i + a_1 \qquad (140)$$

will sat equation (139), where $a_1$ is an undetermined arbitrary constant. Equation (139) can be solved by assuming $\beta'_1=1$, that is assuming the transmission and receiving amplitudes are the same for the first element. Then:

$$\beta'_i = \sum_{j=1}^{i-1} m_j \quad i=2,3,\ldots N-1 \qquad (141)$$

$$a_1 = -\beta_1 \qquad (142)$$

From $\alpha'_i$ and $\beta'_i$, the transmission and reception amplitude profiles can be derived:

$$A'_{iR} = 10^{\frac{(\alpha'_i + \beta'_i)}{2}} \qquad (143)$$

$$A'_{iT} = 10^{\frac{(\alpha'_i - \beta'_i)}{2}} \qquad (144)$$

From equations (126) (129) (132) (138) (140) and (142), the measured amplitude values are:

$$A'_{iR} = \frac{A_{iR}}{A_{1R}}\left(\sqrt{\frac{A_{1R}A_{1T}}{A_{NR}A_{NT}}}\right)^{\frac{i-1}{N-1}} \qquad (145)$$

$$A'_{iT} = \frac{A_{iT}}{A_{1T}}\left(\sqrt{\frac{A_{1R}A_{1T}}{A_{NR}A_{NT}}}\right)^{\frac{i-1}{N-1}} \qquad (146)$$

It is shown that the measured amplitude profiles are normalised by the value at first element, and there is an apodizing window, which is identical for transition and reception profiles. This is not necessarily an advantage, however, as it is in the case of phase on profile measurements.

D. Using Less Accurate Redundant Signals

In the above method, the amplitude aberration correction is incorporated into the phase aberration correction algorithm. Since in the process of phase aberration measurements, signal energies will be measured, which is dynamically corrected at high sampling rate and phase aberration corrected, it costs almost nothing to use these high accuracy values.

But generally, amplitude aberration measurements can be done using much less accurate redundant signals, since signal amplitude redundancy is much less sensitive to near field effect comparing with phase redundancy. Also, the measurement accuracy requirement is not as high as for phase aberration correction. The following compromises can be used to speed up the process of amplitude aberration measurements when it is needed: use common midpoint signals which are 1] not dynamic near field corrected
2] not phase aberration corrected
3] demodulated
4] sampled at low rate Aberration Correction for Two or One and a Half Dimensional Arrays The principle of phase and amplitude aberration correction algorithms developed hereinafter and in section I for a one dimensional array, can be applied to two or one and a half dimensional arrays, but additional processing; is needed to calculate the results. One problem is how to make the undetermined arbitrary errors in the result to be in a plane. Since there is one more direction which can be used for the measurement, two independent measurements which use signals that have the same degree of similarity can be made for a two dimensional array. This provides an opportunity to reduce measurement noise which does not exist for a one dimensional array. Algorithms for measuring phase and amplitude aberration profiles on a two or one and half dimensional array and for improving measurement accuracy are discussed below.

A. Phase Aberration Profile Measurement

1] Identical Transmission and Reception Phase Aberration Profiles

Figure 19:
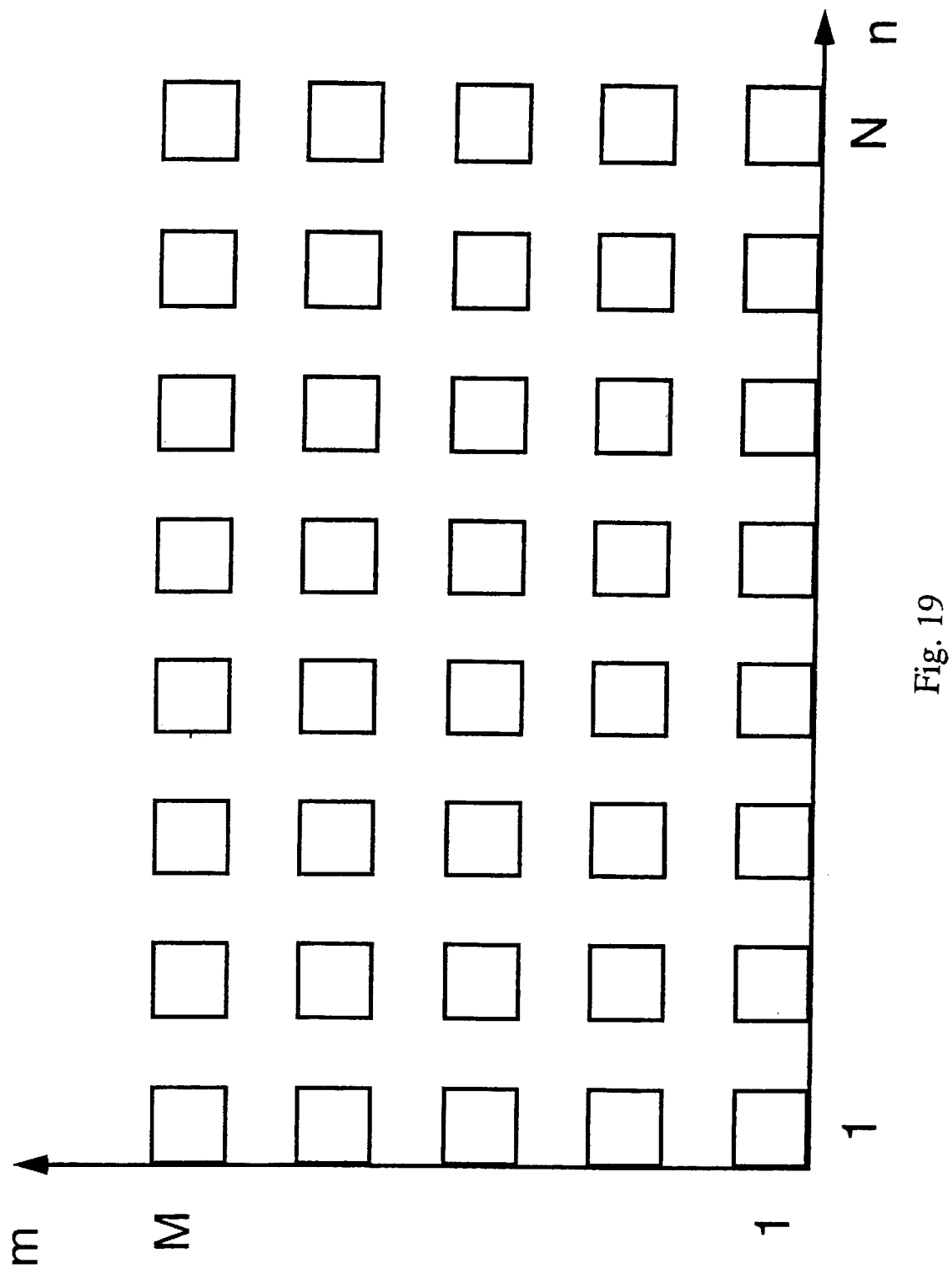
FIG. 19 shows the Geometry of a two or one and a half dimensional array.
Figure 20:
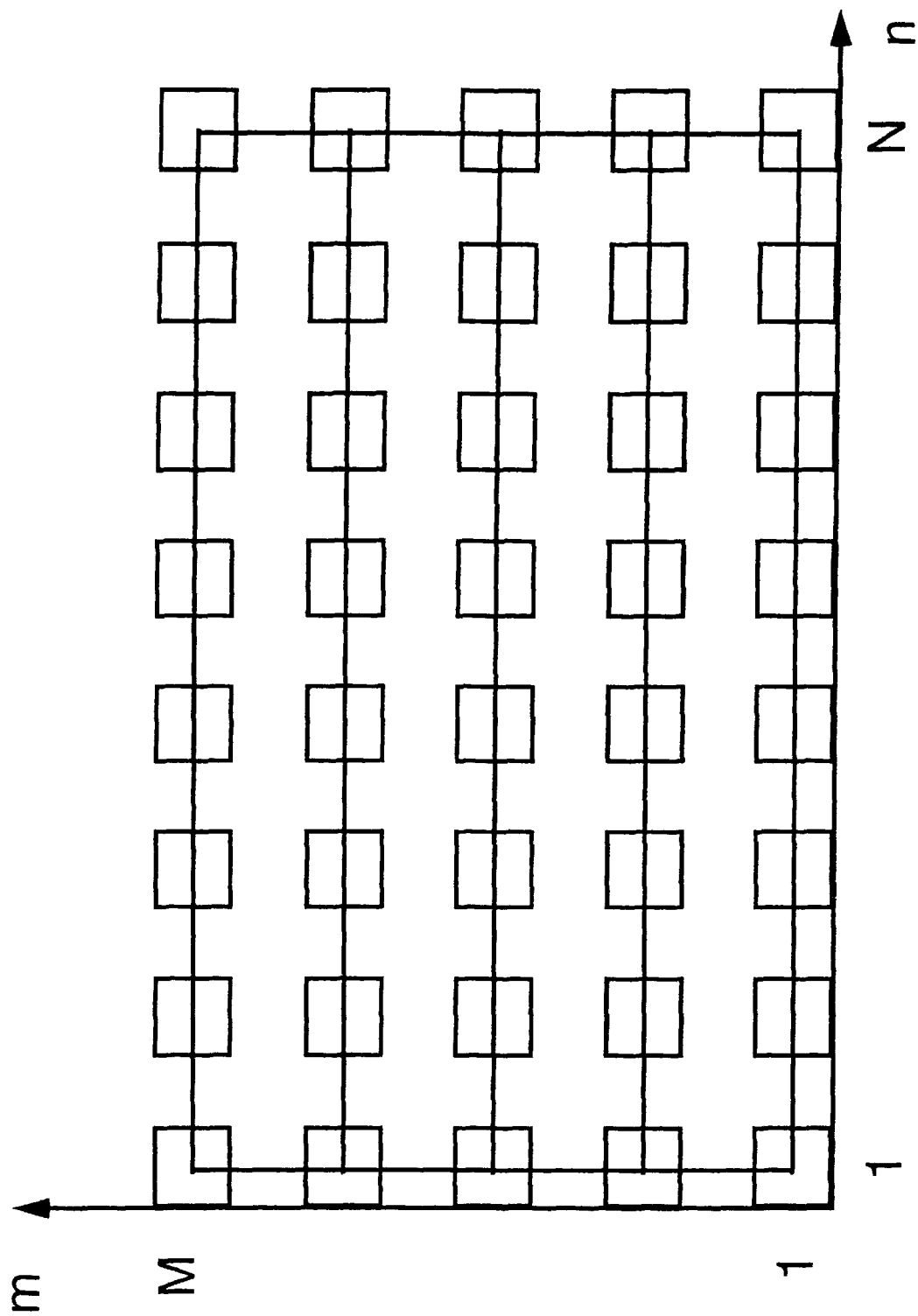
FIG. 20 shows the all rows plus two columns method for aberration measurement.

First, assuming transmission and reception phase aberration profiles are identical, let $$\phi_{m,n} \; n=1,2,\ldots N, m=1,2,\ldots M \qquad (147)$$

denotes the phase aberration value for element (m,n), as shown in FIG. 19. The profile can be derived by the algorithm used for one dimensional array on rows, columns and diagonal lines, then, their results are combined carefully so that the undetermined arbitrary errors are in a plane.

One first applies the algorithm for one dimensional array on all rows. The result of each row is solved by assuming the phase value at both ends of each row is zero. The results are:

$$\phi'_{m,n} = \phi_{m,n} + a_m + b_m(n-1) \; m=1,2,\ldots M \; n=1,2\ldots N \qquad (148)$$

where $$a_m = -\phi_{m,1} \qquad (149)$$

$$b_m = -\frac{\phi_{m,N} - \phi_{m,1}}{N-1}$$

The result for each row has an arbitrary linear error term from the real $\phi_{m,n}$ value. They are generally different for different rows. There are 2M undetermined parameters in the solution.

To reduce the number of unknown parameters, one method is to use two columns, such as choosing the first and the last column. The results for this two columns are also obtained by assuming the phase at both ends are zero. For column 1:

$$\phi'_{m,1}=\phi_{m,1}+a'_1+b'_1(m-1) \quad m=1,2,\ldots M \qquad (150)$$

where $$a'_1 = -\phi_{i,1} \qquad (151)$$

$$b'_1 = -\frac{\phi_{M,1} - \phi_{i,1}}{M-1}$$

and for column N:

$$\phi^-_{m,N}=\phi_{m,N}+a'_N+b'_N(m-1) \quad m=1,2,\ldots M \qquad (152)$$

where $$a'_N = -\phi_{1,N} \qquad (153)$$

$$b'_N = -\frac{\phi_{M,N} - \phi_{1,N}}{M-1}$$

f* is the measured profile from column measurements. From the two column results, a linear term can be derived to add on row measurement results. After adding the linear terms, the resulted profile should be equal to the result obtained from column calculation at column 1 and N. This new profile is:

$$\phi''_{m,n}=\phi'_{m,n}+a'_m+b'_m(n-1) \quad m=1,2,\ldots M \; n=1,2,\ldots N \qquad (154)$$

where:

$$a'_m = \phi'_{m,1} \qquad (155)$$

$$b'_m = \frac{\phi'_{m,N} - \phi'_{m,1}}{N-1}$$

The number of arbitrary parameters in equation (154) is four: $a^*_1$, $a^*_N$, $b^*_1$ and $b^*_N$, as shown in equation (153), they are determined by the values at four corners of the array. If these four values are known, the absolute profile can be obtained. The solution of equation (154) and (155) is derived by the phase values at the four corner of the array are equal to zero. This profile will not focus the two dimensional array well, since the arbitrary errors are not on a plane unless $b^*_1 = b^*_N$. This can be obtained by adjusting the value at one corner of the array. From equations (148) to (155)

$$\phi''_{m,n} = \phi_{m,n} - \phi_{1,1} - \left(\frac{\phi_{M,1}-\phi_{1,1}}{M-1}\right)(m-1) - \qquad (156)$$
$$\left(\frac{\phi_{1,N}-\phi_{1,1}}{N-1}\right)(n-1) - \left(\frac{\phi_{M,N}-\phi_{1,N}-\phi_{M,1}+\phi_{1,1}}{(M-1)(N-1)}\right)(n-1)(m-1)$$

One can see that when:

$$\phi_{M,1}-\phi_{1,1}-\phi_{M,N}+\phi_{1,N}=0 \qquad (157)$$

the arbitrary errors will be in a plane.

2] Different Transmission and Reception Phase Aberration Profiles

Let $\phi_{m,n}$ and $\theta_{m,n}$ denote the transmission and reception aberration profiles respectively at element (m,n). Methods to derive them are similar to that used for the case of the same transmission and reception profiles: Solving all rows plus one column and one diagonal line, or solving all rows plus two columns, then link the results in a proper way. The results using the third method for different transmission and reception profiles described hereinbefore on all rows are:

$$\phi'_{m,n}=\phi_{m,n}+a_{\phi,m}+b_m(n-1) \quad m=1,2,\ldots M \; n=1,2,\ldots N \qquad (158)$$

$$\theta'_{m,n}=\theta_{m,n}+a_{\theta,m}+b_m(n-1) \quad m=1,2,\ldots M \; n=1,2, \qquad (159)$$

where:

$$a_{\phi,m} = -\phi_{m,1} \qquad (160)$$

$$a_{\theta,m} = -\theta_{m,1}$$

$$b_m = -\frac{(\phi_{m,N}-\phi_{m,1})+(\theta_{m,N}-\theta_{m,1})}{2(N-1)}$$

Note that it is assumed that $\phi_{m,1}=\theta_{m,1}=0$, and $\phi_{m,N}=\theta_{m,N}$. There are tree undetermined parameters in each row, 3M undetermined parameters in total. The results from column 1:

$$\phi^*_{m,1}=\phi_{m,1}+a^*_{\phi,1}+b^*_1(m-1) \quad m=1,2,\ldots M$$

$$\theta^*_{m,1}=\theta_{m,1}+a^*_{\theta,1}+b^*_1(m-1) \quad m=1,2,\ldots M \qquad (161)$$

where $$a'_{\phi,1} = -\phi_{1,1} \qquad (162)$$

$$a'_{\theta,1} = -\theta_{1,1}$$

$$b'_1 = -\frac{(\phi_{M,1}-\phi_{1,1})+(\theta_{M,1}-\theta_{1,1})}{2(M-1)}$$

Note that $\phi_{l,1}=\theta_{l,1}=0$, $\phi_{M,1}=\theta_{M,1}$. The results from column N:

$$\phi'_{m,N}=\phi_{m,N}+a'_{\phi,N}+b'_N(m-1) \quad m=1,2,\ldots M \qquad (163)$$

$$\theta'_{m,N}=\theta_{m,N}+a'_{\theta,N}+b'_N(m-1) \quad m=1,2,\ldots M \qquad (164)$$

where $$a'_{\phi,N} = -\phi_{1,N} \qquad (165)$$

$$a'_{\theta,N} = -\theta_{1,N}$$

$$b'_N = -\frac{(\phi_{M,N}-\phi_{1,N})+(\theta_{M,N}-\theta_{1,N})}{2(M-1)}$$

Note that $$\phi_{1,N} = \theta_{1,N} = 0, \text{ and } \phi_{M,N} = \theta_{M,N}.$$

The next step is to link the row results with the two column results to reduce the number of unknown parameters. Here, it is done differently from the identical transmission and reception profile case. The slope of added linear terms for each row derived from the results for column 1 and N should be the same for $\theta$ and $\phi$, so that the error planes of them will have the same orientation in the final result. To do that, the slope of the added linear term to row m is the average of the slopes for $\theta$ and $\phi$:

$$b'_m = -\frac{(\phi'_{m,N}-\phi'_{m,1})+(\theta'_{m,N}-\theta'_{m,1})}{2(N-1)} \qquad (166)$$

and the resulted profiles are:

$$\phi''_{m,n}=\phi'_{m,n}+a'_{\phi,m}+b'_m(n-1) \quad m=1,2,\ldots M \qquad (167)$$

$$\theta''_{m,n}=\theta'_{m,n}+a'_{\theta,m}+b'_m(n-1) \quad m=1,2,\ldots M \qquad (168)$$

where $$a'_{\phi,m}=\phi'_{m,1}$$

$a'_{\theta,m} = \theta'_{m,1}$ (169)

As it is in the case of identical transmission and reception profiles, the important thing is to adjust the value at one corner so that $b^*_l = b^*_N$, which will make the errors stay in a plane, and the steering error will be identical for transmission and reception profiles in the above algorithm.

From equations (158) to (169), the final result is:

$$\phi''_{m,n} = \phi_{m,n} - \phi_{1,1} - \left(\frac{(\phi_{M,1} - \phi_{1,1}) + (\theta_{M,1} - \theta_{1,1})}{2(M-1)}\right)(m-1) - \quad (170)$$
$$\left(\frac{(\phi_{1,N} - \phi_{1,1}) + (\theta_{1,N} - \theta_{1,1})}{2(N-1)}\right)(n-1) -$$
$$\left(\frac{(\phi_{M,N} - \phi_{1,N} - \phi_{M,1} + \phi_{1,1}) + (\theta_{M,N} - \theta_{1,N} - \theta_{M,1} + \theta_{1,1})}{2(M-1)(N-1)}\right)$$
$$(n-1)(m-1)$$

and $$\theta''_{m,n} = \theta_{m,n} - \theta_{1,1} - \left(\frac{(\phi_{M,1} - \phi_{1,1}) + (\theta_{M,1} - \theta_{1,1})}{2(M-1)}\right)(m-1) - \quad (171)$$
$$\left(\frac{(\phi_{1,N} - \phi_{1,1}) + (\theta_{1,NI} - \theta_{1,1})}{2(N-1)}\right)(n-1) -$$
$$\left(\frac{(\phi_{M,N} - \phi_{1,N} - \phi_{M,1} + \phi_{1,1}) + (\theta_{M,N} - \theta_{1,N} - \theta_{M,1} + \theta_{1,1})}{2(M-1)(N-1)}\right)$$
$$(n-1)(m-1)$$

The condition for the error is on a plane is:

$$(\phi_{M,1} - \phi_{l,1} - \phi_{M,N} + \phi^-_{l,N}) = -(\theta_{M,1} - \theta_{l,1} - \theta_{M,N} + \theta_{l,N}) \quad (172)$$

3] Averaging Independent Measurement to Reduce the Influence of Noise

Two independent measurements using common midpoint signals that have the same degree of similarities can be made for a two dimensional array by exchanging the roles played by rows and columns. These two measurements can be averaged, if both measurements have the same assumptions on the phase value at corners, to improve the measurement accuracy.

To further increase the number of independent measurements, common midpoint signals that are separated by larger distance can be used.

B. Amplitude Aberration Measurement

Amplitude correction for a two or one and half dimensional array is similar to the phase aberration correction algorithms described above. Once only needs to define a, b, h and m properly as shown in equations (123), (124), (131), (132), (137) and (138). The requirement on the errors to be in the same plane, which is important for phase, is not so important here.

Aberration Correction when Elements in an Array have a Large Sensitive Angular Region For high resolution imaging, large apertures are needed. This means that elements in the array need to be sensitive in a large angular range so that signals received at elements at large angle of the imaging pixel can be used in the image forming process. In this case, if the pitch is near to the element size, the near field correction may be no longer needed. But, the phase aberration value of each element may depend on the angle in the sensitive angular range. In this case, the phase aberration profile of the array is angular dependent. Each element has an aberration profile according to angles and this profile is generally different for different elements.

The method of doing dynamic near field corrections at a selected angle has been hereinbefore proposed. To correct for a special region, the dynamic near field correction for each element can be chosen toward that special region so that echoes from that region are redundant for common midpoint signals. But when the pitch is small, echoes from all angles are redundant without near field correction. But when the medium is velocity inhomogeneous, the large sensitive angular range of elements makes it difficult to model the aberration as a screen on the transducer surface which is angle independent. An angle dependent aberration screen model is usually needed. In which case, the phase difference between the nearest common midpoint signals is different for echoes come from different angles. The peak positions of cross-correlation functions between them is an averaging of the difference of the whole angular profiles. Therefore, the measured profile on an element based measurement will not relate to any angular distributions, which is generally useless. Special methods have to be developed for this case.

Figure 21:
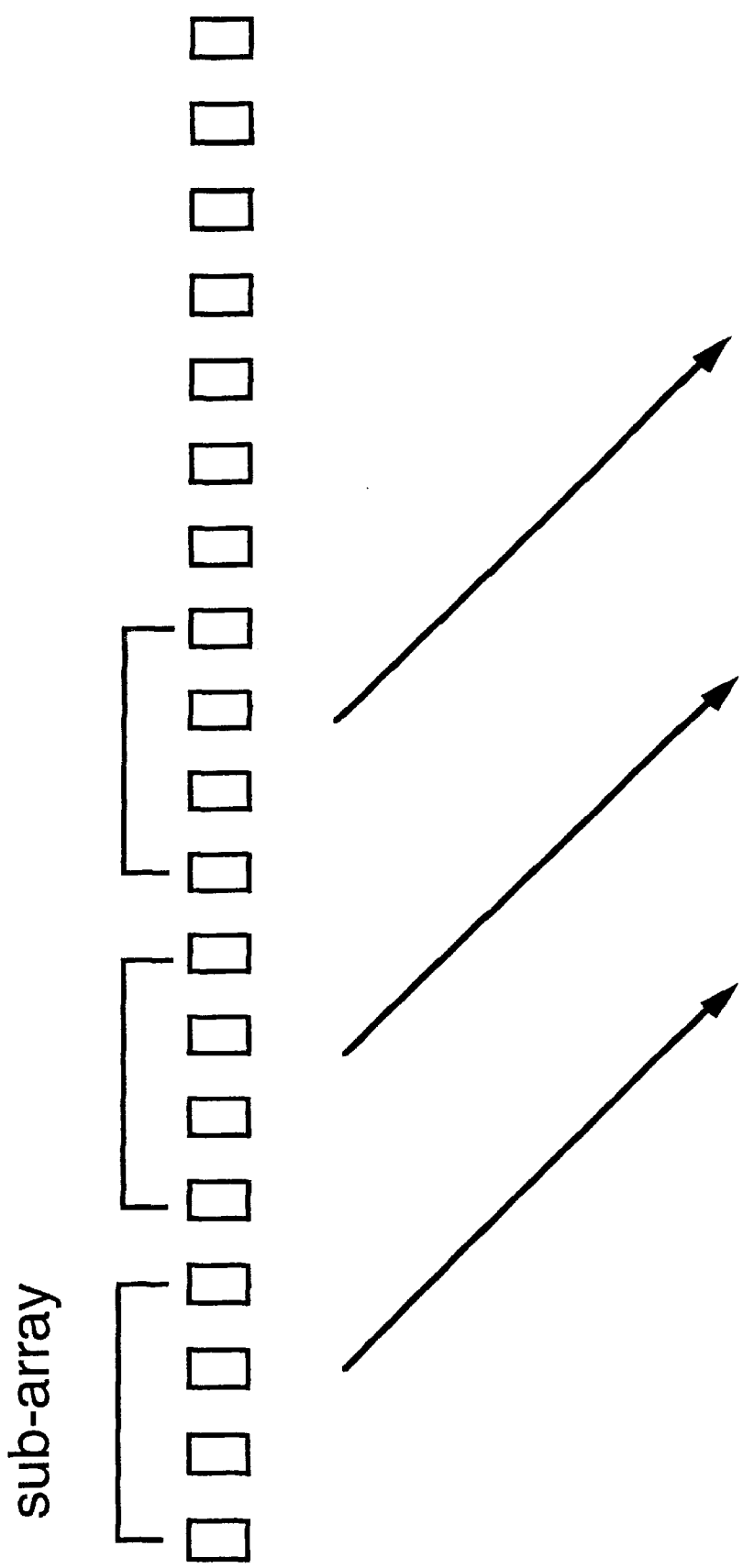
FIG. 21 shows the sub-array method for array with elements which are sensitive in a large angular range.

When element size and pitch are small, it is likely that the angular profiles of aberrations for each element are very similar for nearby elements. In this case, aberration measurements need not to be done for each element separately. The whole array can be separated into several sub-arrays, as shown in FIG. 21. Assuming each sub-array has an angular aberration profile. In the aberration measurement, each sub-array can be used as a large element with the ability to steer its sensitive angular directions. Each sub-array will have a much smaller sensitive angular range than that of elements. The aberration in that angular range will be more uniform. Generally, dynamic near field correction is needed now for phase aberration measurement due to the size of the sub-array. By transmitting at and receiving from one angle at a time, the phase and amplitude aberration profiles for that angle can be measured. By changing the transmitting and receiving angle, an aberration angular profile for each sub-array can be obtained. The profile for each sub-array is assumed to be valid for all elements within that sub-array. The arbitrary linear term is different for the measurement at different angles. They can be made to be the same by estimating and adjusting the profiles of the elements at both ends of the array. Usually, a complete angular profile measurement for each element is not necessary. If only a special region is the interest of better resolution, the signal can be transmitted at and received from that region. Only one aberration value is measured for each element, which is the value towards that region. The sub-arrays, sometimes, can be overlapped with each other.

Noise Control in Phase Aberration Measurements

The difference between transmission and reception phase aberration profiles are generally caused by system errors. Since the requirement for them to be similar in phase aberration measurements is much more strict than that in image forming, generally they must be treated as different in phase aberration measurements. The difference in a system can be calibrate by measuring it several times and averaging the results. The calibrated result can be used to check the quality of phase aberration measurements. For example, the cross correlation peak position $\tau'_i$ between signals $y_{i+1,i}$ and $y_{i,i+1}$ is determined by:

$$(\phi_{i-1} - \theta_{i-1}) - (\phi_i - \theta_i) = \tau'_i \ i=1,2,\ldots N-1 \quad (173)$$

The profile of $\tau'_i$ can be measured quite accurately by averaging many transmissions and/or many regions to reduce the noise. Then a profile of $\tau'_{i+1} - \tau'_i$ can be obtained:

$$(\phi_{i+2} - \theta_{i+2}) - (\phi_i - \theta_i) = \tau'_{i-1} - \tau'_i \ i=1,2,\ldots N-2 \quad (174)$$

These values can be used to monitor the signal quality in the measurement of phase aberration profiles when using the second method for dealing with different transmission and reception profiles. In that method, the signal $y_{i,i}$ is cross correlated with signals $y_{i-1,i+1}$ and $Y_{i+1,i-1}$ separately, and the peak positions of cross correlation functions are measured, which gives the following values:

$$(\phi_i+\theta_i)-(\phi_{i-1}+\theta_{i+1})=\tau_{ij-1} \quad (175)$$

$$(\phi_i+\theta_i)-(\phi_{i-1}+\theta_{i+1})=\tau_{ij-1} \quad (176)$$

from the above two equations:

$$(\phi_{i+1}-\theta_{i+1})-(\phi_{i-1}-\theta_{i-1})=\tau_{ij-1}-\tau_{ij+1} \quad i=2,3,\ldots N-1 \quad (177)$$

This profile should be similar to the calibrated profile in equation (174). If the difference is large, it indicates that the noise is strong therefore, this measurement should be discarded.

APPENDIX A

THE ANGULAR WIDTH OF THE REGION OF REDUNDANCY

At boundaries of the region of redundancy, the following equation is satisfied $$\frac{1}{M} = \frac{h^2}{R_{cT}} k \left[ |\sin^2(\theta_T) - \sin^2(\theta_i)| + \frac{\Delta R}{R_{cT}} \sin^2(\theta_i) \right]. \quad (A1)$$

Since this equation is symmetrical about 90°, it is assumed in the following analysis that $$0° \le \theta_i \le 90 \text{ and } 0° \le \theta_t \le 90° \quad (A2)$$

There are two solutions generally, one is for $\theta_T<\theta_i$, the other is for $\theta_T>\theta_i$. From equation (A1), the first solution $\theta_{T1}$ for $\theta_{T1}<\theta_i$ is $$\sin(\theta_{T1}) = \sqrt{\left(1 + \frac{\Delta R}{R_{cT}}\right)\sin^2(\theta_i) - \gamma} \quad (A3)$$

$\theta_{T1}$, which is less than $\theta_i$, only exits if $$0 \le \left(1 + \frac{\Delta R}{R_{cT}}\right)\sin^2(\theta_i) - \gamma \le \sin^2(\theta_i), \quad (A4)$$

i.e.

$$\sin^2(\theta_i) \ge \frac{\gamma}{1+\frac{\Delta R}{R_{cT}}} \quad (A5)$$

and $$\sin^2(\theta_i) \le \frac{\gamma}{\left(\frac{\Delta R}{R_{cT}}\right)} \quad (A6)$$

where $$\gamma = \frac{R_{cT}}{Mh^2\kappa}. \quad (A7)$$

When equation (A5) is not satisfied, $\theta_{T1}$ no longer exists, the region of redundancy begins from 0°. Equation (A6) means that, when the error caused by pulse length alone at 90° is larger than the requirement $\gamma$, the correction angle has to be small enough to satisfy equation (A6) to reduce the pulse stretching effect adequately so that a region of redundancy can exist. Otherwise, the volume of the region of redundancy is zero.

The second solution $\theta_{T2}$ for $\theta_{T2}>\theta_i$ is $$\sin(\theta_{T2}) = \sqrt{\left(1 - \frac{\Delta R}{R_{cT}}\right)\sin^2(\theta_i) + \gamma}. \quad (A8)$$

$\theta_{T2}$, which is larger than $\theta_i$, only exists if $$\sin^2(\theta_i) \le \left(1 - \frac{\Delta R}{R_{cT}}\right)\sin^2(\theta_i) + \gamma \le 11. \quad (A9)$$

Equation (A9) means that $$\sin^2(\theta_i) \le \frac{\gamma}{\left(\frac{\Delta R}{R_{cT}}\right)} \quad (A10)$$

and $\left(\text{assume } \frac{\Delta R}{R_{cT}} < \right)$, $$\sin^2(\theta_i) \le \frac{1-\gamma}{1-\frac{\Delta R}{R_{cT}}} \quad (A11)$$

Equation (A10) is the same as equation (A6). If equation (A11) is not satisfied, it means that the region of redundancy will begin from 90°.

From the above discussion, the angular width of the region of redundancy at distance $R_{cT}$ can be derived for the following three cases:

a] When there is no solution for $\theta_{T1}$ because equation (A5) is not satisfied, $$\Delta\theta = 2\theta_{T2} = 2\arcsin\left(\sqrt{\left(1 - \frac{\Delta R}{R_{cT}}\right)\sin^2(\theta_i) + \gamma}\right). \quad (A12)$$

The parameter 2 is because of the symmetry about angle 90°.

b] When both solutions $\theta_{T1}$ and $\theta_{qT2}$ exist.

$$\Delta\theta = 2(\theta_{T2}-\theta_{T1}) = 2\left(\arcsin\left(\sqrt{\left(1+\frac{\Delta R}{R_{cT}}\right)\sin^2(\theta_i)+\gamma}\right) - \arcsin\left(\sqrt{\left(1+\frac{\Delta R}{R_{cT}}\right)\sin^2(\theta_i)-\gamma}\right)\right) \quad (A13)$$

c] When there is no solution for $\theta_{T2}$ because equation (A11) is not satisfied, $$\Delta\theta = 2(\frac{\pi}{2}-\theta_{T1}) = 2\left(\frac{\pi}{2} - \arcsin\left(\sqrt{\left(1+\frac{\Delta R}{R_{cT}}\right)\sin^2(\theta_i)-\gamma}\right)\right). \quad (A14)$$

APPENDIX B

SOLVING EQUATION (5)

The equation $$\begin{bmatrix} 2 & -1 & 0 & \cdots & \cdots & 0 & 0 & 0 \\ -1 & 2 & -1 & 0 & \cdots & \cdots & 0 & 0 \\ 0 & -1 & 2 & -1 & 0 & \cdots & \cdots & 0 \\ \vdots & \vdots & \vdots & \vdots & \vdots & \vdots & \vdots & \vdots \\ 0 & \cdots & \cdots & 0 & -1 & 2 & -1 & 0 \\ 0 & 0 & \cdots & \cdots & 0 & -1 & 2 & -1 \\ 0 & 0 & 0 & \cdots & \cdots & 0 & -1 & 2 \end{bmatrix} \begin{bmatrix} x_1 \\ x_2 \\ x_3 \\ \vdots \\ x_{N-2} \\ x_{N-1} \\ x_N \end{bmatrix} = \begin{bmatrix} y_1 \\ y_2 \\ y_3 \\ \vdots \\ y_{N-2} \\ y_{N-1} \\ y_N \end{bmatrix} \quad (B1)$$

is a special case of a Toeplitz linear equation. The equations for this matrix are $2x_1 - x_2 = y_1$ $-x_1 + 2x_2 - x_3 = y_2$ $-x_2 + 2x_3 - x_4 = y_3$ $-x_{N-2} + 2x_{N-1} - x_N = y_{N-1}$ $-x_{N-1} + 2x_N = y_N$ \quad (B2)

It is not difficult to solve this equation set Below is one way to do it:

1] By progressive summation down columns from the top of equation (B2), one has the following N equations $2x_1 - x_2 = y_1$ $x_1 + x_2 - x_3 = y_1 + y_2$ $x_1 + x_3 - x_4 = y_1 + y_2 + y_3$ $x_1 + x_{N-1} - x_N = y_1 + y_2 +, \ldots, + y_{N-1}$ $x_1 + x_N = y_1 + y_2 +, \ldots, + y_{N-1} + y_N.$ \quad (B3)

2] By progressive summation up columns from the bottom of equation (B3), one has the following N equations $(N+1)x_1 = Ny_1 + (N-1)y_2 + (N-2)y_3 + (N-1)y_4 +, \ldots, + y_N$ $(N-1)x_1 + x_2 = (N-1)(y_1 + y_2) + (N-2)y_3 + (N-3)y_4 +, \ldots, + y_N$ $(N-2)x_1 + x_3 = (N-2)(y_1 + y_2 y_3) + (N-3)y_4 +, \ldots, + y_N$ $2x_1 + x_{N-1} = 2(y_1 + y_2 + y_3 +, \ldots, + y_N)$ $x_1 + x_N = y_1 + y_2 +, \ldots, + y_{N-1} + y_N.$ \quad (B4)

$x_1$ can be derived from the first equation in (B4). Other $x_j$ values can be derived from the rest of the equations using the $x_1$ solution. The general expression is $$x_j = j \sum_{i=1}^{N} \frac{N+1-i}{N+1} y_i - \sum_{i=1}^{j} (j-1) y_i \quad (B5)$$

$$= \sum_{i=1}^{N} a_{jj} y_i \quad j = 1, 2, \ldots N$$

where $$a_{jj} = \begin{cases} i \dfrac{N+1-j}{N+1} & i < j \\ j \dfrac{N+1-i}{N+1} & i \geq j \end{cases} \quad i = 1, 2, \ldots N, \quad j = 1, 2, \ldots N. \quad (B6)$$

I claim:

1. A method of generating high resolution ultrasound images comprising:

obtaining signals from a plurality of transmitter-receiving elements, wherein the plurality of transmitter-receiver elements produces transmitted signals in response to receiving transmission signals, whereby echo signals are produced when a target located in a near-field of the transmitter-receiver elements reflects the transmitted signals, and receiving the echo signals and generating the received signals therefrom;

dynamically correcting the received signals for near field effect;

cross-correlating the corrected received signals at a predetermined depth and window length, thereby producing cross-correlation signals;

measuring phase differences between said received signals from peak positions of the cross-correlation signals;

deriving phase aberration values for each element by solving linear equations based on the measured phase differences;

correcting the received signal based on the derived phase aberration values and producing an image from the received signals; and iteratively adjusting undetermined linear terms in the linear equations for optimal performance of said method.

2. A method of generating high resolution ultrasound images, comprising:

obtaining received signals from a plurality of transmitter-receiving elements, wherein the plurality of transmitter-receiver elements produces transmitted signals in response to receiving transmission signals, whereby echo signals are produced when a target located in a near-field of the transmitter-receiver elements reflects the transmitted signals, and generating the received signals in response to receiving the echo signals;

measuring an energy ratio of pairs of the received signals;

determining amplitude aberration values for each element by solving linear equations based on the measured energy ratios; and generating the image based on the received signals corrected based on the determined amplitude aberration values.

3. A method as claimed in claim 2, further comprising:

dynamically correcting specific ones of the transmission and received signals for near field effect;

measuring an energy ratio of pairs of the received signals, wherein each pairs of received signals is comprised of two redundant signals;

calculating a ratio of signal energy of the two redundant signals at their peak positions;

adjusting arbitrary linear terms of the linear equations for optimal performance of said method.

4. A method as claimed in claim 2, wherein a relativity low sampling rate is used when generating said received signals.

5. A method as claimed in claim 2, wherein demodulated signals may be used.

6. A method of obtaining high resolution ultrasound images, comprising:

obtaining received signals from a plurality of transmitter-receiver elements, wherein the plurality of transmitter-receiver elements produces transmitted signals in response to receiving transmission signals, whereby echo signals are produced when a target located in a near-field of the transmitter-receiver elements reflects the transmitted signals, and generating the received signals in response to receiving the echo signals;

dynamically correcting at least one of the transmission signals and the received signals for near-field effects;

cross-correlating the dynamically corrected received signals thereby producing cross-correlated signals;

measuring phase differences and energy ratios between the cross-correlated signals at peak positions of the cross-correlation signals;

deriving phase and amplitude aberration values for each element;

correcting the received signals based on the derived phase and amplitude aberration values and producing an image from the corrected received signals; and iteratively adjusting undetermined linear terms in the linear equations for optimal performance.

7. A method of generating high resolution ultrasound echography images as claimed in claim 1, wherein said signals from said plurality of transmitter receiver elements are obtained simultaneously.

8. A method of generating high resolution ultrasound echography images as claimed in claim 7, wherein the simultaneously obtained signals are obtained by using one of different codings, frequency bands or random delay patterns, selectively decoding or filtering, respectively, and wherein the selection of codings, frequency bands, random delay patterns is chosen to reduce signal distortion effects.

9. A method of generating high resolution ultrasound echography images as claimed in claim 1, wherein similar signals are transmitted simultaneously from different elements at spaced apart locations.

10. A method of generating high resolution ultrasound echogaphy images as claimed in claim 1, wherein, said near field correction is performed in time domain, frequency domain, or utilising other transformations.

11. A method of generating high resolution ultrasound echography images as claimed in claim 1, wherein, said disc near field correction is carried out at a plurality of velocities and/or directions, and optionally averaged prior to cross-correlating said signals.

12. A method of element high resolution ultrasound echography images as claimed in claim 1, wherein under severe aberration conditions, an estimated phase aberration profile is initially estimated, and used in the dynamic near field corrections.

13. A method of generating high resolution ultrasound echography images as claimed in claim 1, wherein for improved lateral resolution in a specific area, dynamic near field correction is perked in a direction towards that area.

14. A method of generating high resolution ultrasound echography images as claimed in claim 1, wherein in said measuring step, a plurality of phase aberration profiles are measured to said correction of the image.

15. A method of generating high resolution ultrasound echography images as claimed in claim 1, wherein said dynamic near field correction is performed with high accuracy or sampling rate to satisfy:

$$\frac{\sigma_{\frac{N+1}{2}+1}}{\sigma} = \sqrt{\frac{(N+1)}{48}(N^2 + 2N + 3)}.$$

16. A method of generating high resolution ultrasound echography images as claimed in claim 1, wherein only the closest measured common midpoint signals are utilised.

17. A method of generating high resolution ultrasound echography images as claimed in claim 1, wherein signals from only the elements involved in forming the relevant portion of the image are utilised for deriving the phase aberration values.

18. A method of generating high resolution ultrasound echography images as claimed in claim 1, wherein when transmission and reception phase aberration profiles are different but small, and if the cross correlation signals are symmetrical about their peak, then two reciprocal signals are averaged before the dynamic field correction is performed.

19. A method of generating high resolution ultrasound echography images as claimed in claim 1, wherein when transmission and reception phase aberration profiles are different but small, and if the cross correlation signals are non-symmetrical, then the peak positions of two cross correlation values for two reciprocal signal positions are measured separately.

20. A method of generating high resolution ultrasound echography images as claimed in claim 1, wherein when transmission and reception phase aberration profiles are of large difference, another set of reciprocal signals are obtained to provide another set of equations.

21. A method of generating high resolution ultrasound echography images as claimed in claim 1, wherein said adjusting undetermined linear terms is performed manually or automatically.

22. A method as claimed in claim 1, wherein said method is used to correct phase and amplitude aberrations for two or one and a half dimensional arrays.

23. A method as claimed in claim 22 wherein, in said adjusting step, independent measurements from signals obtained from elements having a similar degree of similarity are averaged, by exchanging the roles of rows and columns forming said elements, to improve phase and/or amplitude measurement accuracy.

24. A method as claimed in claim 23, wherein, for arrays with elements having a large angular responding range, a sub-array technique is used to measure phase aberration angular profiles for each element or sub-array.

25. A method as claimed in claim 24, wherein, said sub-array technique is used to measure phase aberration angular profiles for each element or sub-array towards a specific region of interests.

26. A method as claimed in claim 25, wherein the difference between differences of transmission and reception profiles of two neighboring elements, generally caused by system errors and/or noise, is calibrated and used to determine the quality of other aberration measurements, such that, if the difference is large, the measurement result is abandoned.

27. A method as claimed in claim 26, wherein, to reduce signal processing time, the calibration result is used directly to determine the transmission and reception aberration profiles.

* * * * *